US007934006B2

(12) United States Patent
Kato et al.

(10) Patent No.: US 7,934,006 B2
(45) Date of Patent: Apr. 26, 2011

(54) DEVICE MANAGEMENT SYSTEM

(75) Inventors: Takatoshi Kato, Yokohama (JP); Takashi Tsunehiro, Ebina (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 11/802,781

(22) Filed: May 24, 2007

(65) Prior Publication Data

US 2007/0288623 A1 Dec. 13, 2007

(30) Foreign Application Priority Data

May 24, 2006 (JP) .................. 2006-143586
Apr. 6, 2007 (JP) .................. 2007-100028

(51) Int. Cl.
 *G06F 15/16* (2006.01)
(52) U.S. Cl. ........................ 709/229; 709/227
(58) Field of Classification Search .................. 709/228, 709/229
See application file for complete search history.

(56) References Cited

U.S. PATENT DOCUMENTS

| 6,895,588 | B1 * | 5/2005 | Ruberg .................. 719/321 |
| 6,904,489 | B2 | 6/2005 | Zarns |
| 7,081,904 | B2 * | 7/2006 | Zoller et al. .................. 345/661 |
| 2005/0240712 | A1 | 10/2005 | Klein |
| 2006/0200681 | A1 | 9/2006 | Kato et al. |
| 2007/0011446 | A1 | 1/2007 | Kato et al. |

FOREIGN PATENT DOCUMENTS

| JP | 2000-285039 A | 10/2000 |
| JP | 2005-235159 | 9/2005 |
| JP | 2006-344021 | 12/2006 |

OTHER PUBLICATIONS

Japanese Office Action, issued in Japanese Patent Application No. 2007-100028, dated May 29, 2007.
Hirofuchi, Takahiro et al. "A Device Access Method over Network by Extending USB Driver stack of Linux", Information Processing Society of Japan, vol. 2003 No. 42 pp. 41-48, May 9, 2003, with English Translation.
Hirofuchi, T., et al., "USB/IP: A Transparent Device Sharing Technology over IP Network", Information Processing Society of Japan (IPSJ) Transactions on Advanced Computing Systems, Aug. 2005, pp. 349-361, vol. 46, No. SIG12.
Hirofuchi, T., et al., "USB/IP—A Peripheral Bus Extension for Device Sharing over IP Network", FREENIX Track: 2005 USENIX Annual Technical Conference, Apr. 2005, pp. 47-60, USENIX Association.
T. Hirofuchi et al., "the Proposal of a Device Control Framework with USB over IP for Realizing IP Device Space," IPSJ SIG Technical Report, Information Processing Society of Japan, vol. 2003, No. 115, 2003-UBI-2-25, Nov. 19, 2003, pp. 117-122, w/ an English translation thereof.
Japanese Decision of Refusal issued in Japanese Patent Application No. JP 2007-196886 dated Aug. 31, 2010.

\* cited by examiner

*Primary Examiner* — Joseph E Avellino
*Assistant Examiner* — Marshall McLeod
(74) *Attorney, Agent, or Firm* — McDermott Will & Emery LLP

(57) ABSTRACT

A device management system is provided which is used in a client/server architecture system, enabling safe sharing of a device without compromising user convenience. In a case where the device which is connected to a client is accessed from a server, in order that the device connected to the client can be used from the server by merely connecting the device to the client without performing another operation, a filter is provided on the client side, and a pseudo bus driver is provided on the server side. The filter in the client exclusively controls client operations to the device and server operations to the device. The pseudo bus driver virtually functions as a device driver between a communication unit for the client and the application in the server.

8 Claims, 28 Drawing Sheets

FIG. 2

| 1401 | 1402 | 1403 | 1404 | 1405 | 1406 | 1407 | 1408 | 1409 | 1410 | 1411 |
|---|---|---|---|---|---|---|---|---|---|---|
| POLICY NUMBER | DEVICE NAME | ADDRESS OF CONNECTION APPLICATION | NETWORK INTERFACE ID OF CONNECTION APPLICATION | VENDOR ID | PRODUCT ID | SERIAL NUMBER | DEVICE TYPE | EXCLUSIVE CONTROL | AVAILABILITY | USABLE ID |
| 1 | * | * | * | 1001 | 1001 | * | * | NOT REQUIRED | POSSIBLE | {20000001, 20000010, ...} |
| 2 | * | * | * | 1105 | * | * | B Ltd.* | NECESSARILY REQUIRED | POSSIBLE | {20000011} |
| 3 | * | 192.168.1.1 | 00:00:00:00:00:01 | * | * | * | * | * | WARNING | * |
| n | * | * | * | * | * | * | * | NOT REQUIRED | INHIBIT | NONE |

| 201 | 202 | 203 | 204 | 205 | 206 | 207 | 208 | 209 | 210 | 211 | 212 |
|---|---|---|---|---|---|---|---|---|---|---|---|
| DEVICE ID | DEVICE NAME | ADDRESS OF CONNECTION APPLICATION | NETWORK INTERFACE ID OF CONNECTION APPLICATION | VENDOR ID | PRODUCT ID | SERIAL NUMBER | DEVICE TYPE | EXCLUSIVE CONTROL | STATUS | AVAILABILITY | USED USER ID |
| 30000001 | DEVICE A | 192.168.1.1 | 00:00:00:00:00:01 | 1001 | 1001 | 10010001 | A Corp. USB CD-ROM | NECESSARILY REQUIRED | UNDER OCCUPATION | {20000001, 20000010,…} | 10000001 |
| 30000002 | DEVICE B | 192.168.1.2 | 00:00:00:00:00:02 | 1105 | 1105 | A012CD02 | B Ltd. MC Reader Writer | NOT REQUIRED | UNDER USE | {20000011} | 10000002 |
| 30000003 | DEVICE C | 192.168.1.3 | 00:00:00:00:00:03 | 1A15 | 1A15 | 101256A1 | XYZ Removable HDD | NOT REQUIRED | UNDER COMMUNICATION | {20000001, 20000010,…} | 10000001 |
| 30000004 | DEVICE D | 192.168.1.4 | 00:00:00:00:00:04 | 20AA | 20AA | 00000012 | ABC Smartcard R/W | POSSIBLE | UNCLEAR | UNDEFINED | 10000004 |
| 30000005 | DEVICE Z | 192.168.4.5 | 00:00:00:00:04:05 | C014 | A04A | 0520ADC1 | Z MCard R/W | POSSIBLE | UNCLEAR | UNDEFINED | 10000004 |

| 301 USER ID | 302 USER NAME | 303 BELONGING GROUP | 304 CERTIFICATION | 305 VALIDITY TERM | 306 CERTIFICATION APPROVAL/DENIAL | 307 ENCRYPTION HASH METHOD | 308 PASSWORD | 309 PASSWORD DENIAL/APPROVAL |
|---|---|---|---|---|---|---|---|---|
| 10000001 | USER A | {20000001,20000010,···} | CERTIFICATION A | ~2005/8/31 13:05 | APPROVAL | 3DES-SHA1 | 12345678 | APPROVAL |
| 10000002 | USER B | {20000011} | UNDEFINED | UNDEFINED | DENIAL | UNDEFINED | abcdefgh | APPROVAL |
| 10000003 | USER C | {20000001,20000010,···} | CERTIFICATION C | UNDEFINED | APPROVAL | 3DES-SHA1 | UNDEFINED | DENIAL |
| 10000010 | USER D | UNDEFINED | CERTIFICATION D | ~2005/10/1 23:59 | APPROVAL | 3DES-SHA1 | UNDEFINED | DENIAL |
| 10000011 | USER E | {20000001,20000011,···} | CERTIFICATION E | 9:00~23:00 | APPROVAL | 3DES-SHA1 | UNDEFINED | DENIAL |

| 401 | 402 | 403 | 404 | 405 | 406 | 407 | 408 | 409 | 410 | 411 | 412 | 413 |
|---|---|---|---|---|---|---|---|---|---|---|---|---|
| PC NAME | NETWORK NAME | IP ADDRESS | MAC ADDRESS | SOURCE TERMINAL | NETWORK NAME OF USE SOURCE | IP ADDRESS OF USE SOURCE | MAC ADDRESS OF USE SOURCE | USER ID | STATUS | CONNECTION START TIME INSTANT | CONNECTION END TIME INSTANT | OPERATION CONFIRMATION TIME INSTANT |
| PC A | pc11 | 192.168.1.1 | 00:00:00:00:00:01 | PC F | pc34 | 192.168.3.4 | 00:00:00:00:03:04 | USER A | UNDER OPERATION | 2005/1/1 13:05 | - | 2005/1/1 15:02 |
| PC B | pc12 | 192.168.1.2 | 00:00:00:00:00:02 | PC Z | pc45 | 192.168.4.5 | 00:00:00:00:04:05 | USER B | UNDER OPERATION | 2005/1/1 14:12 | - | 2005/1/1 15:04 |
| PC C | pc13 | 192.168.1.3 | 00:00:00:00:00:03 | PC H | pc67 | 192.168.6.7 | 00:00:00:00:06:07 | USER C | UNDER CHECKING | 2005/1/1 9:12 | - | 2005/1/1 14:45 |
| PC D | pc14 | 192.168.1.4 | 00:00:00:00:00:04 | - | - | - | - | - | UNDER WAITING CONDITION | - | 2005/1/1 11:05 | - |

400

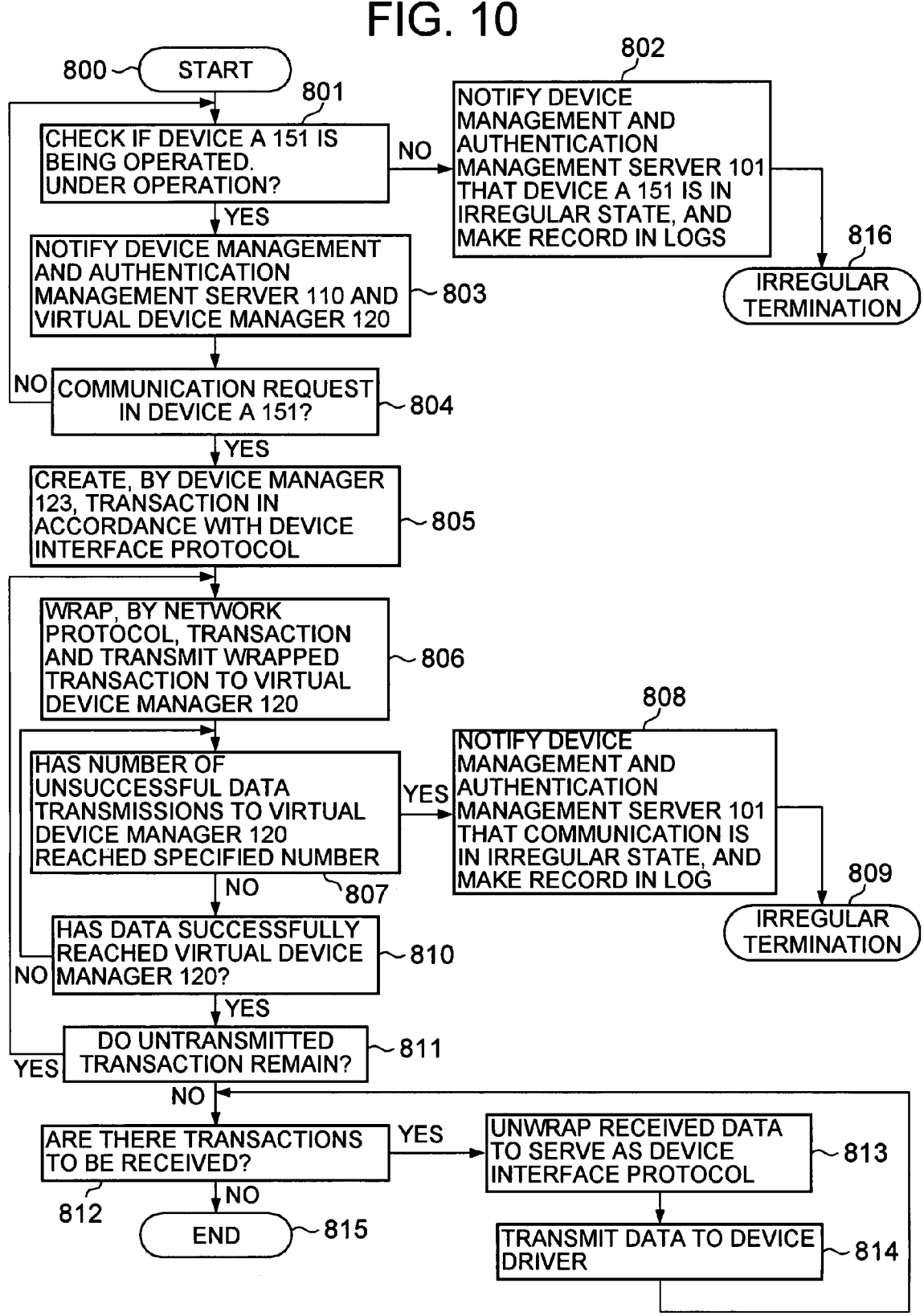

FIG. 11

Table 1000:

| 1001 | 1002 | 1003 | 1004 | 1005 | 1006 | 1007 | 1008 | 1009 | 1010 |
|---|---|---|---|---|---|---|---|---|---|
| NUMBER | TIME INSTANT | DEVICE ID | DEVICE NAME | ADDRESS (SOURCE) | NETWORK INTERFACE ID (SOURCE) | APPLICATION ID | ADDRESS (HOST) | NETWORK INTERFACE ID (HOST) | APPLICATION ID |
| 1 | 2005:1/1 9:01:59 | - | DEVICE A | 192.168.1.4 | 00:00:00:00:00:04 | 40000004 | - | - | - |
| 2 | 2005:1/1 9:02:10 | - | DEVICE A | 192.168.1.4 | 00:00:00:00:00:04 | 40000004 | - | - | - |
| 3 | 2005:1/1 9:02:12 | 30000001 | DEVICE A | 192.168.1.4 | 00:00:00:00:00:04 | 40000004 | 192.168.0.1 | 00:00:00:01:00:01 | 40010001 |
| 4 | 2005:1/1 9:02:21 | - | - | 192.168.0.1 | 00:00:00:01:00:01 | 40010001 | 192.168.0.1 | - | - |
| 5 | 2005:1/1 9:02:25 | - | - | 192.168.0.1 | 00:00:00:01:00:01 | 40000001 | 192.168.1.4 | 00:00:00:01:00:01 | 40010001 |
| 6 | 2005:1/1 9:02:59 | 30000001 | DEVICE A | 192.168.0.1 | 00:00:00:01:00:01 | 40010001 | 192.168.1.4 | 00:00:00:00:00:04 | 40000004 |
| 7 | 2005:1/1 9:03:19 | 30000002 | DEVICE D | 192.168.0.1 | 00:00:00:01:00:01 | 40010001 | 192.168.1.1 | 00:00:00:00:00:01 | 40000001 |
| 8 | 2005:1/1 9:03:50 | - | DEVICE Z | 192.168.4.5 | 00:00:00:00:04:05 | 40000004 | | | - |
| 9 | 2005:1/1 9:03:59 | - | DEVICE Z | 192.168.4.5 | 00:00:00:00:04:05 | 40000004 | | | - |
| 10 | | | | | | | | | |
| 11 ... | | | | | | | | | |

| 1011 | 1012 | 1013 | 1014 | 1015 | 1016 | 1017 |
|---|---|---|---|---|---|---|
| VENDOR ID | PRODUCT ID | SERIAL NUMBER | DEVICE NAME | USER ID | INFORMATION | REMARKS |
| - | - | - | - | 00000001 | INITIATE DEVICE MANAGER (192.168.1.4) | |
| 1001 | 1001 | 10010001 | A Corp. USB CD-ROM | 00000001 | ACQUIRE DEVICE INFORMATION (192.168.1.4) | |
| 1001 | 1001 | 10010001 | A Corp. USB CD-ROM | 00000001 | TRANSMIT DEVICE INFORMATION (192.168.1.4→192.168.0.1) | |
| 1001 | 1001 | 10010001 | A Corp. USB CD-ROM | 00000001 | REGISTER DEVICE INFORMATION (30000001) (192.168.0.1) | |
| - | - | - | - | 00000002 | REQUEST AVAILABLE DEVICE SURVEY (192.168.1.1→192.168.0.1) | |
| 1001 | 1001 | 10010001 | A Corp. USB CD-ROM | 00000001 | INQUIRE AVAILABILITY OF DEVICE (192.168.0.1→192.168.1.4) | |
| 1001 | 1001 | 10010001 | A Corp. USB CD-ROM | 00000004 | SEND AVAILABLE DEVICE (192.168.0.1→192.168.1.1) | |
| - | - | - | - | - | INITIATE DEVICE MANAGER (192.168.4.5) | |
| C014 | A04A | 0520ADC1 | Z MCard R/W | - | ACQUIRE DEVICE INFORMATION (192.168.4.5) | |

DEVICE MANAGEMENT SYSTEM

INCORPORATION BY REFERENCE

This application claims priorities from the Japanese Patent Application Nos. 2006-143586 filed on May 24, 2006 and 2007-100028 filed on Apr. 6, 2007, the entire contents of which are incorporated by reference herein.

BACKGROUND OF THE INVENTION

The present invention relates to technology which manages access to a device coupled to a server via a network. The present invention particularly relates to technology which enables safe and easy remote operation in a system in which the device is virtually available as in a case where the device is directly connected to the server.

A control method capable of controlling a server such as a personal computer (PC) or workstation located in a remote place has been generally performed by employing an information terminal at hand such as a PC, personal digital assistant (PDA), or portable telephone. Such a method is referred to as a server/client system. In the server/client system, a large-scale server is subdivided in a time division manner or the like, among information terminals at hand, that is, terminals on a client side, to be utilized. The server/client system is utilized in a case where processing capability of a terminal on the client side is low, and/or a case where a certain level of security cannot be ensured for a terminal of the client side. In the server/client system, the server communicates with the clients via the Internet or an intranet. Such communication is now provided with service on a broadband network at low cost. This contributes to widespread use of the communication of the server control method.

In the sever/client system, in order to control a server installed at a remote place by an information terminal (client terminal) at hand, a program which is used for controlling the server is installed in the server, whereas another program which is used for displaying a result obtained by controlling the server is installed in the client terminal. Also, when there is a risk that data will be stolen or that data will be altered in a communication path coupling the server and the client terminal, another program is used by which a virtual private network (VPN) is established so as to encrypt the communication path. In order to confirm whether or not rights for controlling a server have been applied to a client terminal and to a user who uses this client terminal, generally speaking, the following confirmation methods have been carried out. That is, specific authentication information is stored in the client terminal; a device into which authentication information has been stored is connected to the client terminal; and biological authentication information of the user is inputted to the client terminal, and the entered biological authentication information is confirmed by the client terminal or the server.

Users who utilize servers and client terminals for business cause the client terminals to display thereon results of the servers which are remotely operated at places within offices, and at any places other than the offices, for instance, at their homes, or inside vehicles, and to execute business by employing programs installed on the servers. Also, even for purposes other than business, servers and client terminals are coupled to each other, being installed, for example, in homes and data centers. Screens displayed on the servers are displayed on the client terminals, and information processing operations are carried out by employing programs installed on the servers, for instance, to read or write electronic mail, or to start up browser programs so as to view Web information, and the like. Before a series of operations are executed, communications made between the servers and the client terminals may be protected by utilizing encryption communication methods such as IPsec VPN and SSL-VPN, if required.

As previously described, utilization modes of the servers by the client terminals in accordance with the server/client systems may have the below-mentioned features. That is, as compared with cases where a system of a server/client type is not employed, entire appliance costs and risk management costs may be reduced; probability of losing information may be reduced; and simple operations may be provided and necessary information processed irrespective of types of information terminals at hand in any time and any place. One example of such server utilization modes that use information terminals at hand is described in, for instance, Japanese Patent Laid-Open Publication No. 2005-235159 (referred to as "Patent Document 1" hereinafter).

In server/client systems, there are many possibilities for servers installed at places which are physically separated from client terminals. In such cases, for example, peripheral appliances (will be called "devices" hereinafter) which are connected to information appliances, may be utilized from the client terminals via the servers, while these devices are known as CD-ROM drives directly connected to the servers. However, users cannot easily operate the CD-ROM drives, for example, to easily eject CD-ROMs, so the users may feel that operations are inconvenience.

As system capable of solving the above-mentioned problems, for example, the below-mentioned systems have been proposed, that is, while so-called "shared devices" such as CD-ROM drives, which may be accessed from any information appliance on networks such as an intranet, are installed on the networks, the CD-ROM drives are utilized virtually on the server. For instance, U.S. Pat. No. 6,904,489B2 (referred to as "Patent Document 2" hereinafter), and US Patent Application Publication No. 20050240712 disclose such a utilization mode in which devices connected to a first appliance on such a network are utilized from a second appliance which is different from the first appliance on the network.

SUMMARY OF THE INVENTION

However, Patent Document 2 does not disclose such a device which is utilized from the appliance (namely, a first appliance) on the network to which the above-mentioned device has been connected. As a result, in accordance with the method disclosed in this Patent Document 2, the following configuration cannot be realized. That is, in this configuration, the device may be utilized from a server and a client provided in a configuration of a server/client system, namely, the device may be utilized from any of the above-mentioned first and second appliances.

Also, in the method described in Patent Document 3, in the configuration of the server/client system, the above-mentioned device cannot easily be used from both the client and the server, that is, from both the first and second appliances.

In thin client systems such as a screen transfer type thin client system, since actual processing apparatuses are severs, it is desirable that devices be connected to clients close at hand to users and that the connected devices can be easily utilized from servers. In other words, the below-mentioned process operations must be selectively carried out in switching mode, that is, connecting and disconnecting process operations of devices are carried out by clients; utilizing process operations of devices are independently carried out by clients; and utilizing process operations of devices are carried out by servers. Furthermore, in the thin client systems, transmitting/receiving operations of requests and responses between the clients and the servers, and transmitting/receiving operations of requests and responses between the servers and the devices must be exclusively controlled in order that these transmitting/receiving operations for the requests and responses can be correctly carried out. Also, these switching process operations should be performed without deteriorating usability for the users.

The present invention has been made in consideration of the above circumstances, and provides a device management system in which, when the server uses a device connected to the client in a server/client system, a security level within the server/client system is improved without compromising user convenience.

The present invention provides a device management system that has a filter provided to the client and a pseudo bus driver provided to the server, in a case where a device is connected to a client and the connected device is accessed from a server, in order that the device which is merely connected to the client without performing other operations can be used from the server.

The filter in the client exclusively controls client operations to the device connected to the client and server operations to the device. The pseudo bus driver in the server functions virtually as a device driver between a communication unit for the client and the application in the server.

Specifically, a device management system is provided that includes:
  a server which executes an application;
  a client which issues an instruction to the server to execute the application and accepts an execution result from the server; and
  an authentication server which authenticates the client,
  the server, the client, and the authentication server being coupled to each other via a network,
  the device management system controlling a device connected to the client from the server, in which:
  the client includes device manager which transmits and receives data to and from a device driver of a device connected to the client, and transmits and receives the data to and from the server;
  the authentication server includes device information holding/use right manager which manages a use right of each respective device within the device management system;
  the server includes virtual device manager which controls the transmission and reception of the data executed via the network between an application operated in the server and the device manager in accordance with the use right held in the device information holding/use right manager; and
  the device manager includes filter which exclusively controls the transmission and reception of the data between the device driver and the application of the client, and the transmission and reception of the data between the device driver and the server.

According to the invention, system security can be improved without compromising user convenience when a device is shared in a client/server architecture.

Additional advantages and novel features of the present invention may become apparent from descriptions of the present invention and accompanying drawings.

BRIEF DESCRIPTION OF THE DRAWINGS

In the accompanying drawings.

FIG. 2 is one example of the policy table of the first embodiment;
FIG. 3 shows one example of the device information table of the first embodiment;
FIG. 4 is one example of the user information database held by the authentication management server of the first embodiment;
FIG. 5 is one example of the PC usage management table held by the blade server of the first embodiment;
FIG. 10 is a flow diagram explaining operations for using a device according to the first embodiment;
FIG. 11 is one example of a log management view displayed by a management application.

DESCRIPTION OF THE EMBODIMENTS

Figure 1:
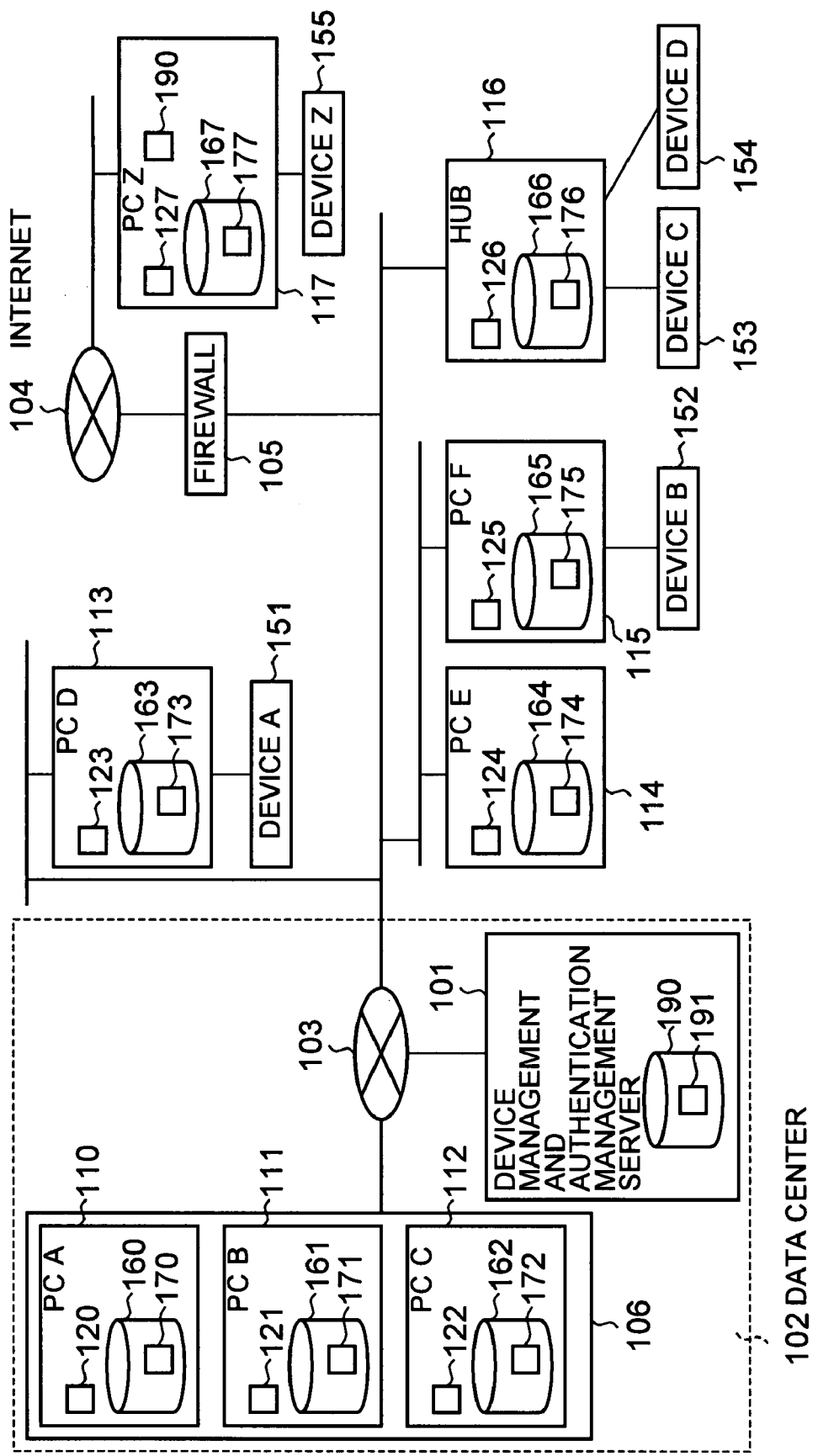
FIG. 1 is a block diagram of the device management system of the first embodiment.

Referring now to accompanying drawings, embodiments of the present invention will be described in detail. It should be understood that the same reference numerals indicated in the drawings will be employed for component elements having the same functions, and for convenience, detailed descriptions thereof are omitted.

First Embodiment

A first embodiment of the device management system according to the invention will be described with reference to the drawings.

FIG. 1 is a detailed block diagram of the device management system of the present embodiment. The device management system of the embodiment includes information center 102 including a device management and authentication management server 101, a network 103, and a blade server 106; and a client apparatus, such as a PC, coupled to the network 103 of the information center.

The information center 102 manages information instruments, and is an area where entering and leaving the center are usually controlled and the instruments installed therein are managed and monitored. The setup of the information center 102 is not limited to a specific location. For example, it may be located where a user uses a terminal such as a client apparatus, or may be remotely located therefrom. If the user uses the terminal in his/her office or the like, the information center 102 may be located in the building of the corporation that manages the user. If the user is a general consumer and uses a server of a service provider at home, hotel, street facility or the like, the information center 102 may be located in the building that is managed by an Internet service provider, server rental company, application service provider, or the like. The information center 102 may be an area where servers are collectively placed in a section of the user's home or office.

The device management and authentication management server 101 authenticates and manages devices and users, and is managed by an administrator of the information center 102. To achieve this, the device management and authentication management server 101 holds various data, which will be described later. The device management and authentication management server 101 is implemented as information processing apparatus comprising a communication interface, a CPU, and a memory, and performs various functions by the CPU executing programs stored in the memory. The programs which implement the functions may be termed codes or modules and also be obtained from other apparatuses via storage media or communication media including carrier waves, digital signals, or communication lines.

The blade server 106 is an apparatus including a plurality of servers or PCs therein and is provided with, although not shown, a power supply, an interface function which connects internal instruments and the network 103, a management apparatus, and the like. In the present embodiment, the blade server 106 will be described, by way of example, with respect to PC-A 110, PC-B 111, and PC-C 112 incorporated therein.

The configuration of the blade server 106 is, of course, not limited to the above, but the blade server 106 may be removably provided with other PCs or servers.

The network 103 couples the device management and authentication management server 101, PC-A 110, PC-B 111, PC-C 112, and the like to each other. In the present embodiment, the network 103 will be described as a network using TCP/IP as the communication protocol. The network 103 may, of course, communicate in accordance with other protocols.

Although the PC-A 110, PC-B 111, and PC-C 112 in the present embodiment are arranged in the blade server 106, they may not be located in the blade server 106 or even in the information center 102 as long as they reside on the network 103. Although the PC-A 110, PC-B 111, and PC-C 112 are described as PCs, they are not particularly limited thereto and may be servers, workstations, or built-in instruments as long as they are information instruments in which OS and applications stored on the storage media are executed into the memory and CPU.

Figure 13:
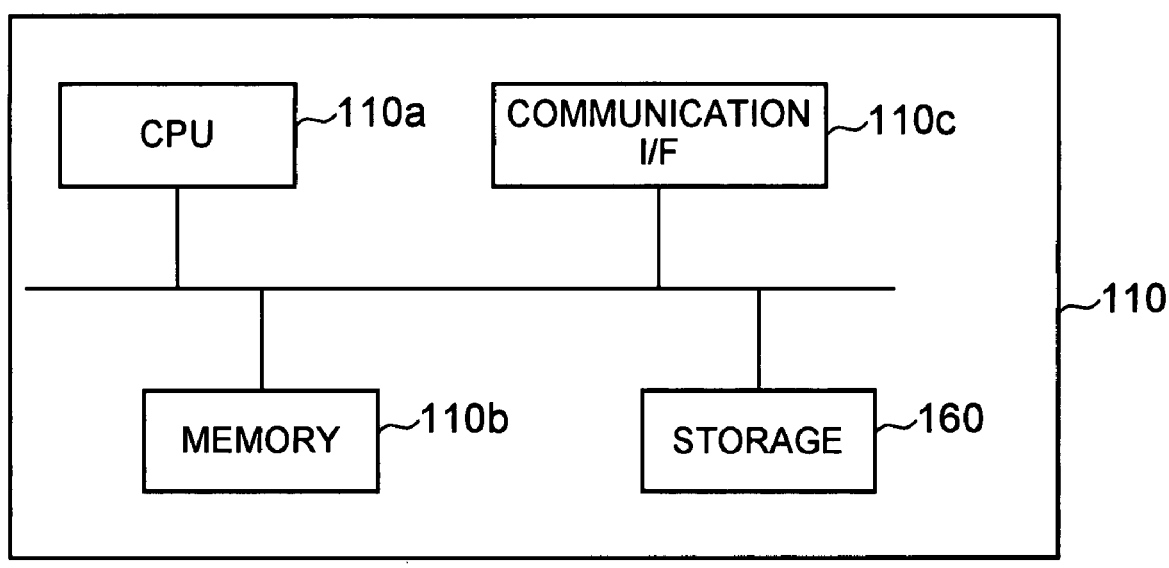
FIG. 13 is a hardware configuration view of the PC-A of the first embodiment.

FIG. 13 is a hardware configuration view of PC-A 110. PC-A 110 includes a storage unit 160 such as a hard disk drive or a flash memory, a CPU 110a, a memory 110b, and a communication interface 110c that is an interface for communication. In the PC-A 110, each of the processing portions is accomplished by the CPU 110a executing programs read into the memory 110b. The programs may also be obtained from another apparatus via storage media or communication media. The communication media include carriers, digital signals, or communication lines.

The PC-A 110 performs computing operations in accordance with instructions from the user. The computed results are displayed on a display, not shown, coupled to the PC-A 110 or the blade server 106. The storage unit 160 has a virtual device manager 120, which is described later, installed thereon by the administrator. When the PC-A 110 starts up, the OS is read from the storage unit 160 into the memory 110b, executed by the CPU 110a, and brought into the ready-to-use state, then the virtual device manager 120 is read into the memory 110b, and executed by the CPU 110a, and the virtual device brought into the ready-to-use state.

The term "virtual device manager" as used herein is a mechanism that makes a device coupled to the PC-A 110 over the network 103 or the like available as if the device were directly coupled to the PC-A 110. This mechanism makes a device coupled at a remote site available as in the case of a device physically coupled to the PC-A 110.

The virtual device manager 120 is a control software program which sends and receives data to and from a device A 151 coupled to the PC-A 110 over the network 103. The virtual device manager 120 functions to make the device A 151 virtually available as in the case of direct connection of the device A 151 to the server. Details of the virtual device manager 120 will be described later along with the operation of a device manager 123 that will be described later as well.

The data that the virtual device manager 120 has sent and received as well as the events that have occurred in the virtual device manager 120 are accumulated on the storage unit 160 as a log 170. Details of the log 170 will be described later.

The PC-B 111 and PC-C 112 are also configured similarly to the PC-A 110, and have storage units 161 and 162 respectively incorporated therein and virtual device managers 121 and 122 respectively installed therein, which operate after startup. The following description will be provided with respect to the PC-A 110, when it is not required to distinguish the PC-A 110, PC-B 111, and PC-C 112 from each other.

The storage units 160 to 162 may reside on the network 103 instead of in the blade server 106.

Instruments coupled to the network 103 as client apparatuses will be described.

In the present embodiment, the following description will be provided by way of example, with respect to cases in which a PC-D 113, PC-E 114, PC-F 115, hub 116, and PC-Z 117, that are coupled via a firewall 105 and the Internet 104, are provided as client apparatuses. The description will also be provided, by way of example, with respect to cases in which a device A 151 is coupled to the PC-D 113, a device B 152 is coupled to the PC-F 115, devices C 153 and D 154 are coupled to the hub 116, and a device Z 155 is coupled to the PC-Z 117. The way each of the clients and devices is coupled is not limited to the above configuration.

The PC-D 113 is information processing apparatus that performs computing operations in accordance with instructions from the user, uses the device as required, and presents the computed results to the user. Hardware configuration and the way each of the processing portions is implemented are basically similar to the PC-A 110. The PC-D 113 is coupled to the network 103 through a network interface, not shown. The PC-D 113 includes a storage unit 163 such as a hard disk drive or flash memory as well as a memory and CPU, not shown, and performs computing operations in accordance with instructions from the user. The computed results are displayed on a display, not shown, coupled to the PC-D 113. The instructions from the user are sent to the PC-D 113 through a user interface, such as a keyboard or mouse, not shown.

The storage unit 163 of the PC-D 113 has a device manager 123, which is described later, installed thereon. When the PC-D 113 starts up, the OS is read from the storage unit 163 into the memory, executed by the CPU, and brought into the ready-to-use state, then the device manager 123 is read into the memory, executed by the CPU, which makes the coupled device A 151 available from the PC-A 110 as a virtual device. The data or the like that the device manager 123 has sent and received are accumulated on the storage unit 163 as a log 173. Details of the log 173 will be described later.

The device manager 123 is a software program that allows the PC-D 113 to make the device A 151 available as a virtual device of the PC-A 110 of the blade server 106. Details of the device manager 123 will be described later along with the operation of the virtual device manager 120.

The PC-E 114, PC-F 115, and PC-Z 117 are basically configured similarly to the PC-D 113 and include storage units 164, 165, and 167 respectively. Device managers 124, 125, and 127 are implemented. These storage units store logs 174, 175, and 177 respectively.

The hub 116 is an apparatus from which a portion of a general PC's functions, such as a display screen, is removed. That is, the hub 116 is coupled to the network 103 through a network interface, not shown, and includes a storage unit 166 such as a hard disk drive or flash memory as well as a memory and CPU, not shown, to perform computing operations. Hardware configuration and the way each of the processing portions is implemented are basically similar to the PC-A 110. The hub 116 implements a device manager 126 and holds a log 176 on its storage unit 166. The following description will be provided with respect to the PC-D 113, when it is not required to distinguish the PC-D 113, PC-E 114, PC-F 115, PC-Z 117, and hub 116 from each other.

The device A 151 is a peripheral instrument, such as a CD-ROM drive or a printer, coupled to information instrument. The device A 151 is coupled to the PC-D 113 through an interface for device connection. Conceivable interfaces for device connection are those for connecting a device to a PC, such as a Universal Serial Bus (USB), a wireless USB, a near-field wireless communication interface, an infrared communication interface, a serial port interface, a parallel port interface, an IEEE 1394 interface, a PS/2® interface, and an audio interface. In the present embodiment, the description will be provided, by way of example, for cases in which the interface is a USB, but there is no limitation thereto.

Also, in the present system, the device A 151 is used as a virtual device through the device manager 123 installed in the PC-D 113 to which the device A 151 is coupled. Hereinafter, the device manager 123 is referred to as the device manager managing the device A 151.

The other devices B 152, C 153, and D 154 coupled to the PC and hub respectively are also peripheral instruments similar to the device A 151 and coupled to the PC or hub through a USB interface, by way of example in the present embodiment. The following description will be provided with respect to the device A 151, when it is not required to distinguish the devices A 151, B 152, C 153, and D 154 from each other.

Next, a description is made of a detailed configuration of the virtual device manager 120 of the PC-A 110, and another detailed configuration of the device manager 123 of the PC-D 113.

Figure 8:
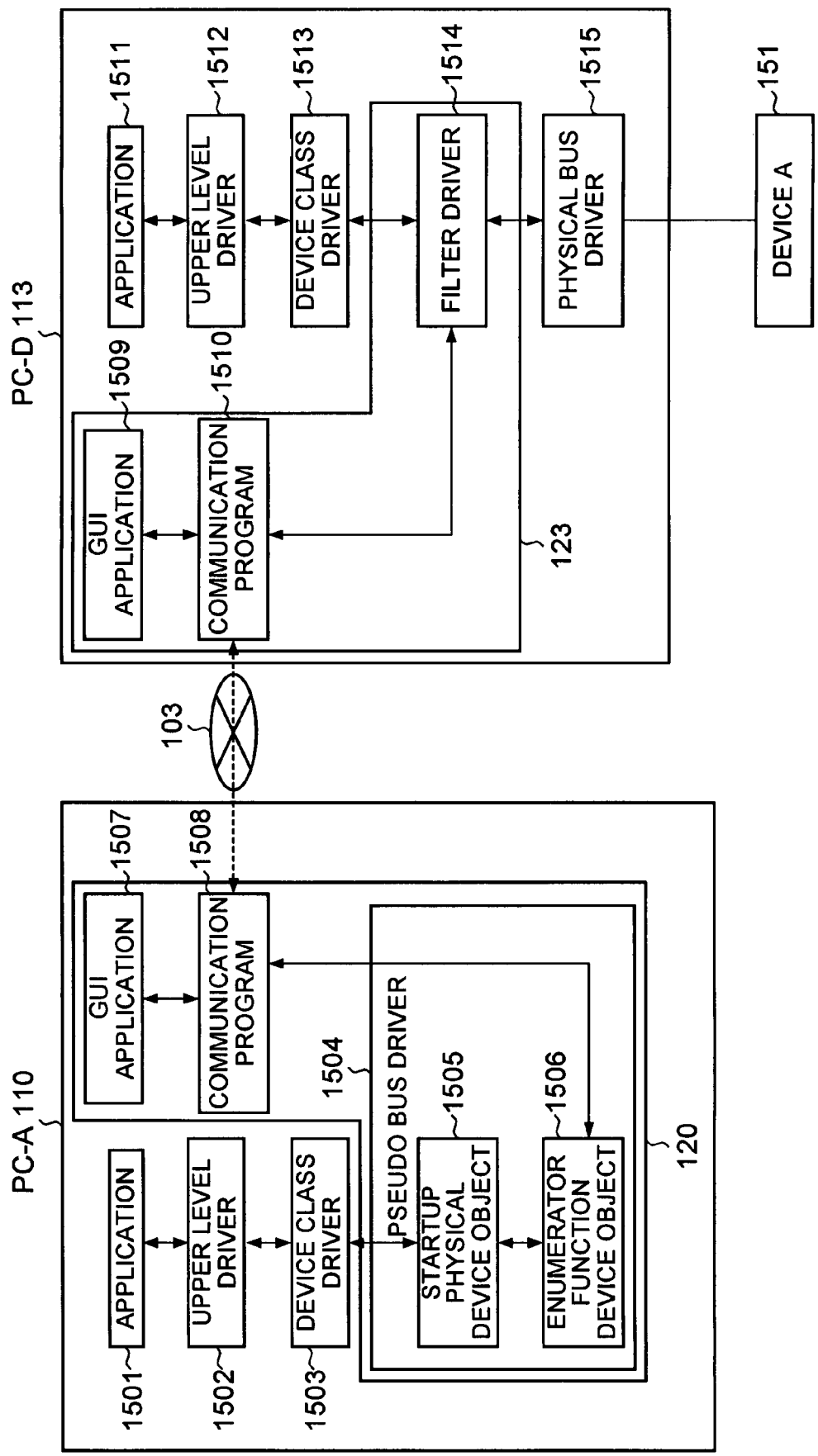
FIG. 8 is a view explaining a relationship between a device manager and a virtual device manager, and between a device driver and an application of the first embodiment.

FIG. 8 is a diagram for describing a relationship among the device manager 123, the virtual device manager 120, device drivers, and applications. In this drawing, a stack of software required in order to use the device A 151 in the PC-A 110 and the PC-D 113 will be mainly described.

The PC-D 113 is equipped with the device manager 123, a physical bus driver 1515, a device class driver 1513, an upper level driver 1512, and an application 1511. Also, the device manager 123 is provided with a filter driver 1514, a communication program 1510, and a GUI application 1509. It should be noted that with respect to the above-mentioned various drivers, such drivers will be referred to as "upper level drivers" located close to the application 1511, whereas drivers will be referred to as "lower level drivers" located close to the device A 151 which is connected to the PC-D 113. In the PC-D 113, the physical bus driver 1515, the filter driver 1514, the device class driver 1513, and the upper level driver 1512 have been stacked in this order from a lower level driver.

The PC-A 110 is equipped with a virtual device manager 120, a device class driver 1503, an upper level driver 1502, and an application 1501. The virtual device manager 120 is equipped with a pseudo bus driver 1504, a communication program 158, and a GUI application 1507. Also, the pseudo bus driver 1504 is equipped with a startup physical device object 1505, and a enumerator function device object 1506 (referred to as "enumerator 1506" hereinafter). In the PC-A 110, the pseudo bus driver 1504, the device class driver 1503, and the upper level driver 1502 have been stacked in this order from a lower level driver.

The physical bus driver 1515 is a program (namely, device driver) which controls communications to the device A 151 connected on a physical bus connected to the PC-D 113. The physical bus driver 1515 performs the below-mentioned various types of processes. The physical bus driver 1511 monitors status, connection, and disconnection of the device A 151 connected on the bus; notifies an interrupt issued from the device A 151 to the OS (Operating System) and the upper level device drivers; transmits, to the device A 151, data which is transferred from the filter driver 1514 provided in the device manager 123 which corresponds to a driver located at an upper level position, and so on. In this example, the physical bus is assumed as a universal serial bus (USB). The physical bus driver 1515 is prepared for each of the devices A 151 that are connected.

The device class driver 1513 is a program (that is, a device driver) which is provided according to the type of device A 151. The device class driver 1513 converts a request transmitted from the application 1511 via the upper level driver 1512 into an instruction and data, which are understandable by the device A 151, and then transmits the converted instruction and data via the device filter driver 1514 and the physical bus driver 1515. Also, the device class driver 1513 transmits responses with respect to an interrupt and an instruction, which are transmitted from the device A 151 to both the OS and the upper level drivers.

The upper level driver 1512 is a program (device driver) which plays a role capable of unifying one or more sets of the device drivers 1513 provided according to the type of device A 151. The upper level driver 1512 converts a request transmitted from the application 1511 into an instruction and data, which are understandable by the device class driver 1513, and then transmits the converted instruction and data to the device class driver 1513. Also, the upper level driver 1512 transmits responses with respect to interrupts and instructions transmitted from the device class driver 1513 and other device class drivers to the OS and the application 1511.

The filter driver 1514 is loaded into a memory of the PC-D 113 in cases where the device A 151 becomes valid as the device on the PC-D 113. While the filter driver 1514 is arranged between the physical bus driver 1515 and the device class driver 1513, this filter driver 1514 operates as a lower level driver for the device class driver 1513.

The filter driver 1514 transmits a request which is sent from either the communication program 1510 or the device class driver 1513 to the physical bus driver 1515, and transmits a response sent from the physical bus driver 1515 to either the communication program 1510 or the device class driver 1513. Also, the filter driver 1514 validates any of a request and a response between the communication program 1510 and the physical bus driver 1515, and any of a request and a response between the device class driver 1513 and the physical bus driver 1515, and furthermore, invalidates any of these requests and responses. The decision concerning validation of any of the request and the response is changed in accordance with an instruction of the GUI application 1507 and the GUI application 1509, or in response to timing of plug-in, plug-out, or ejection for the device A 151, or in response to timing of startup and termination of the communication program 1510. Here, "plug-in" implies that the device A 151 is connected to the physical bus of the PC-D 113; "plug-out" implies that the connection between the device A 151 and the PC-D 113 is disconnected; and "eject" implies that the device A 151 is removed from the PC-D 113, and the operation of the device A 151 is stopped in order to be removed.

In cases where the filter driver 1514 invalidates a request from the device driver 1513 to the physical bus driver 1515, when the relevant request is entered to the filter driver 1514, the filter driver 1514 returns a response that the request is invalidated to the device class driver 1513, or returns, to the device class driver 1513, a response containing an error decided in advance, such as "device is not valid", "medium is not inserted in device", and the like.

Similarly, in cases where the filter driver 1514 invalidates a request from the communication program 1510 to the physical bus driver 1515, when the relevant request is entered into the filter driver 1514, the filter driver 1514 returns a response that the request is invalidated to the communication program 1510, or returns another response to the communication program 1510, containing errors decided in advance, such as "device is not valid", "medium is not inserted to device", and the like.

The filter driver 1514 is loaded into the memory of the PC-D 113 in accordance with the device class driver 1513 corresponding to the device A 151. When there is a plurality of devices A 151 connected, the filter driver 1514 is prepared for each of these devices A 151, or each of the physical bus drivers 1515 is provided in accordance with the devices A 151.

The communication program 1510 installed on the PC-D 113 side has a function to perform communication with the communication program 1508 and the filter driver 1514. The communication program 1510 continuously monitors statuses of the communication program 1508 and the filter driver 1514, and transmits an abnormal signal to the communication program 1508 in cases where an abnormal event occurs in communication established with respect to the filter driver 1514. When the communication between the filter driver 1514 and the communication program 1510 does not recover within a predetermined time, this communication program 1510 further transmits the abnormal signal to the communication program 1508, and causes the GUI application 1509 to display status, and also, accepts an instruction of the user. For instance, in response to the instruction of the user, the communication program 1510 executes such a changing operation that the request issued from the device class driver 1513 is sent to the physical bus driver 1515, and interrupts the communication between the communication program 1510 and the filter driver 1514. Also, the communication program 1510 transmits an abnormal signal to the filter driver 1514 in cases where an abnormal event occurs in a communication established with respect to the communication program 1508. When the communication between the communication program 1508 and the communication program 1510 is not recovered within a certain time, this communication program 1510 further transmits the abnormal signal to the filter driver 1514, and causes the GUI application 1509 to display status, and also, accepts an instruction from the user. For example, in response to the instruction issued from the user, the communication program 1510 performs the below-mentioned processes. A request which deletes all of the enumerators 1506 and all of the startup physical device objects 1505 is transmitted to the communication program 1508, the communication program 1510 itself is ended, and so on. The communication program 1510 continuously communicates with the communication program 1508, and waits to accept plug-out, plug-in, and ejection notifications issued from devices connected to the PC-D 113. Upon receipt of notification about plug-in, plug-out, and ejections of the device A 151, the communication program 1508 issues notification to the communication program 1508 in order that a pseudo bus driver 1504 is operated in an appropriate manner.

The pseudo bus driver 1504 corresponds to a physical bus driver 1515 (to be described later) on the PC-D 113, and is a program (device driver) which controls communications with devices. The pseudo bus driver 1504 monitors status and shutting-off of connections of devices provided on the bus, notifies interrupts from a driver to the OS and an upper level device driver, and transmits data transferred from the upper level device driver to the device. The pseudo bus driver 1504 causes the device A 151 connected to the bus on the PC-D 113 from the application 1501 operated on the PC-A 110 to be handled similarly to the device connected to the bus of the PC-A 110. The pseudo bus driver 1504 causes the OS of the PC-A 110 to recognize the device A 151 connected to the PC-D 113 as a device which is connected to a bus which is recognized by the OS as the pseudo bus of the PC-A 110. With respect to the OS of the PC-A 110, the pseudo bus driver 1504 has a similar function to that of the above-mentioned bus of the PC-D 113. When the pseudo bus driver 1504 is loaded into the memory of the PC-A 110, the pseudo bus driver 1504 forms the enumerator function device object 1506 therein.

When the pseudo bus driver 1504 accepts such a notification which indicates that the device A 151 is in a plug-in condition via the communication program 1510, the pseudo bus driver 1504 produces the startup device object 1505 corresponding to the device relevant to the enumerator function device object 1506 so as to establish a condition such that the device A 151 can be utilized from the PC-A 110. Also, when the pseudo bus driver 1504 accepts a notification which indicates that the device A 151 is in a plug-out condition via the communication program 1510, the pseudo bus driver 1504 notifies the status of plug-out to the enumerator function device object 1506. When the pseudo bus driver 1504 accepts such a notification which indicates that the device A 151 has been ejected, this pseudo bus driver 1504 notifies ejection status to the enumerator function device object 1506.

Also, in cases where the startup physical device object 1505 is unloaded (may be abbreviated as "be deleted" hereinafter) from the memory of the PC-A 110, the pseudo bus driver 1504 notifies the deleted status to the PC-D 113 via the communication program 1508 and the communication program 1510. When an instruction that the pseudo bus driver 1504 is deleted is issued from the OS of the PC-A 110 to the pseudo bus driver 1504, after all of the startup physical device objects 1505 have been deleted, the enumerator 1506 and the pseudo bus driver 1504 itself are deleted. When an error happens to occur while the respective processes are being performed, the pseudo bus driver 1504 transmits content of the error to the communication program 1508. In cases where an abnormal event happens to occur when the error content is transmitted to the communication program 1508, the pseudo bus driver 1504 executes an initialization process, for example, all of the startup physical device objects 1505 are deleted, and it waits for a recovery of communication status with respect to the communication program 1508.

The enumerator function device object 1506 is a device object which is produced in the pseudo bus driver 1504. The enumerator function device object 1506 performs management in which the startup physical device object 1505 is produced, deleted, and the like (to be discussed later). Also, the enumerator function device object 1506 communicates with the communication program 1508. When the enumerator 1506 receives a notification indicating a plug-in status of the device A 151, and a parameter of the device A 151 under plug-in condition from the PC-D 113 via the communication program 1510 and the communication program 1508, and also from the pseudo bus driver 1504, the enumerator 1506 produces a startup device object 1505 by employing the accepted parameter. Further, when the enumerator 1506 receives notification indicating plug-out status, or an eject status of the device A 151 from the PC-D 113 via the communication program 1510 and the communication program 1508, the enumerator 1506 deletes the startup physical device object 1505 which has been produced in accordance with the device A 151 which has transmitted either the plug-out notification or the eject notification.

The startup physical device object 1505 is a driver which virtually operates the device A 151 from the virtual device driver 120. Every time the enumerator 1506 receives a notification that the device A 151 has brought into a plug-in condition via the communication program 1510 and the communication program 1508, the startup physical device object 1505 is produced. In other words, one startup physical device object 1505 is produced for one device which is connected to the PC-D 113 and controlled from the pseudo bus on the PC-A 110. As a consequence, the startup physical device object 1505 is constituted of one or more objects. The startup physical device objects 1505 are managed by the enumerator 1506 in a one-to-one correspondence relationship with respect to devices, by employing device IDs, serial numbers, and the like, which are sent from the PC-D 113 in response to plug-in operations of the device A 151 (to be described later).

The communication program 1508 installed on the PC-A 110 side realizes communication between the communication program 1510 and the pseudo bus driver 1504. The communication program 1508 continuously monitors statuses of the communication program 1510 and the pseudo bus driver 1504 and transmits an abnormal signal to the communication program 1510 in cases where an abnormal event occurs in communication established with respect to the pseudo bus driver 1504. When the communication between the pseudo bus driver 1504 and the communication program 1508 does not recover within a predetermined time, this communication program 1508 further transmits the abnormal signal to the communication program 1510. When the abnormal event occurs, the communication program 1508 causes the GUI application 1507 to display status, and also accepts an instruction from the user. For example, in response to the instruction issued from the user, the communication program 1508 performs the below-mentioned processes. An instruction which deletes all of the startup physical device objects 1505 and all of the pseudo bus drivers 1504 is transmitted to the OS, the communication program 1508 itself is ended, and so on. The communication program 1508 also transmits an abnormal signal to the pseudo bus driver 1504 in cases where an abnormal event occurs in communication established between the communication program 1510 and the communication program 1508. In cases where the communication between the communication program 1510 and the communication program 1508 has not recovered within a predetermined time, this communication program 1508 further transmits the abnormal signal to the pseudo bus driver 1504, and causes the GUI application 1507 to display status, and also, accepts an instruction of the user. For example, in response to the instruction issued from the user, the communication program 1508 performs the below-mentioned processes. An instruction which deletes all of the startup physical device objects 1505 and all of the pseudo bus drivers 1504 is transmitted to the OS of the PC-A 110, the communication program 1508 itself is ended, and so on. The communication program 1508 continuously communicates with the communication program 1510, and waits to accept notification about plug-out, plug-in, and ejection issued from devices connected to the PC-D 113.

It should also be noted that the device class driver 1503 and the upper level driver 1502 basically have similar functions of the same names as the device manager 123 (to be described later).

A policy table 1400, a device management table 200, and a user information database 300 held by the device management and authentication management server 101 will be described. The device management and authentication management server 101 in conjunction with the virtual device manager 120 and the device manager 123 control access to each of the devices.

The policy table 1400 has access policies registered thereon for the devices managed by the administrator in the present system. For example, usage permission for each device, usage permission depending on the client apparatus to which a device is coupled, and the like are registered in the policy table 1400. This table is pre-specified by the administrator or the like. The system administrator can freely change the policy table 1400. It is also possible to configure the system such that rules in the device information table 200 cannot be changed automatically but only manually by leaving the policy table 1400 unspecified. The administrator configures the policy table 1400 in accordance with policies that the administrator should specify for the system he/she manages.

FIG. 2 shows one example of the policy table 1400. As shown in this figure, for each policy, the policy number 1401, device name 1402, address of the connection application 1403, network interface ID of the connection application 1404, vendor ID 1405, product ID 1406, serial number 1407, device type 1408, exclusive control 1409, availability 1410, and usability ID 1411 are recorded in the policy table 1400. Other items may of course be recorded.

The policy number 1401 is an identification number that is automatically assigned to each policy when the administrator registers a policy in the policy table 1400. When the number of the instruments or devices available in the system increases or decreases, a record of the device information table 200, which will be described later, is created according to the policies registered in the policy table 1400. When the number of the instruments or devices that follow a plurality of policies increases or decreases in the system, these policies are applied in a predetermined order.

The device name 1402, address of the connection application 1403, network interface ID of the connection application 1404, vendor ID 1405, product ID 1406, serial number 1407, and device type 1408 have the same contents as those recorded in the device information table 200, which will be described later, and indicate information on the instrument or device. The administrator specifies relevant conditions of the device name, address of the connection application, network interface ID of the connection application, vendor ID, product ID, serial number, and device type for each policy. Details of these conditions will be described in the description of the device information table 200.

The exclusive control 1409 is a value that, when a user uses the device, defines whether or not to inhibit any other user from using the device. Specifiable values are "required", "possible", "not required", and "no inquiry (*)". Although "no inquiry (*)" is basically handled similarly to "not required", it may be configured to be automatically specified for each device type or class, where the class is the type of a device that operates through the same device driver (class driver), such as a keyboard, storage unit, and the like.

Availability 1410 is the response of the device management and authentication management server 101 when it is asked to give permission for the device. Specifiable values are "enabled", "inhibited", and "warning". A policy specified with "enabled" is the one that makes the relevant instrument or device automatically available to the user or users listed in the section of the usability ID 1411 that will be described later. A policy specified with "inhibited" is the one that makes the relevant instrument or device automatically unavailable to the user or users listed in the section of the usability ID 1411 that will be described later. A policy specified with "warning" is the one that, after displaying a warning, makes the relevant instrument or device automatically available to the user or users listed in the section of the usability ID 1411 that which will be described later. The warning to be displayed can be specified for each policy.

The symbol "*" in the figure means "no inquiry" (no definition). The device management and authentication management server 101 verifies whether the recorded information matches with the actual information.

For example, in FIG. 2, a policy 1 for the policy number 1401 specifies "no inquiry" for the device name 1402, address of the connection application 1403, network interface ID of the connection application 1404, serial number 1407, device type 1408. That is, when an inquiry is made for the policy for the device whose vendor ID 1405 is "1001" and product ID 1406 is "1001", the exclusive control 1409 is recorded as "not required", the availability 1410 is recorded as "enabled", and the usability ID 1411 is recorded as "20000001, 20000010, etc" in the device information table 200 regardless of the device name, address of the connection application, network interface ID of the connection application, serial number, and device type of the policy.

The policy 2 for the policy number 1401 automatically specifies "required" in the exclusive control section and "20000011" in the usability ID section only for a device whose vendor ID is "1105" and device type starts with "B Ltd."

The policy 3 for the policy number 1401 automatically displays "no inquiry" in the exclusive control section 1409 and "warning" in the availability section 1410 for a device coupled to the client apparatus whose address of the connection application 1403 is "192.168.1.1" and network interface ID of the connection application 1404 is "00:00:00:00:00:01", and specifies the device available to all users.

The policy n for the policy number 1401 specifies "inhibited" for all devices. That is, when a request is made for registering a device unregistered in the policy table 1400, the device management and authentication management server 101 refers to the sections labeled with n for the policy number 1401 and specifies the exclusive control 1409 with "not required" and the availability 1410 with "inhibited" in the device information table 200.

The device information table 200 will be described. The device information table 200 manages information necessary for managing access to each device coupled to the present system. Each record to be registered in the device information table 200 is created in accordance with various device identifying information (hereinafter referred to as "device information") sent from the device manager 123 along with a request (hereinafter referred to as "device connection request") for making the device that the device manager 123 manages sharable, plus a policy or policies registered in the policy table 1400. The virtual device manager 120 controls availability of each device using the device information table 200.

When a device has been coupled or removed, the device manager 123 sends, as the device information, at least information identifying the request-sending client apparatus on the network 103 (the IP address and MAC address in the present embodiment), information identifying the device of interest (the vendor ID, product ID, and serial number in the present embodiment), and information indicative of whether the device has been coupled or removed. The device management and authentication management server 101 creates a record in accordance with the policy table 1400 and registers it in the device information table 200.

When the client apparatus itself is removed from the network 103, information identifying the client apparatus and information indicative of the removal thereof are sent to the device management and authentication management server 101.

The device management and authentication management server 101 updates the device information table 200, for example, when the system configuration that the device management and authentication management server 101 manages has been changed, including when the number of the devices has increased or decreased, when a client apparatus has been removed, when the number of the users who use the system has increased or decreased, and when the network configuration has been changed; when records in the policy table 1400 have been changed; and when the device management and authentication management server 101 has received an instruction from the administrator for updating the device information table 200. Also, as described later, the status will be updated every predetermined period.

FIG. 3 shows one example of the device information table 200. As shown in the figure, the device information table 200 includes the device ID 201, device name 202, address of the connection application 203, network interface ID of the connection application 204, vendor ID 205, product ID 206, serial number 207, device type 208, exclusive control 209, status 210, usability ID 211, and user ID 212.

The device ID 201 uniquely identifies each device to be managed and is automatically created whenever a new registration request is made. It is a temporal ID that will likely change whenever the device management and authentication management server 101 or the device manager 123 starts or ends, whenever a device is inserted or removed, or the like.

The device name 202 is the name of the device by which the device is easily referred to, and pre-specified by the administrator or user. When specified by the administrator, the device name is registered in the policy table 1400. When a record of the device information table 200 is created, the device name is extracted from the policy table 1400 and registered. When specified by the user on the other hand, the device name is included in the device information, which is informed to the device management and authentication management server 101.

The address of the connection application 203 records the IP address of the client apparatus to which the device is coupled (PC-D 113 for the device A 151). This is sent as the device information. This address may change even during usage as appropriate, for example, when the client apparatus is moved from one subnet to another.

The network interface ID 204 records the number indicative of the network interface ID of the client apparatus to which the device is coupled (PC-D 113 for the device A 151). When the network uses the TCP/IP protocol as in the present embodiment, the Media Access Control (MAC) address is used as the network interface ID. Unlike the address of the connection application, the network interface ID 204 is unique to the instrument and will not change unless the instrument is changed.

The vendor ID 205, product ID 206, and serial number 207 are device identification numbers that have been preassigned to the device itself and obtained as the device information when the device is coupled to the client apparatus (PC-D 113 for the device A 151). These pieces of information are sent from the client apparatus to the device management and authentication management server 101 as the device information. Each device is identified by a set of the vendor ID 205, product ID 206, and serial number 207. The vendor ID and product ID are uniquely assigned for each vendor and product. The serial number is assigned individually to each product.

The device type 208 is the name that the vendor or administrator assigns for a user's understanding. When assigned by the vendor, the device type 208 is extracted from device information such as a descriptor, and included in the device information for notification. When assigned by the administrator on the other hand, it is pre-registered in the policy table 1400.

The exclusive control 209 is the definition information indicative of, when a user uses the device, whether or not to inhibit any other user from using the device. When the exclusive control 209 is specified as "required", exclusive control is provided for usage of the device and the device is protected from other users' access from the start to the completion of use of the device by the user. When the exclusive control 209 is specified as "possible", the device is protected from other users' access only when information is being sent or received to or from the device. When the exclusive control 209 is specified as "not required", exclusive control is not provided. This information is extracted from the policy table 1400 and registered.

The status 210 is the information indicative of the device usage status. The authentication management server 101 obtains this information by polling each coupled client apparatus every predetermined period. When the status 210 is "exclusively in use", it indicates that the user is using the device while exclusive control is provided. When the status 210 is "in use", it indicates that the user is using the device while exclusive control is not provided. When the status 210 is "in communication", it indicates that exclusive control is provided only during the communication and the user discontinues the exclusive usage of the device as soon as the communication ends. When the status 210 is "unknown", it indicates, for example, that the device manager 123 is unable to communicate without notification to the authentication management server 101. After the status 210 has become "unknown" and a fixed time has passed, the authentication management server 101 performs control to terminate the relevant device manager 123 as well as the device A 151 coupled to the PC-D 113 on which the relevant device manager 123 is installed. When the status 210 is "discoupled", it indicates that the virtual device manager 120 can communicate with the device manager 123, but the device manager 123 cannot communicate with the device A 151. When the status 210 is "not in use", it indicates that no client apparatus is using the device.

The usability ID 211 records the ID of the user or group who will be given permission for connection to the device of interest. This information is extracted from the policy table 1400. When a plurality of users or groups is given permission for connection to the device, IDs of all of the permission-holding users or groups are registered. The usability ID 211 may be not defined, that is, may have no registered IDs. If not defined, any user or group will be given permission for connection.

The user ID 212 records the ID of the user who is currently using the device of interest. The authentication management server 101 obtains this information by polling each coupled apparatus every predetermined period.

A user information database 300 held by the authentication management server 101 will be described. When a user requests connection to an instrument in the information center 102 from an instrument that is outside the information center 102 but coupled to the network 103, the database 300 is used to determine (authenticate) whether the connection-requesting user has acceptable user permission. This database is pre-registered by the administrator.

FIG. 4 is one example of the user information database 300 held by the authentication management server 101. As shown in the figure, the user information database 300 registers each of the following items for each user: the user ID 301, user name 302, the user's group 303, certificate 304, valid duration 305, authentication by certificate approval/denial 306, encryption and hash type 307, password 308, and password authenticity approval/denial 309.

The user ID 301 identifies the user and is preassigned for each user. It will not usually change unless the usage permission of the user changes. The user name 302 is a text string indicative of the name of the user. The user name 302 is used to display the usage information. The user's group 303 is the information indicative of the group the user belongs to. In the present embodiment, various usage permissions are arranged to be assigned on a group basis. The user's group 303 indicates the group having the rights that every user in that group is granted. One user may belong to a plurality of groups, that is, the user's group 303 may register a plurality of groups. The user's group may not be defined. When not defined, the user does not have any usage permissions.

The certificate 304 is the information identifying the public key certificate to be used to authenticate the user. The public key certificate recorded as the certificate 304 is required to have validity verifiable in the authentication management server 101. For example, the authentication management server 101 may be configured to have a certificate authority therein for issuance of certificates.

The valid duration 305 is the duration during which the user has a right to use a PC or device in the blade server 106. When the valid duration 305 is not defined, the user does not have a right to use a PC. The valid duration 305 can be expressed using year, month and day, or can be expressed in various forms, such as every Monday, 8:45 to 17:15 everyday, or the like. The valid duration 305 can be specified independent of the valid duration of the public key certificate shown on the certificate 304.

The authentication by certificate approval/denial 306 is the information indicative of whether the authentication by certificate is approved or denied. The encryption and hash type 307 is the information indicative of the type of the encryption and hash using admitted public key infrastructure for authentication. When the encryption and hash type 307 is not defined, the authentication management server 101 will accept any encryption and hash type. Nevertheless, authentication cannot be performed by a method that is not implemented in the client (the PC used by the user, for example) or the like. The password 308 is a password for password-based authentication. A hash value or encrypted information is recorded as the password 308. The password authenticity approval/denial 309 is the information indicative of whether or not the password can be used for authentication.

The blade server 106 checks the authentication information with the authentication management server 101 and obtains authentication if the user is granted a right with which the user can use a PC in the blade server 106 through authentication using a password based on the user information database 300 or public key infrastructure.

In the present embodiment, the authentication is performed in two phases by checking 1) whether or not the accessing user has access permission for the blade server 106, and 2) after the PC-A 110 in the blade server 106 has been assigned, whether or not the user has permission for using the resources of the PC-A 110 (programs and/or virtual devices). In either case, the user sends an authentication request including at least user authentication information to the blade server 106 or PC-A 110. The blade server 106 or PC-A 110 that received the authentication request accesses the authentication management server 101, and checks the authentication information with the record registered in the user information database 300 for authentication. The user authentication information herein is the user ID and password, or the signature corresponding to the public key information registered for each user.

A PC usage management table 400 used to manage the usage status of each PC in the information center 102 will be described. FIG. 5 is one example of the PC usage management table 400 held by the blade server 106.

The PC usage management table 400 registers, for each PC in the information center 102, the PC name 401, network name 402, IP address 403, MAC address 404, source terminal 405, source network name 406, source IP address 407, source MAC address 408, user ID 409, status 410, connection start time 411, connection termination time 412, and operation confirmation time 413.

The PC name 401 identifies the PC in the information center 102. A unique name is predefined for the PC name 401 and registered by the administrator. The network name 402 is used to identify the PC on the network. A unique name is predefined for the network name 402 and registered by the administrator. For each PC, the network name 402 and the PC name 401 may be the same or different.

The IP address 403 is the address that is assigned to each PC. The MAC address 404 is the address that is uniquely assigned to the network interface of each PC.

The source terminal 405 is the name of the current client apparatus that is remotely operating the PC in the information center 102. Again, a unique name is predefined for the source terminal 405 and registered by the administrator. The administrator can freely specify and change the name. When the PC in the information center 102 is not used by any client apparatus, the source terminal 405 is not defined. The source network name 406 is used to identify the source terminal 405 on the network 103. A unique name is predefined for the source network name 406 and registered by the administrator. The source terminal 405 and the source network name may be the same.

The source IP address 407 is the IP address of the client apparatus. The source MAC address 408 is the address that is uniquely assigned to the network interface of the client apparatus.

The user ID 409 is the user ID of the user who is using the client apparatus. The user ID 409 is not defined when the client apparatus is not used.

The status 410 is information indicative of whether or not the PC of interest is in use. Information recorded in the section of the status 410 includes the following three types: "in use", "checking", and "waiting". When the PC has the status 410 of "in use", it indicates that the PC is being used by the user having the ID registered in the user ID 409 section through the client apparatus identified by the source terminal 405. When the PC has the status 410 of "checking", it indicates that the authentication management server 101 is checking whether or not the PC is being used by the client apparatus or the checking process has not completed. When the PC has the status 410 of "waiting", it indicates that the client apparatus is waiting to use the PC, that is, the client apparatus is not using the PC.

The connection start time 411 is the time when the user identified by the user ID 409 starts operating the PC through the client apparatus identified by the source terminal 405. The connection termination time 412 is the time when the user identified by the user ID 409 stops operating the PC through the client apparatus identified by the source terminal 405. The operation confirmation time 413 is the time when the virtual device manager 120 last communicated with the authentication management server 101, for example, when the channel was created or deleted.

The blade server 106 updates this database whenever the usage status of each constituent PC changes.

A process of setting a device to a sharable state and sharing the device after the setting (hereinafter referred to as "device sharing process") in the device management system of the present embodiment will be described. The process will be described, by way of example, with respect to cases in which the user uses the client apparatus PC-D 113 to remotely operate the PC-A 110 that is a constituent instrument of the blade server 106 in the information center 102, and make the device A 151 coupled to the PC-D 113 sharable. Naturally, the same procedure of device sharing applies to other cases in which other user terminals, other constituent instruments of the blade server 106, or other devices are involved.

Here, the device sharing process constitutes processing to make the device A 151 exclusively useable, in the two states described below.

A first state is a state in which the device A 151 is useable from PC-D 113, but cannot be used from PC-A 110; and a second state is a state in which the device A 151 is useable from PC-A 110 via a network, but cannot be used from PC-D 110.

In the first state, an application operating on PC-A 110 cannot recognize a device, but a request from an application operating on PC-D 113 to the device A 151 is correctly transmitted to the device A 151, and a response from the device A 151 is returned.

In the second state, a request from an application operating on the PC-A 110 to the device A 151 is correctly transmitted to the device A 151, and a response from the device A 151 is returned. However, a request from an application operating on PC-D 113 to the device A 151 is not transmitted to the device, and a response including an error is returned from the device manager 123.

Switching with regard to whether the system operates in the first state or operates in the second state, is carried out by an instruction of the user. Furthermore, in cases in which communication between the device manager 123 and the virtual device manager 120 is shut off, the device manager 123 performs processing so that the system operates in the first state.

According to the device sharing process explained above, the user can use the device A 151 monopolistically (exclusively) from either PC-A 110 or PC-D 113. By processing in which exclusive control is performed on a request as described above, in cases in which the device A 151 performs sequence management of a request from an application, or in cases in which management of state transition of a device is performed by a device driver, the device A 151 does not cause a mistaken operation for a request from the device driver.

Figure 6:
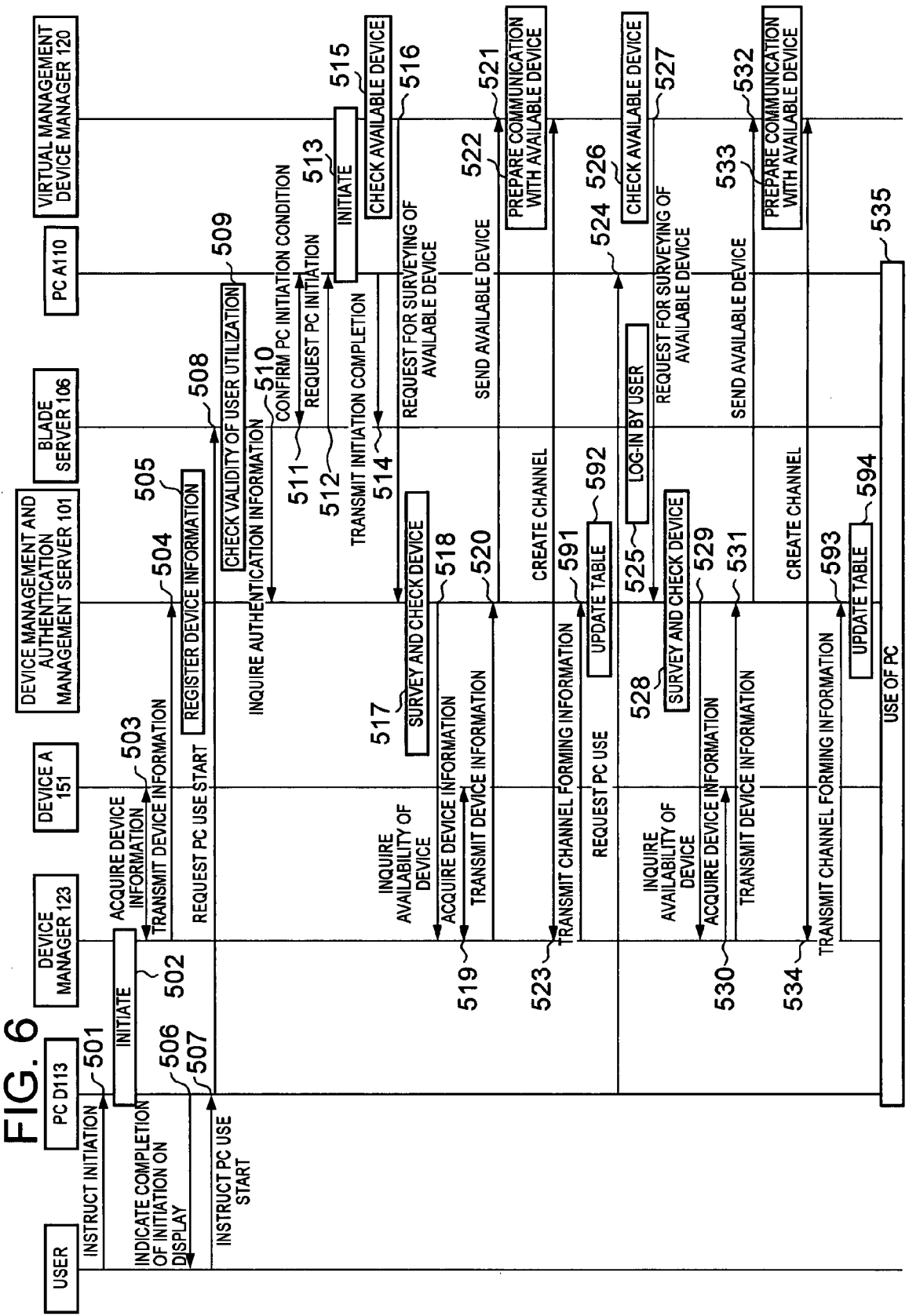
FIG. 6 is the process flow diagram of the device sharing process of the first embodiment.

FIG. 6 is a process flow diagram of the device sharing process in the above example.

The user instructs the PC-D 113 to start up (501). The PC-D 113 that received the startup instruction from the user loads the OS and/or applications from the storage unit 163 and starts them (502). The OS and/or applications may be loaded from a storage unit on the network. The device manager 123 also starts up at this time.

The device manager 123 that started up in Step 502 acquires information on the device A 151 coupled to the PC-D 113 (503). The information on the coupled device is acquired during startup in response to a request from the host (PC-D 113 in the present embodiment) through descriptor information, which is the data regarding information of the overall device, sent from the device to the host (504). The descriptor includes, for example, the code indicative of the device type, device class code, manufacturer/vendor ID of the device, product ID, and serial number. Based on the data of the device information acquired at Step 503, the PC-D 113 reads and operates the device driver that drives the device A 151. The device manager 123 implements the function of the driver or filter driver of the device that the device manager 123 manages (the device A 151 in this case), makes the device sharable in the system, and controls information that the device sends and receives.

The device manager 123 checks the operation of the device A 151 coupled to the PC-D 113, and then sends the authentication management server 101 the device information extracted from the device information of the device A 151 acquired at Step 503 along with a device connection request (504). When the authentication management server 101 receives the device connection request and the device information, it checks the information against the data in the policy table 1400 and registers the policy for the device-connection-requesting device in the device information management table 200 (505).

On the other hand, upon completion of the startup process of the PC-D 113, the PC-D 113 displays on the display that the startup process has completed (506). The user recognizes the completion of the startup process and gives an instruction that the user start using a constituent PC of the blade server 106 in the information center 102. In the present embodiment, the instruction to start usage is the entry of the user ID and password.

Upon receipt of the usage start instruction from the user (507), the PC-D 113 sends the received user authentication information to the blade server 106 as a request for using the blade server 106 (hereinafter referred to as "server usage start request") (508).

Upon receipt of the server usage start request, the blade server 106 authenticates the user by checking if the user has an appropriate usage permission for using the blade server 106 (509). Specifically, the blade server 106 sends the user ID and password included in the usage start request to the authentication management server 101 and asks for authentication (510). The authentication management server 101 checks the received user authentication information against the user information database for authentication and returns the result to the blade server 106. At this stage, authentication is performed to see whether or not the user has permission for accessing the blade server 106 itself.

If the blade server 106 receives a reply from the authentication management server 101 that authentication has successfully completed, the blade server 106 judges that the accessing user has been permitted to use the blade server 106 and determines which PC the user should use among the constituent PCs of the blade server 106. The PC may be assigned in any one of the following ways: the PC is appropriately assigned in order of usage, the PC is preassigned in one PC to one user relationship, or the PC is assigned in accordance with some rights granted to the user. The administrator determines which way of usage is taken. The following description is provided with respect to cases where the blade server 106 assigns the PC-A 110 to the accessing user. The same process applies to other cases where another PC is assigned.

After the blade server 106 has determined the PC-A 110 to be assigned to the PC-D 113, the blade server 106 checks the startup status of the PC-A 110 (511). If the PC-A 110 has not started up, a request is made to the PC-A 110 to start up (512). Upon startup in response to the transmitted request (513), the PC-A 110 notifies the blade server 106 of the information indicating that the startup has been completed (514). If the PC-A 110 has already started up, for example, if the PC-A 110 has a server function by which multiple users can simultaneously use the PC-A 110, and therefore is always on, the startup operations of the PC starting from Step 511 are not required.

The operational status of the PC is available by accessing the PC usage management table 400 and checking the status 410 for the relevant PC name 401. Upon startup, the assigned client apparatus is added in the PC usage management table 400 as the source terminal 405 for the relevant PC name 401.

On the other hand, after the PC-A 110 has started up, the virtual device manager 120 installed on the PC-A 110 checks available devices (515). Specifically, the virtual device manager 120 sends device management and authentication management server 101a request for surveying devices (hereinafter referred to as "available device survey request") available to the PC on which the virtual device manager 120 is running (PC-A 110 in the present example) (516).

Upon receipt of the available device survey request, the device management and authentication management server 101 surveys and checks the devices (517). Specifically, the device management and authentication management server 101 that received the available device survey request first checks whether or not a new device has been newly registered, and updates the device information table 200 that the device management and authentication management server 101 has already held (518). In response to the available device survey request, the device management and authentication management server 101 interrogates, for each device currently registered in the device information table 200, the device manager of each client apparatus such as a PC or hub to which each device is coupled, as to whether or not each registered device is still available (519).

The device manager of each client apparatus that has received an inquiry from the device management and authentication management server 101 returns the current availability of the device inquired about, to the device management and authentication management server 101 (520). Each device manager returns the current status, as the information indicative of availability, indicating that the device is discoupled if it has already been discoupled, or that the device is "exclusively in use", "in use", or "in communication" if the device is coupled. The device management and authentication management server 101 uses the information received from each of the device managers to update the device information table 200. When received the information that the device is discoupled, the device management and authentication management server 101 deletes the record for the device.

The device management and authentication management server 101 sends a device registered in the device information table 200 as a currently available device to the interrogating virtual device manager 120 (521).

Next, the virtual device manager 200 performs the device sharing process based on the information of the device information table 200. Since the virtual device manager 120 has not authenticated the user at this point of time, the virtual device manager 120 cannot perform the device sharing process for the device whose usage is limited to a usability ID in the device information table when checking an available device. Therefore, the virtual device manager 200 extracts a device that has been registered in the device information table 200 and whose usability ID 211 is not defined, and prepares the communication with the device, for example, by creating channels to the device (522, 523). The device management and authentication management server 101 may also be configured such that when the available device survey request is received from the virtual device manager 120 (516), the device management and authentication management server 101 will not make an inquiry of each device manager 123, but instead extract a device that has been registered in the device information table 200 at that point of time and whose usability ID 211 is not defined, and reply to the inquiring virtual device manager 120 (521). In this case, Steps 517 to 520 are not executed.

The channel is created in such a way that the virtual device manager 120 performs mutual authentication, key exchange, and creates an encrypted communication channel to the device manager on the client apparatus to which each device received as an available device at Step 521 is coupled, based on the IP addresses of both managers and the information obtained from the device management and authentication management server 101 (523).

The mutual authentication, as one example, is performed in such a way that the device management and authentication management server 101 send a pre-shared key in a safe manner to the device manager 123 when the device information is sent and received therebetween, and to the virtual device manager 120 when the device for use is returned, and performs authentication based on the pre-shared key. The mutual authentication method is not limited to this, but may include other methods in which the device management and authentication management server 101 can verify that a channel is created for a specific device manager and virtual device manager.

Upon completion of the mutual authentication, encrypting keys are exchanged for communicating ID information and data between the virtual device manager 120 and device manager. The encrypting keys exchanged at this point are used for subsequent communication between the device manager and virtual device manager 120. Thus, a third party cannot irregularly intercept the communication of the ID information and data. The encrypting key may be a fixed value, or may be arranged such that each key is nullified after one use or in a predetermined period and a new encrypting key is created.

In the present embodiment, when the channel has been created between the virtual device manager 120 and device manager 123, refer is made to the state in which the device managed by the manager 123 becomes a sharable device. Such a communication path (channel), which a third party can not intercept, allows the PC-A 110 to control the device A 151 as in the case where the device A 151 is directly coupled to the PC-A 110.

In other words, "device sharing" in the present embodiment means that the PC-A 110 operates in such a way that the PC-A 110 can perform processes as in cases where the device A 151 is directly coupled to the PC-A 110. For example, when "device sharing" is realized in the device A 151 coupled to the PC-D 113, the PC-A 110 can read or reset the communication scheme or descriptors set in the device A 151 through the device manager 123 and virtual device manager 120.

If the PC-A 110 has not used the device A 151 in the past, necessary device drivers are installed. In general, when a device is shared, the OS running on the PC-A 110 automatically recognizes the newly added device and installs device drivers necessary for the operation of the device. Such installation occurs when a device to be used with the PC-A 110 for the first time is shared between the PC-A 110 and other instruments. If the device has been used with the PC-A 110 in the past, necessary drivers have already been installed in the PC-A 110 and such installation does not occur.

If the OS running on the PC-A 110 does not have the above mentioned function by which a device is automatically recognized and necessary device drivers are installed, the administrator or user manually installs the device drivers and changes the setting of the PC-A 110 to make the device available.

When multiple users share the device A 151, each of the users may send a reset instruction or perform communication independent of each other. In such a situation, the device manager 123 is configured such that it changes the procedure so as not to accept a reset instruction, or it instead sends information that has already been acquired from the device A 151 and stored in the device manager 123. Specifically, the device manager 123 responds in a predefined manner to a specific communication from the virtual device manager 120.

The information on the channel created at this stage is sent to the device management and authentication management server 101 (591), which uses the received information to update the device information table 200 (592).

With the above procedure, the PC-A 110 becomes available to the user of the PC-D 113.

Next, the user requests to use the PC-A 110 through the PC-D 113. That is, when the instruction from the user is received indicating that the user would use the PC-A 110, the PC-D 113 creates a request for using the PC (hereinafter referred to as "PC usage request") and sends it to the PC-A 110 (524). This PC usage request includes information identifying the user, for example, the user ID and password.

The PC-A 110 receives the PC usage request and performs a login operation (525). In the login operation, the PC-A 110 first sends information identifying the user included in the PC usage request to the device management and authentication management server 101. The device management and authentication management server 101 compares the received information identifying the user with the information stored in the user information database 300, authenticates the user, and returns the result to the PC-A 110. The PC-A 110 may also be configured to hold in advance, among the items in the user information database 300, only necessary items for identifying the user at the time of login, and to perform authentication at the time of login in the PC-A 110.

Next, the virtual device manager 120 checks available devices. At this stage, the virtual device manager 120 extracts devices available to the logged-in users. The procedure for extracting available devices is basically similar to that described above at Step 516. The ID of the logged-in user may also be sent to the device management and authentication management server 101 at the time of the request, and the device management and authentication management server 101 may return only the devices registered as having the ID of the user as the usability ID.

As in the processes above, the device management and authentication management server 101, for each device registered in the device information table 200, makes an inquiry of the device manager of the client apparatus for the latest information as to which each device is coupled, receives a reply, updates the device information table 200, and sends a reply to the inquiring virtual device manager 120 (529 to 532). As in the above description, the device management and authentication management server 101 may also be configured to respond to the available device survey request, refer to the device information table 200, and return the devices currently registered as available to the user, to the inquiring virtual device manager 120 (532).

In checking of the first available device (516 to 521), since the user was not identified, the sharing process could not be performed, i.e., the communication path could not be established for the devices whose usage was limited to the usability IDs. However, after the user logged in (525), the devices whose usability IDs include the ID of the user or the group to which the user belongs, become available. Therefore, as in the description above, a communication path (channel) is established for the new device that has become useable at this point of time (533 to 534).

A configuration is also possible in which in the preparatory stage for communicating with the available devices (533), a list of available devices is displayed on the screen of the PC-A 110 or PC-D 113, or a screen that the administrator in the information center 102 can recognize. In this case, a list of the currently shared devices, connectable devices, and the like will be displayed on these screens. For the devices that were in the shared device list at the last usage completion time held by the virtual device manager 120 and that are currently available, it is possible to create a channel, i.e., share the devices without any user instructions. A configuration is possible in which the administrator or user can specify whether the sharing setting for a sharable device is specified with or without user instructions.

The information on the created channel is sent to the device management and authentication management server 101 (593). The device management and authentication management server 101 updates the device information table 200 based on the received information on the channel (594). After that, use of the PC-A 110 is initiated (535).

Herein, the device information table held by the device management and authentication management server 101 is continually updated to the latest state by repeating available device checking, available device survey request, survey and checking of devices, device availability inquiry, device information acquisition, device information transmission/available device reply (526 to 534), channel creation information transmission 593, and table update 594 during the use of the PC (535) as appropriate.

The available device checking by the virtual device manager 120 after the user has logged in is desirably performed on a regular basis. The virtual device manager 120 regularly checks the device information table 200 to check whether status changes have changed the device shareability.

On the other hand, whenever the states of the devices change, for example, when the state of device connection changes, when the status changes, and the like, the device manager 120 notifies the device management and authentication management server 101 to update the device information table 200 to reflect the information indicative of the states after the changes.

The device manager 123 and virtual device manager 120 operate and communicate with each other through the above processes, allowing the device A 151 to operate as the device of the PC-A 110. That is, device sharing is realized for the device A 151.

Figure 7:
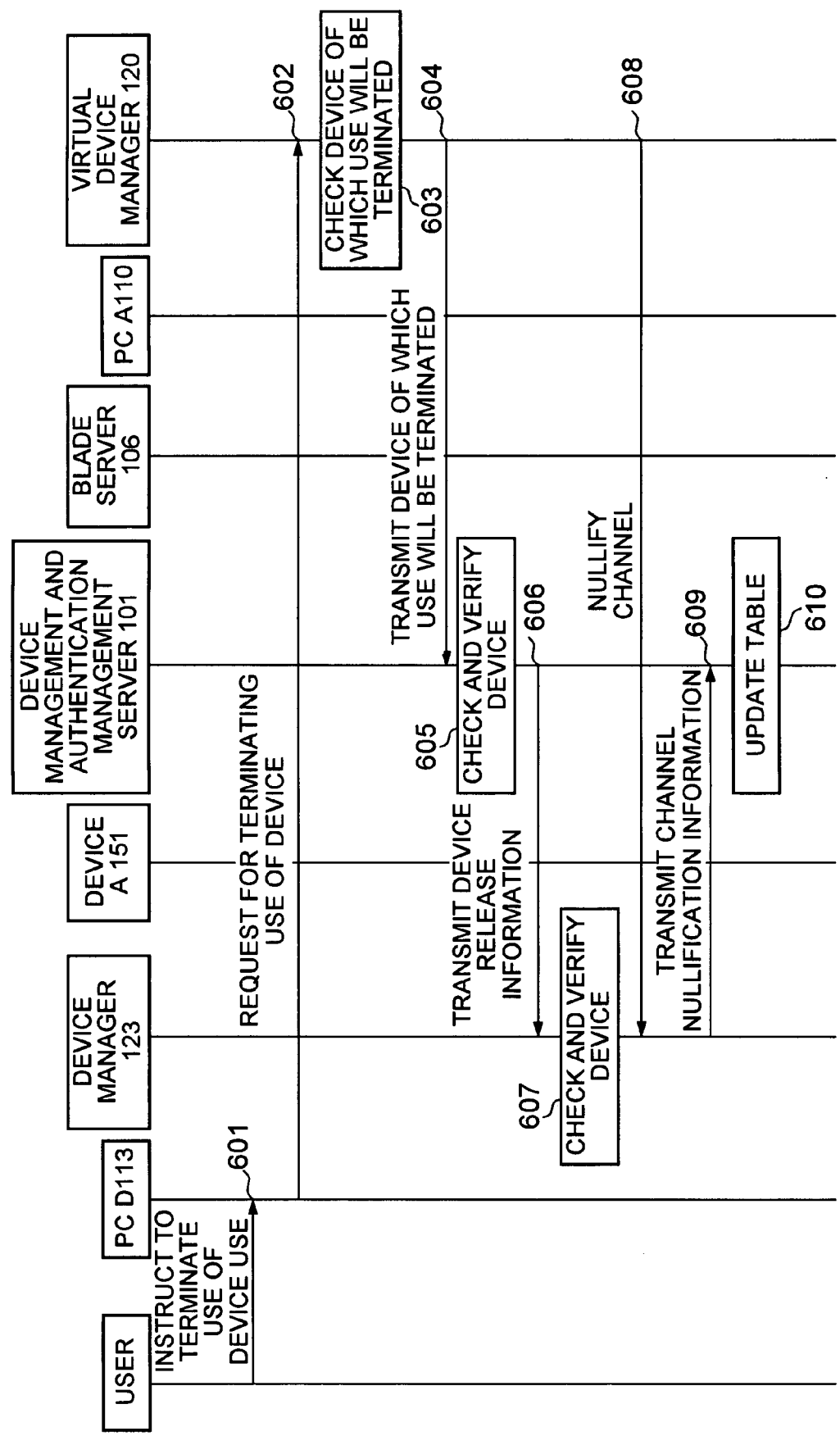
FIG. 7 is the process flow diagram when terminating the device sharing process of the first embodiment.

The processes at the completion of device sharing in the device management system according to the present embodiment will be described. FIG. 7 is a process flow diagram at the completion of device sharing according to the present embodiment.

As shown in the figure, the user uses the PC-D 113 to remotely operate the PC-A 110, terminates usage of the device A 151, and releases the device A 151 to other users.

The user instructs the PC-D 113 to terminate usage of the device (601). When the user instructs the PC-D 113 to terminate usage of the device, the PC-D 113 sends a request for terminating usage of the device (hereinafter referred to as "device usage termination request") to the virtual device manager 120 (602). Upon receipt of the device usage termination request, the virtual device manager 120 checks the device whose usage is to be terminated by the user (603).

Specifically, the virtual device manager 120 judges whether usage of the device at the PC-A 110 may be terminated.

For example, if an application running on the PC-A 110 or any other client apparatus is using the device to which a usage termination request is made, usage of the device cannot be terminated. In this case, the completion process should wait until the application or other client apparatus terminates usage of the device to which a usage completion request is made. In this case, the PC-D 113 is notified that its instruction to terminate the device cannot be carried out. The PC-D 113 notifies the user of the received notification by means of a display or the like.

This notification need not necessarily be made, and, for example, notification may be made only if usage is not terminated even after waiting longer than a predetermined time. If usage termination is possible when checking the device whose usage is to be terminated (603), device usage termination transmission, which is a notification that usage of the device is terminated, along with the information identifying the device, is made to the device management and authentication management server 101 (604).

Next, the device management and authentication management server 101 checks and verifies the device in response to the device usage termination transmission (605). Specifically, device release information transmission indicating that usage of the specified device has been terminated is made to the device manager 123 which has requested termination of usage of the device (606).

The device manager 123 checks and verifies the device (607). At this stage, the checking includes examining whether or not there is a response from the device. If not, the status of the relevant device in the device information table 200 is set to "unknown".

On the other hand, if a normal response is returned from the device, the device manager 123 nullifies the channel established to the virtual device manager 120 (608). If the channel has been successfully nullified, the device manager 123 sends the device management and authentication management server 101 channel nullification information indicating that the channel has been nullified (609).

Upon receipt of the channel nullification information, the device management and authentication management server 101 updates the device information table 200 (610). That is, for the device whose channel has been nullified at this point of time, the device management and authentication management server 101 changes the status 210 in the device information table 200, for example, from "exclusively in use", "in use", "in communication", or the like to "not in use".

The device management and authentication management server 101, device manager 123, and virtual device manager 120 record the data sent or received in the sequence of operations described with reference to FIGS. 6 and 7 on the storage units 190, 163, and 160 as logs 191, 173, and 170 respectively.

Next, a detailed description is made of processes executed in the pseudo bus driver 1504 and the communication program 1508 provided on the PC-A 110 side, and in the communication program 1510 and the filter driver 1514 provided on the PC-D 113 side in the device sharing processes of the device management system according to the first embodiment.

Figure 14:
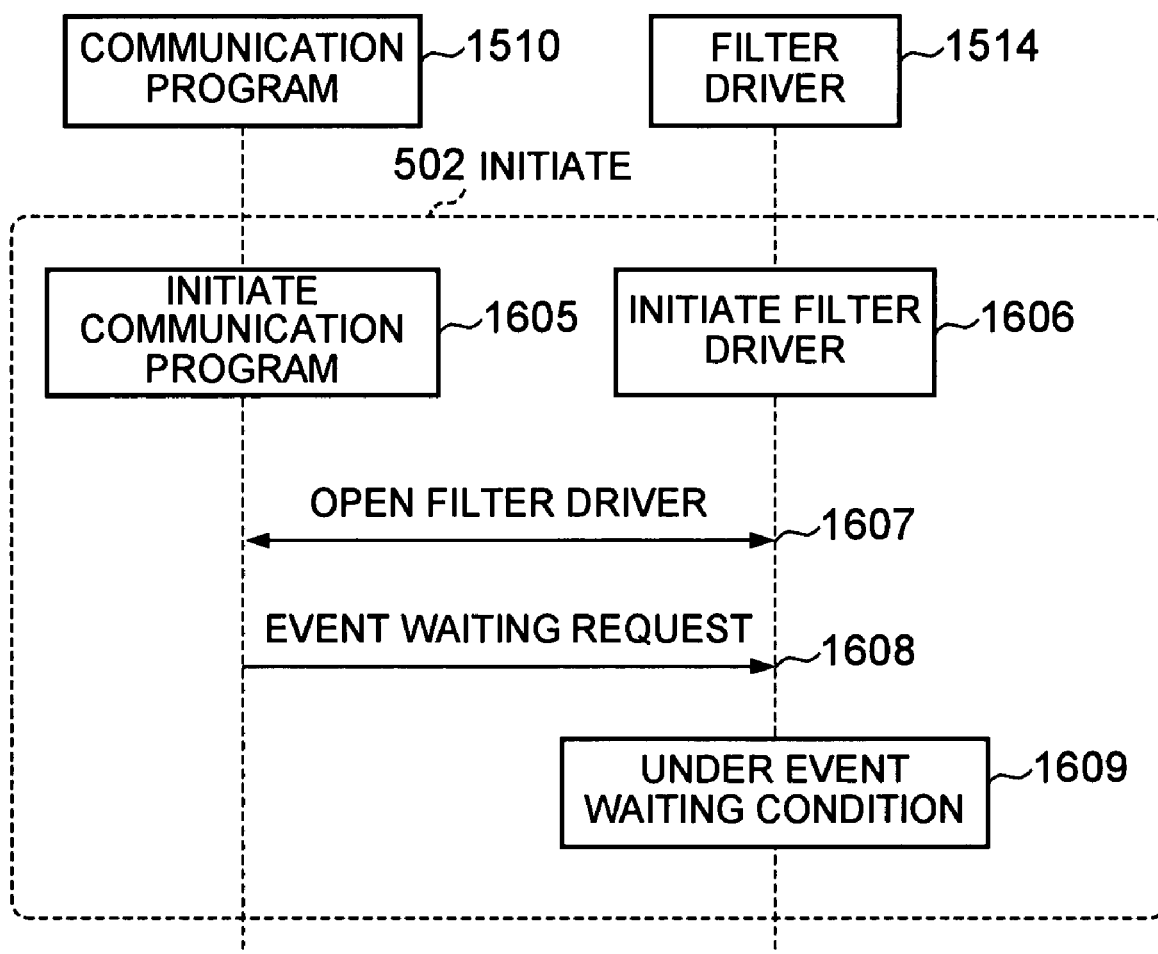
FIG. 14 is an explanatory diagram of an initiating process when device sharing processes of a filter driver and a communication program according to the first embodiment are performed.

FIG. 14 is a diagram for describing processes of both the filter driver 1514 and the communication program 1510 when the PC-D 113 is initiated (502 of FIG. 6) within the device sharing process of the first embodiment.

Upon receipt of an instruction for initiating the PC-D 113 from the user, the device manager 123 firstly loads the communication program 1510 into the memory of the PC-D 113 so as to initiate the loaded communication program 1510 (1605). Also, the device manager 123 similarly initiates the filter driver 1514 (1606). The communication program 1510 performs an open process of the filter driver 1514 (1607), so the filter driver 1514 is brought into an available condition from the communication program 1510. Next, an event waiting request is transmitted from the communication program 1510 to the filter driver 1514 (1608), and thus the filter driver 1514 is brought into an event waiting condition (1609).

Under the event waiting condition, the filter driver 1514 can transmit an interrupt issued from the device A 151 to the communication program 1510, and the communication program 1510 can transmit an instruction to the filter driver 1514. It should be noted that under the event waiting condition, since the filter driver 1514 reads data saved on the PC-D 113, or receives an instruction of the user entered from the GUI application 1509 via the communication application 1510, it is possible to make a setting such that the interrupt issued from the device A 151 is transmitted to the device class driver 1513. When the setting is such that the interrupt is transmitted to the device class driver 1513, the device A 151 can be directly operated by the PC-D 113 after the initiation (502) of FIG. 6 is performed. In this case, when the communication program 1510 fails in opening the filter driver 1514, the communication program 1510 notifies a message such that the communication program 1510 fails in opening the filter driver 1514 to the GUI application 1509, and records error information in a log stored in the PC-D 113, and then reports the error to the authentication management server 101. Upon receipt of notification that the communication program 1510 has failed in opening of the filter driver 1514, the GUI application 1509 causes a screen indicating this to be displayed on a display apparatus (not shown).

Figure 15:
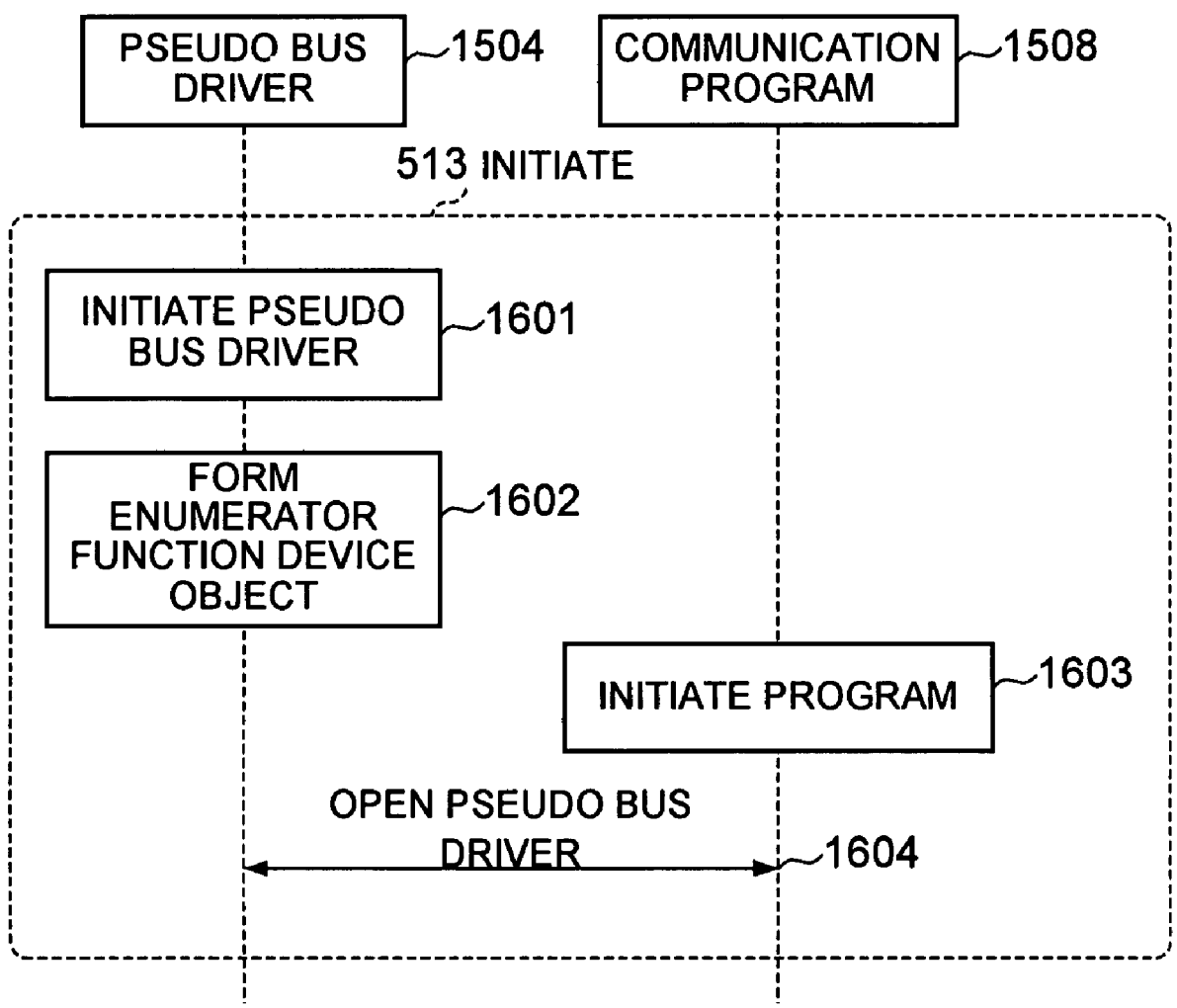
FIG. 15 is an explanatory diagram of an initiating process when device sharing processes of a pseudo bus driver and a communication program according to the first embodiment are performed.

Next, a description is made of processes executed in the pseudo bus driver 1504 and the communication program 1508 when the PC-A 110 is initiated (513 of FIG. 6). FIG. 15 is a diagram for describing processes of both the pseudo bus driver 1504 and the communication program 1508 when the PC-A 110 is initiated (513 of FIG. 6) within the device sharing process of the first embodiment.

Upon receipt of an instruction for initiating the PC-A 110 from the user, the virtual device manager 120 firstly loads the pseudo bus driver 1504 into the memory of the PC-A 110 (1601). Next, the pseudo bus driver 1504 forms therein the enumerator 1506 (1602). Subsequently, the virtual device manager 120 loads the communication program 1603 into the memory of the PC-A 110 so as to initiate the loaded communication program 1603 (1603). The communication program 1508 performs an opening process of the pseudo bus driver 1504 (1604), so the pseudo bus driver 1504 is brought into an available condition from the communication program 1508. In this case, when the communication program 1508 fails in opening of the pseudo bus driver 1504, the communication program 1508 notifies the GUI application 1507 that the communication program 1508 has failed in opening the pseudo bus driver 1504, records error information in a log stored in the PC-A 110, and then reports the error to the authentication management server 101. Upon receipt of notification that the communication program 1508 has failed in opening the filter driver 1514, the GUI application 1509 causes a screen indicative of this notification to be displayed on a display apparatus (not shown).

Figure 16:
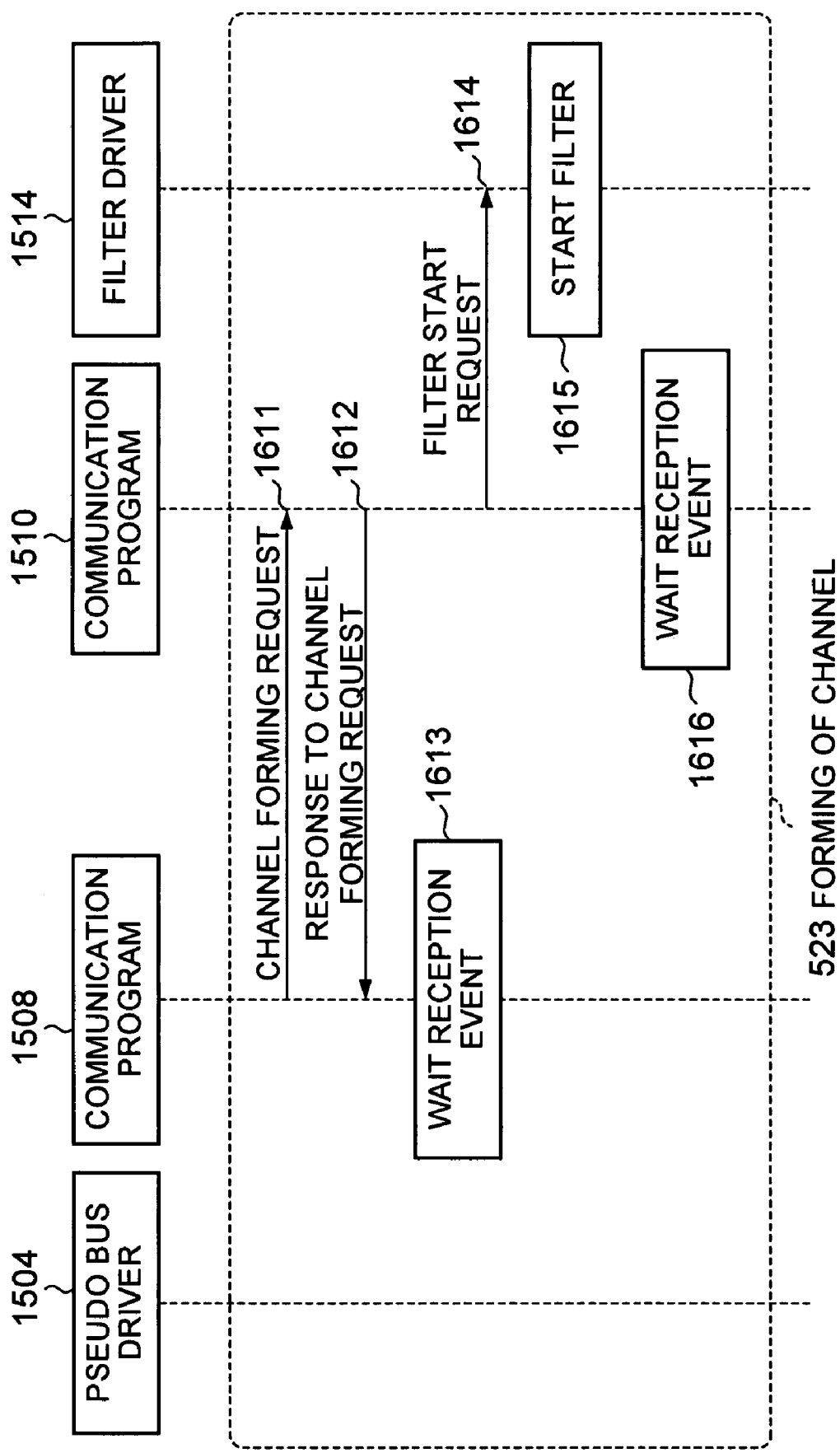
FIG. 16 is an explanatory diagram of processes executed when a channel is formed in the pseudo bus driver, the communication program, and the filter driver according to the first embodiment.

Next, a description is made of processes for forming a channel between the virtual device manager 120 of the PC-A 110 and the device manager 123 of the PC-D 113 by the pseudo bus driver 1504, the communication program 1508, the communication program 1510, and the filter driver 1514 in forming of the channel (523 and 534 of FIG. 6). FIG. 16 is a diagram for describing processes of the pseudo bus driver 1504, the communication program 1508, the communication program 1510, and the filter driver 1514 when the channel is formed in the device sharing process of the first embodiment.

When a channel is formed, the communication program 1508 firstly transmits a channel forming request to the communication program 1510 (1611). Next, the communication program 1510 sends an answer in response to the channel forming request (1612). In the channel forming request 1611, information is contained which is used to select a key utilized in an encryption communication executed between the communication program 1508 and the communication program 1510. Also, in the response 1612 to the channel forming request, information is contained which is used to determine a key utilized in an encrypted communication executed between the communication program 1508 and the communication program 1510.

After the response 1612 to the channel forming request and the channel forming request 1611 are transmitted and received, both the communication program 1508 and the communication program 1510 forms a channel (encrypted communication path) so that even when communication contents of the parties is intercepted, the communication contents are not disclosed, and communication is commenced. It should also be understood that as encryption key information employed in the channel forming request 1611 and the response 1612 to the channel forming request, the below-mentioned information may be alternatively employed. That is, encryption key information independently formed by the communication program 1508 and the communication program 1510 may be employed; encryption key information which is independently acquired by the GUI application 1507 and the GUI application 1509 may be employed; encryption key information which has already been saved in either the PC-A 110 or the PC-D 113 may be employed; and also, encryption key information which is produced by the authentication management server 101, and the like, may be employed.

After the channel forming request 1611 and the response 1612 have been transmitted and received, the communication program 1508 is brought into a reception event waiting condition (1613). Also, the communication program 1510 transmits a filter start request 1614 to the filter driver 1514. After the filter driver 1514 receives the filter start request, a filter process is commenced (1615), and the filter driver 1514 may cause that data of the device A 151 inputted and outputted via the physical bus driver 1515 can be exclusively handled by the communication program 1510. Next, the communication program 1510 is brought into a reception event waiting (1616) condition.

In this case, an initializing process of the device A 151 when the filter driver 1514 receives a filter start request, and thus commences a filter process (1615) will now be described.

When the filter process is commenced, a request issued from the device class driver 1503 is transmitted via the filter driver 1514 to the device A 151, so the device A 151 can be used by the PC-A 110. When the filter driver 1514 receives the filter start request, if the device A 151 is being used by the PC-D 113, then confliction of processes may occur. In order to avoid this process confliction, in the device management system according to the first embodiment, when the filter driver 1514 commences the filter process, a canceling process of the request issued from the PC-D 113 and the initializing process of the device A 151 are carried out in the below-mentioned manner, so the device management system is managed in a manner such that no confliction occurs in the request issued from the PC-A 110 and the request issued from the PC-D 113. Detailed contents of the processes will be described as follows.

Figure 22:
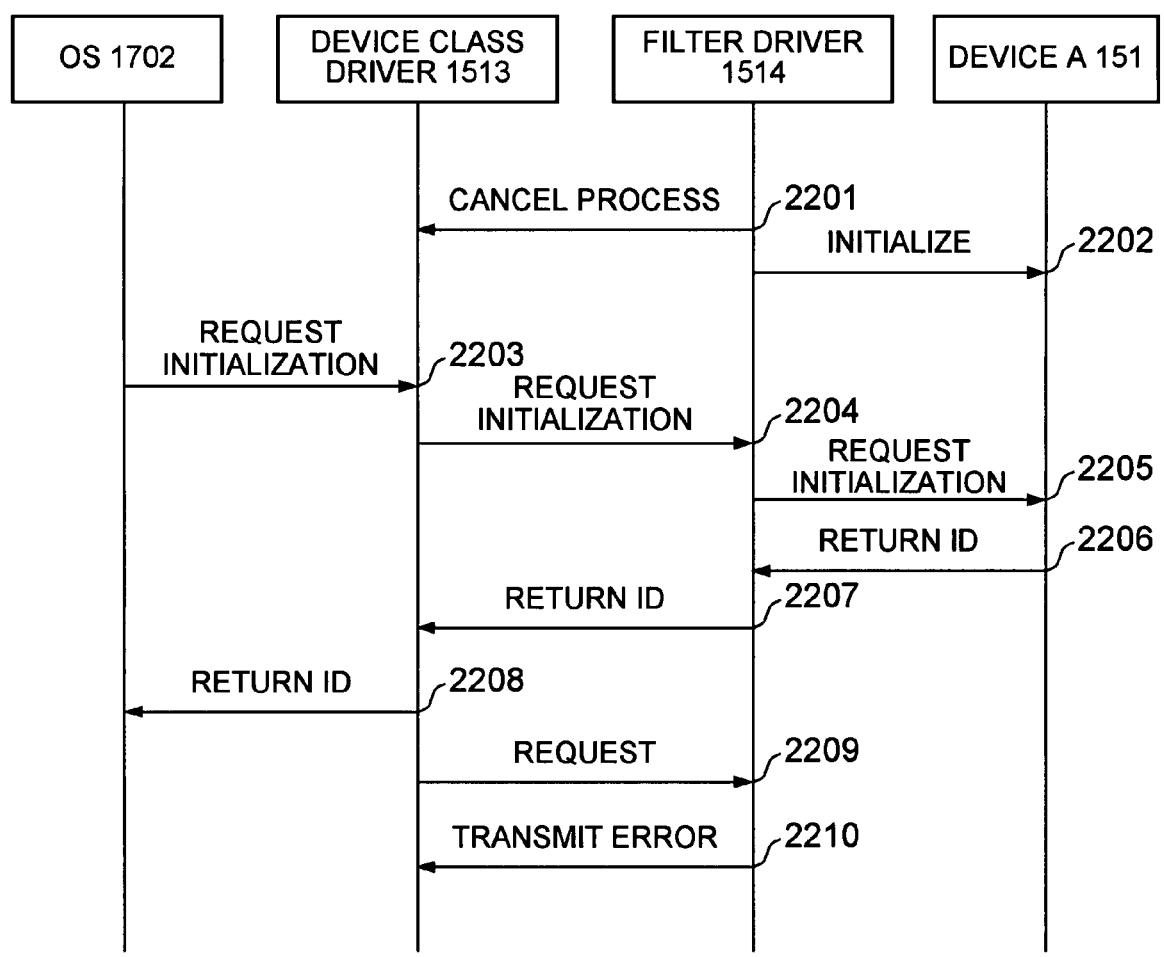
FIG. 22 indicates processes and a communication flow among the respective drivers when filtering is commenced in the device management device of the first embodiment.

FIG. 22 is a flow diagram for describing processes and communications of the OS and the device drivers when the filter process is commenced in the device management system according to the first embodiment.

When a filter start request 1704 is received so as to start a filter process, the filter driver 1514 transmits a canceling request to the device class driver 1513 in order to perform a cancel process of a request whose process has not yet been completed, among requests which have been already issued with respect to the device A 151 (2201).

If canceling processes for all of the issued requests are completed, then the filter driver 1514 initializes the device A 151 in order that the device A 151 can respond to a request transmitted from the communication program 1510 (2202).

The initialization is carried out by methods such as transmitting, to the OS 1702, notification that the device A 151 is inserted or extracted, issuing an instruction to revalidate the device A 151, after it has being once invalidated, and thereafter, this device A 151 is newly validated, or the like.

Since the filter driver 1514 performs the above-mentioned initialization, a process is carried out on the PC-D 113, which is similar to a process executed in the case where the device A 151 is cut off from the PC-D 113, and thereafter is again connected to the PC-D 113. Concretely speaking, a request for data such as ID (initializing request) is transmitted from the OS 1702 via the device class driver 1513 to the device A 151 (2203 to 2205). The device A 151 transmits answers with respect to all of the requests for the data such as IDs with respect to the device class driver 1513 (2206 to 2208). Alternatively, the device management system may be arranged as follows. That is, when the filter driver 1514 receives the initializing request, the filter driver 1514 may transmit data, such as the ID of the device A 151 which has been saved, to the device class driver 1513 as the response to the initializing request, without transmitting the received initializing request to the device A 151. It should be understood that the data such as the ID of the device A 151 which has been saved in the filter driver 1514 is data which was acquired in the preceding plug-in process.

In cases where after the process of the initializing request has been completed, a request for the device A 151 is transmitted from the device class driver 1513 (2209), the filter driver 1514 sends error data to the device class driver 1513, while the error data indicates that although the device A 151 is present, the process cannot be carried out (2210). This error data corresponds to, for instance, "appropriate medium is not yet inserted in device A 151", or "device A 151 is under preparation", namely, a message is selected corresponding to a manufacturing source and type of the device A 151.

After the process 2210 is carried out, with regard to a request transmitted from the device class driver 1513, by returning to the device class driver 1513 a response including error data indicating that processing cannot be done, the filter driver 1514 shuts off the request from the device class driver 1513.

After that, control switches so that the system operates in the abovementioned second condition (the device A 151 can be used from the PC-A 110, but cannot be used from the PC-D 113). More specifically, a request from an application operating on the PC-A 110 to the device A 151 is transmitted to the device A 151 to be processed, and a response is returned from the device A 151; however, a request from an application operating on the PC-D 113 to the device A 151 is not transmitted to the device, and a response including an error from the device manager 123 is returned.

When the filter driver 1514 is brought into a condition that the filter driver 1514 can respond an appropriate error with respect to sending the request from the device class driver 1513, the filter driver 1514 gives notification to the effect that the device A 151 has been connected, to the pseudo bus driver 1514. This process is similar to the process defined from 1704 to 1719 indicated in FIG. 17.

Since the above-mentioned process is performed by the filter driver 1514, the device A 151 can be utilized by the user similarly to the device A 151 being directly connected to the PC-A 110, which is independent from the request issued from the PC-D 113 to the device A 151. In other words, it is possible to control the device management system in a manner such that the data of the device A 151 which is inputted and outputted via the physical bus driver 1515 can be exclusively handled by the communication program 1510.

In the processes (523 and 534) for forming the channel shown in FIG. 6, when a plurality of devices provided on the PC-D 113 are filtered, a filter starting process is carried out with respect only to the filter driver 1514 corresponding to a device which is judged as an available device by the virtual device manager 120 based upon either an available device response 521 or an available device response 532 of FIG. 6, so the device connected from the PC-A 110 to the PC-D 113 can be used.

Next, a detailed description is made of data transmission/reception control operations performed between the device manager 123 and the virtual device manager 120 after the processes of FIG. 6 are completed and the device A 151 can be shared and can be operated as the device of the PC-A 110 with reference to FIG. 8. In this data transmission/reception control operation, it is assumed that the user uses the device A 151 connected to the PC-D 113 from the PC-A 110 under a condition such that the PC-A 110 communicates with the PC-D 113 via the network 103.

When the device A 151 is connected to the PC-D 113, the physical bus driver 151 for the physical bus (namely, USB bus in first embodiment) of the PC-D 113 to which the device A 151 is connected senses the device A 151, and issues an instruction with respect to the OS (not shown) to load a program (device driver) into the memory in order to prepare utilization of the device driver corresponding to the device A 151. Then, the OS loads a predetermined device driver group.

Normally, when the data is transmitted and received between the application 1511 and the device A 151, the upper level driver 1512, the device class driver 1513, and the physical bus driver 1515 are interposed. However, when the user uses the device A 151 from the PC-A 110, the filter driver 1514 corresponding to a portion of the device manager 123 is loaded at an appropriate position into the memory, and is arranged between the physical bus driver 1515 and the device class driver 1513 on the side of the PC-D 113.

In the case where the device manager 123 is loaded into the memory to be executed while the PC-D 113 is under operation, the device manager 123 appropriately monitors type of device, and physical bus.

In general, when the device A 151 is used from the application 1511 of the PC-D 113, the device manager 123 operates the device class driver 1513, the physical bus driver 1515, and the filter driver 1514 in an appropriate manner in such a manner that a communication between an appropriate device driver 1513 and the physical bus driver 1515 are performed via the filter driver 1514 in response to a user's intent.

However, as previously described in the initial condition, when the user uses the device A 151 from the PC-A 110, the filter driver 151 inhibits a direct communication between the physical bus driver 1515 and the device class driver 1513. In other words, the filter driver 151 validates both a response and a request between the communication program 1510 and the physical bus driver 1515. It should also be noted that when a series of device drivers where the device A 151 is connected to the PC-D 113 are loaded into the memory, the filter driver 1514 is loaded, and all of the communications between the device class driver 1513 and the physical bus drivers are carried out via the filter driver 1514. Alternatively, the device manager 123 may be arranged as follows. When an instruction is issued from the user, a series of device drivers may be loaded in manually, or when an instruction is issued from the application 1501 on the PC-A 110, a series of device drivers may be loaded.

It should also be understood that the device class drivers 1513 and the physical bus drivers 1515, to which the filter driver 1514 is communicated, are different from each other, since types of devices which are used and/or physical buses to which the devices are connected are different from each other, respectively. As a consequence, every time the device class drivers 1513 and the physical bus drivers 1515 are loaded into the memory, the type of devices and/or the physical buses to which the devices are connected are appropriately changed.

On the other hand, the virtual device manager 120 is operating within the PC-A 110. When the virtual device manager 120 accepts an instruction for utilizing the device A 151 via the GUI application 1507, as previously described, the virtual device manager 120 surveys whether or not the device A 151 can be used in the PC-A 110. If the device A 151 can be used, then the managing process is advanced in order that the device A 151 can be used from the PC-A 110.

If the device A 151 is connected to the PC-D 113 and a condition that the device A 151 is available from the PC-A 110 is established, then the information about the device A 151 is transmitted to the pseudo bus driver 1504 via both the communication program 1508 and the communication program 1510 where the communication path has already been established. The pseudo bus driver 1504 loaded into the memory produces therein two programs of the startup physical device object 1505 and the enumerator 1506, and causes these two programs to be executed.

The enumerator 1506 communicates with the communication program 1508, and instructs an OS (not shown) to load the startup physical device object 1505 is into the memory in order to prepare utilization of a device driver corresponding to the device A 151. The OS loads the startup physical device object 1505 in accordance with the instruction.

In the case where a communication is carried out from the application 1501 used by the user on the PC-A 110 to the device A 151, data is transmitted to the device A 151 via the upper level driver 1502, the device class driver 1503, the startup physical device object 1505, the enumerator 1506, the communication program 1508, the communication program 1510, the filter driver 1514, and also, the physical bus driver 1515. Also, an answer with respect to the transmitted data, and an interrupt are transmitted in this order opposite to the above-mentioned transmission order.

In other words, a request issued from the device class driver 1503 with respect to the device A 151 is transmitted from the startup physical device object 1505 corresponding to the device A 151 to the enumerator 1506, and then is transmitted via the communication program 1508 to the PC-D 113. A response with respect to the transmitted request is transmitted from the PC-D 113 to the device class driver 1503 via the communication program 1508, the enumerator 1506, and the startup physical device object 1505 in this order opposite to the above-mentioned transmission order. During transmission and receiving, control data such as ID and request number is added to the request and the response to the device A 151, by the communication program 1510 and the communication program 1508 to avoid confusion with requests and responses to other devices. Finally, the control data added at a stage when the request is sent to the device A 151, or at another stage when the response is returned to the device class driver 1503 is deleted.

As previously described, the request issued from the device class driver 1503 with respect to the device is transmitted from the pseudo bus driver 1504 via the communication program 1508 to the communication program 1510. Also, a response to the transmitted request is transmitted from the communication program 1510 via the communication program 1508 and the pseudo bus driver 1504 to the device class driver 1503 in a reverse order. Along the way, an ID and a request number are added to the request and the response to the device, by the communication program 1510 and the communication program 1508 so that the request and response are not confused with a request and a response to other devices.

At this time, the communication program 1508 has the following function. That is, while contents of communications are monitored, the communication program 1508 itself responds to the pseudo bus driver 1504 without transmitting a request via the network 103 to the communication program 1510, or delays the transmission of the request with respect to a portion of the communications, so the communication amount between the communication program 1508 and the communication program 1510 can be reduced.

Specifically, the communication program 1508 holds, in advance, answers with respect to requests for which answers have been previously determined, for example, periodically performed presence confirmation, and when these requests are received from the pseudo bus driver 1504, the communication program 1508 itself resends the registered answers to the pseudo bus driver 1504. The abovementioned function capable of reducing the communication amount is set by accepting an instruction from the user via either the GUI application 1507 or the GUI application 1509. Alternatively, the communication program 1508 may accept an instruction from a manager of the system via the authentication management server 101.

In the case where the PC-A 110 and the PC-D 113 have been set to a halt or suspend condition in order to save power consumption, the device A 151 may be put in a halt or suspend condition, when in a condition in which the device A 151 is being used from the PC-A 110. In such a case, the OS transmits notification that the device A 151 is brought into either the halt or the suspend condition, to the communication program 1508, the communication program 1510, the filter driver 1514, and the pseudo bus driver 1504. The pseudo bus driver 1504 and the filter driver 1514 instruct the GUI applications 1507 and 1509 to display a warning on the screens of the PC-A 110 and the PC-D 113 respectively, not to enter halt or suspend conditions, and transmit an error to the OS. The OS which receives the error prevents occurrence of a halt or suspend condition.

Depending upon the user's setting, in a case where both the PC-A 110 and the PC-D 113 are brought into either the halt conditions or the suspend conditions under a condition such that the device A 151 can be used from the PC-A 110, the communication program 1508, the communication program 1510, the filter driver 1514, and the pseudo bus driver 1504, which receive from the OS a notification such that the PC-A 110 and the PC-D 113 enter either the halt or suspend conditions, instruct the GUI applications 1507 and 1509 to display a warning on the screens of the PC-A 110 and the PC-D 113 respectively, and also delete all of the startup physical device objects 1505 on the pseudo bus driver 1504, and further execute a process in order to accomplish mutual communication among the communication program 1508, the communication program 1510, the filter driver 1514, and the pseudo bus driver 1504. In this case, the completed communication is again commenced by executing a normal restarting procedure by the communication programs 1508 and 1510, the filter driver 1514 and the pseudo bus driver 1504 when either the PC-A 110 or the PC-D 113 recovers from either the halt condition or the suspend condition.

Next, a description is made of conversion operations of data formats in the case where the device A 151 is used from the PC-A 110.

As previously described, a request which is issued from the application 1511 on the PC-D 113 to the device A 151 is transmitted to the device A 151 via the upper level driver 1512, the device class driver 1513, the filter driver 1514, and the physical bus driver 1515, and also various types of programs.

However, when the request to the device A 151 is transmitted and received in the application 1501 operated on the PC-A 110, information which is specific to the PC-A 110 is contained in the requests which are transmitted/received among the respective programs. This specific information to the PC-A 110 corresponds to, for example, address information of memory, or a buffer which performs a DMA (Direct Memory Access) transfer.

If the request containing such specific information to the PC-A 110 is directly transmitted to programs such as the communication program 1510, the filter driver 1514, and the physical bus driver 151, which are operated on the PC-D 113, then the respective programs operated on the PC-D 113 are accessed to addresses which cannot be referred to, so the device management system cannot be operated under normal condition.

In the device management system of the first embodiment, in order to avoid the above-mentioned problem, when information such as requests and answers is transmitted and received among these programs, converting operations of data formats are carried out, and the device management system performs management such that the information contained in the requests and the answers does not depend upon an operated PC. A detailed description is made of contents of the processes.

Figure 23:
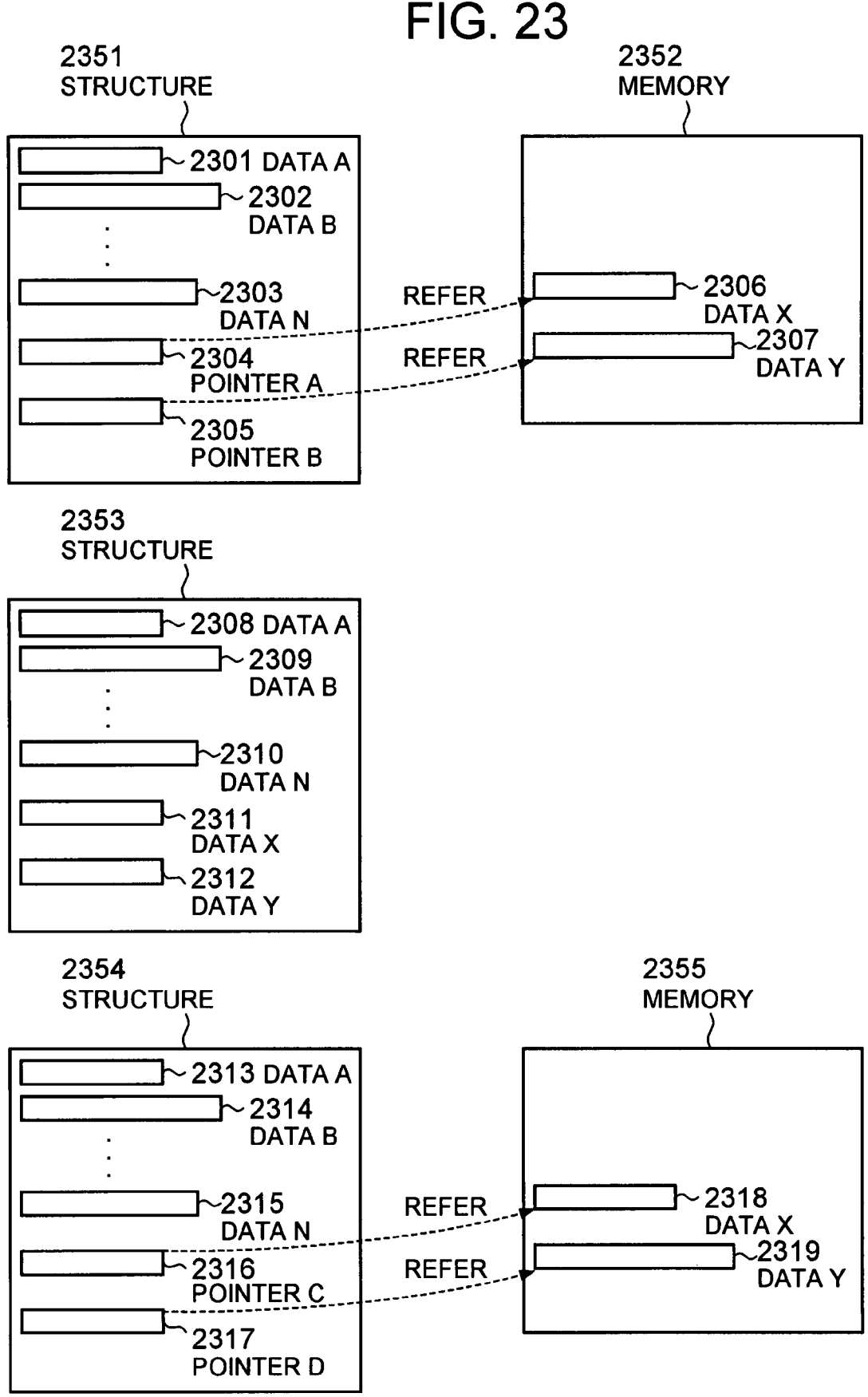
FIG. 23 is a diagram for describing conversions of data which are transmitted and received among the respective PCs of the first embodiment.

FIG. 23 is a diagram for describing data transmitted and received between the pseudo bus driver 1504 and the communication program 1508, data transmitted and received between the communication program 1508 and the communication program 1510, data structure of data transmitted and received between the communication program 1510 and the filter driver 1514, and converting processes of the data structures.

A request and a response which are handled by the pseudo bus driver 1504 have the form of a structure member shown in a structural member 2351. The structural member 2351 is provided with data A 2301, data B 2302, . . . , data N 2303, and a pointer A 2304, and a pointer B 2305. Both the pointer A 2304 and the pointer B 2305 indicate memory addresses (logic addresses) of information which is stored in a memory 2352 on the PC-A 110. The information to be stored corresponds to data X 2306 and data Y 2307. It should also be noted that the memory 2352 corresponds to a memory area where the structural member 2351 has been loaded, a memory area which is specifically provided for processing a device, or a memory area which is specially provided for processing a device, for example, a controller driver which controls a device bus having a different property from that of the memory to which the structural member 2351 has been loaded, and can directly access without via a CPU.

On the other hand, the data which are transmitted and received between the pseudo bus driver 1504 and the communication program 1508, between the communication program 1508 and the communication program 1510, and between the communication program 1510 and the filter driver 1514 have a structure format shown in the structural member 2353. The structural member 2353 is equipped with data A 2308, data B 2309, ..., data N 2310, data X 2311, and data Y 2312. In other words, instead of a pointer, data itself is stored in a structural member to be transmitted and received, which exceeds PC. Since the pseudo bus driver 1504, the communication program 1508, the communication program 1510, and the filter driver 1514 transmit/receive data having the format of the structural member 2353, these drivers and programs transmit and receive requests which are required by each other, and transmit and receive answers with respect to the requests.

The pseudo bus driver 1504 receives a request contained in the structural member 2351 from the device class driver 1503. The request contained in this structural member 2351 is generated by the device class driver 1503 by a command given by the application 1501 or an upper level driver 1502, which is a driver in an upper level of the device class driver 1503.

The pseudo bus driver 1504 converts data indicative of a request stored in the structural member 2351 and data stored in the memory 2352 into data having the format of the structural member 2353, and transmits the data having the converted format of the structural member 2353 to the communication program 1508. Also, the pseudo bus driver 1504 receives the data having the format of the structural member 2353 from the communication program 1508, converts the received format of the structural member 2353 into the format of the structural member 2351, and then transmits the data having the converted format of the structural member 2351 via the device class driver 1503 and the upper level driver 1502 to the application 1501. At this time, data which should be stored in the memory 2352, for example, data X 2306 and data Y 2307, are expanded into the memory 2352. The data expanded into the memory 2352 is utilized by other drivers, applications, and an OS 1701.

On the PC-D 113 side, the requests and the responses which are handled by the filter driver 1514 have the format of the structural member as indicated in the structural member 2354.

The structural member 2354 stores data A 2313, data B 2314, ..., data N 2315, a pointer C 2316, and a pointer D 2317. The pointer C 2316 and the pointer D 2317 indicate memory addresses (logic addresses) of information stored in the memory 2355 of the PC-D 113, and the stored information corresponding to data X 2318 and data Y 2319, respectively. The memory 2355 corresponds to the memory into which the structural member 2354 has been loaded, or a memory area having a different property from the property of the above-mentioned memory to which the structural member 2354 has been loaded. Further, this memory area is specially provided in order to process devices, which a control driver which controls a device bus can directly access without going via the CPU.

The filter driver 1514 converts a request transmitted from the communication program 1510 and stored in the structural member 2353 into a request having the format of the structural member 2354, and then holds the request having the converted format in the filter driver 1514. At this time, in the case where, for instance, data Y 2311 and data Y 2312 are data which should be stored in memory 2355, these data X 2311 and Y 2312 are deployed in the memory 2355. The data deployed in the memory 2355 are utilized by other devices and the OS 1702. The filter driver 1514 judges whether or not the data X 2318 and the data Y 2319 should be deployed into the memory 2355 in accordance with a predetermined policy. This policy is set and changed by the user.

The data which are stored in the structural member 2351, the structural member 2353, the structural member 2354, the memory 2352, and the memory 2355 correspond to header information such as lengths and numbers of requests, information such as data main bodies to be transmitted and numbers of devices to be transmitted, information as to types and numbers of interfaces provided in devices to be transmitted, properties and types of requests to be transmitted, status information under execution, and the like.

As previously described, in order that both memory address information recorded in data and data indicated by a memory address are correctly transmitted and received between the pseudo bus driver 1504 and the filter driver 1514, the pseudo bus driver 1504 and the filter driver 1514 convert the data structures between the structural member 2351 and the structural member 2353, and between the structural member 2353 and the structural member 2354. Since the above-mentioned data structures are converted, it is possible to avoid the following problem. That is, an appliance refers to inappropriate memory address information contained in data which is transmitted and received between the pseudo bus driver 1504 and the filter driver 1514, so that it is possible to avoid occurrence of an error.

Here, an explanation is once again given concerning how a query included in a request, transmitted to the pseudo bus driver 1504 is transmitted from the pseudo bus driver 1504 to the device A 151, and how a response to the request is returned to the pseudo bus driver 1504.

As described above, the request transmitted to the pseudo bus driver 1504 is converted into a structural member 2353 that does not have a pointer referring to memory inside the PC-D 113. The converted structural member 2353, in cases in which it is not taken by a protocol specification that can be used in the network 103, is converted into a second request that has a format in which the communication program 1508 can transmit on the network 103.

Specifically, in the second request, a header necessary for the network protocol, and the like, is added to the structural member 2353. For example, in cases in which TCP/IP protocol can be used in the network 103, the second request includes the structural member 2353, which includes header length and packet length, identifier, flag, survival period, protocol number, header checksum, source IP address, destination IP address, option, and data.

The communication program 1508 transmits the second request to the communication program 1510 via the network 103.

The communication program 1510 extracts the structural member 2353 from the received second request, and transmits it to the filter driver 1514. The filter driver 1514 converts the structural member 2353 to the structural member 2354, as described above.

That is, the filter driver 1514 copies data X 2318 and data Y 2319 to the memory 2355, and stores the memory address written to, respectively at the pointer C 2316 and the pointer D 2317. Here, the filter driver 1514 checks whether or not the quantities of the data X 2318 and the data Y 2319 are below the storage capacity of the memory 2355, and if necessary, secures capacity.

The request converted into the format of the structural member 2354 is transmitted to the device A 151 via the physical bus driver 1515 by the filter driver 1514.

The device A 151 transmits a response regarding the request transmitted from the physical bus driver 1515 via a bus and a bus controller, not shown in the figures, to the physical bus driver 1515. If the response received from the physical bus driver 1515 refers to the data X 2318 and the data Y 2319 using the pointer C 2316 and the pointer D 2317, without having a pointer that refers to memory inside the PC-D 113, the filter driver 1514 converts to the structural member 2353 that includes the data X 2318 and the data Y 2319, without holding a pointer referring to memory inside the PC-D 113, as described above, and transmits the converted structural member 2353 to the communication program 1510.

The communication program 1510, using the information of the transmitted structural member 2353, uses the specification of a protocol that is usable on the network 103, to create the second response that has a format that is transmissible on the network 103. Specifically, in the second response, a header necessary for the network protocol is added to the structural member 2353. For example, in cases in which the TCP/IP protocol can be used on the network 103, the second response includes the structural member 2353 which includes header length and packet length, identifier, flag, survival period, protocol number, header checksum, source IP address, destination IP address, option, and data.

The communication program 1508 transmits the second response to the communication program 1508 via the network 103.

The communication program 1508 extracts the structural member 2353 from the received second response, and transmits it to the pseudo bus driver 1504. The pseudo bus driver 1504 converts the structural member 2353 to the structural member 2351, as described above.

That is, the pseudo bus driver 1504 copies (or transfers) data X 2306 and data Y 2307 to the memory 2352, and stores the memory address written to, respectively, at the pointer A2304 and the pointer B2305. Here, the pseudo bus driver 1504 checks whether or not the size of the data X 2306 and data Y 2307 are below the storage capacity of the memory 2352, and if necessary, secures capacity.

As described above, in the conversion from the structural member 2353 to the structural member 2354 by the filter driver 1514, copying or transfer of the data X 2318 and the data Y 2319 to the memory 2355, and storage at the pointer C 2316 and the pointer D 2317 is carried out according to a policy determined in advance. This policy is in the memory of the PC-D 113 and is used when the second request, received by the filter driver 1514, is transmitted to the physical bus driver 1515.

In the same way, conversion from the structural member 2354 by the filter driver 1514 to the structural member 2353 that includes the data X 2318 and the data Y 2319 of the memory 2355 is carried out according to the above policy.

The policy is determined by a user when the user installs a device driver or other programs in the PC-D 113, or when a device is used, or is conveyed from the authentication management server 101 to the PC-D 113 and stored in the PC-D 113.

The policy is determined by at least one of: manufacturer or device of type (class) of device such as the device A 151, device type, device manufacturing number, and number of bus or controller connected to the device. With regard to information on the device type (class) or device manufacturer, a program such as a device driver on the PC-D 113 reads an identifier held in the device when the device is connected to the PC-D 113, and the information is stored in the memory of the PC-D 113.

In the conversion from the structural member 2354 to the structural member 2353 by the filter driver 1514, copying or transferring of the data X 2318 and the data Y 2319 in the memory 2355 indicated by the pointer C 2316 and the pointer D2317, to the structural member 2353, is performed according to the predetermined policy. Since the policy is in the memory of the PC-D 113 and is predetermined, the policy is used when the filter driver 1514 transmits the response received from the physical bus driver 1515 to the pseudo bus driver 1504 via communication programs 1510 and 1508.

Furthermore, in the same way, in conversion from the structural member 2353 to the structural member 2351 by the pseudo bus driver 1504, copying or transferring of the data X 2306 and the data Y 2307 to the memory 2352, and storing at the pointer A2304 and the pointer B2305 of the memory address that is written to, are performed according to the predetermined policy. The policy is in the memory of the PC-A 110 and is used when the pseudo bus driver 1504 transmits the response received to the device driver 1503.

The policy stored in the PC-A 110 is determined by a user when the user installs a device driver or other programs in the PC-A 110, or when a device is used, or is transmitted from the authentication management server 101 to the PC-A 110 and stored in the memory of the PC-A 110

In the same way, the policy stored in the PC-D 113 is determined by a user when the user installs a device driver or other programs in the PC-D 113, or when a device is used, or is transmitted from the authentication management server 101 to the PC-D 113 and stored in the memory of the PC-D 113.

The policy is determined according to manufacturer of device or type (class) of device such as the device A 151, device type, device manufacturing number, number of bus or controller connected to the device. With regard to ID information such as the device type (class) or device manufacturer, a program (for example, physical device driver) such as a device driver on the PC-D 113 reads an identifier held in the device when the device is connected to the PC-D 113, the information is stored in the memory of the PC-D 113, and also a filter driver 1514, for example, is communicated to the pseudo bus driver 1504, via a communication application 1510 and a communication application 1508.

The device manager 123 reads the ID information held in the memory of the PC-D 113, identifies a policy compatible with the ID information, and uses it. Furthermore, the device manager 123 transmits the read ID information to a virtual device manager 120 of the PC-A 110, via the network. The virtual device manager 120 identifies the policy compatible with the received ID information and uses it.

As previously described, since the virtual device manager 120 and the device manager 123 are each operated, the device A 151 can be operated from the application on the PC-D 113 and the PC-A 110.

The filter driver 1514 shuts off one of the communication between the communication program 1510 and the physical bus driver 1515, and the communication between the device class driver 1513 and the physical bus driver 1515, to perform exclusive control, according to whether the device A 151 is utilized as the device of the PC-D 113 or as the device of the PC-A 110. By switching so that one of these devices can be used, the device B 152 can be utilized from the PC-D 113 and the PC-A 110 as if the PCs were connected to the device. The switching of the communications in the filter driver 1514 is automatically carried out, or is performed in response to an instruction from the communication program 1508, via the communication program 1510. Alternatively, an instruction is given from the GUI application 1507 or the GUI application 1509, to these communication programs.

When switching of the communication occurs, the respective device drivers and the respective applications are initialized from either the GUI application or the communication application so that the applications 1501 and 1511, the upper level drivers 1502 and 1512, and the device class drivers 1503 and 1513 operate under normal conditions. For instance, the device management system is arranged such that the device A 151 once transmits a pseudo-hot-unplugged signal to the OS, the respective applications, and, the respective device drivers virtually. Such an initialization of each of the device drivers and of the applications is always carried out in the case where an unauthorized communication between the communication programs 1508 and 1510 is sensed, unauthorized operations of the respective device drivers and of the respective applications are sensed, and so on.

Figure 9:
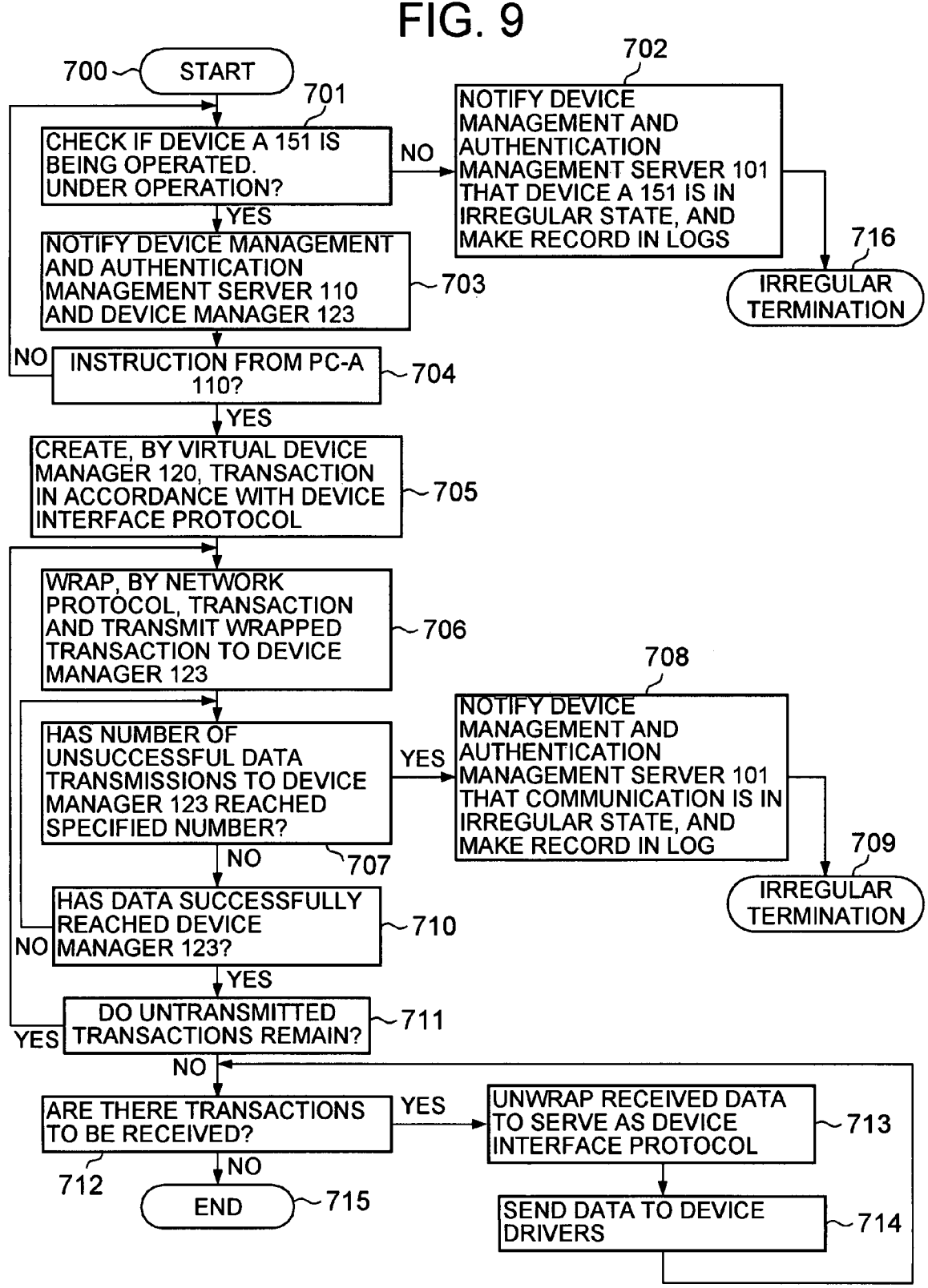
FIG. 9 is a flow diagram explaining operations for using a device according to the first embodiment.

The operations will be described when an instruction to use the device A 151 is provided to the virtual device manager 120 after the channel creation shown in FIG. 6 (523 and 534) has completed and the device A 151 has been controllable from the virtual device manager 120. FIG. 9 is a process flow diagram for explaining the operations of the device manager 123 and virtual device manager 120 when using a device in the device management system of the present embodiment. The process will be described for the case where the virtual device manager 120 triggers the operations.

After the channel creation shown in FIG. 6 (523 and 534) is complete and the device A 151 is controllable from the virtual device manager 120, and when the instruction to use the device A 151 is provided to the virtual device manager 120 (start 700), the virtual device manager 120 checks if the device A 151 is operating (701). Specifically, the virtual device manager 120 sends a predetermined command to the device manager 123 and inquires whether or not the status of the device A 151 can be obtained, and whether the device A 151 can communicate. Alternatively, the virtual device manager 120 checks if a communication path has been established. Then, the virtual device manager 120 will make a judgment based on a reply from the device manager 123.

If the device A 151 is not in operation, the device management and authentication management server 101 is notified that the device A 151 is in an irregular state, and the authentication management server 101 and virtual device manager 120 make a record in the logs 191 and 170 respectively (702). After the log 170 is recorded, the virtual device manager 120 irregularly terminates the process for the given instruction (716). At this time, the virtual device manager 120 may notify the user with an error message indicative of the irregular termination. Furthermore, the virtual device manager 120 may be configured to automatically perform a process for terminating the communication with the device A 151 after notifying that the device A 151 is in an irregular state. The virtual device manager 120 may also be configured to repeat the operation check attempt multiple times and proceed to 702 if these attempts keep notifying that the device A 151 is in an irregular states.

On the other hand, when the device A 151 is determined to be in operation at Step 701, the virtual device manager 120 notifies the device management and authentication management server 101 and device manager 123 as required to confirm that the device A 151 is alive (703). This process allows the device management and authentication management server 101 and device manager 123 to confirm that a channel to the device A 151 has been established.

Next, the virtual device manager 120 judges whether or not it has received an instruction that acts as a trigger to use the device A 151 (from the PC-A 110, for example) (704). If it is determined that there is no instruction that acts as the trigger, the process returns to Step 701.

On the other hand, if it is determined that there is an instruction that acts as the trigger, the virtual device manager 120 creates a transaction in accordance with a device interface protocol (705). Then, the created transaction is converted into the protocol defined in the network protocol and sent to the device manager 123 (706).

Next, the virtual device manager 120 judges whether the transaction (data) has successfully reached the device manager 123. If not, the virtual device manager 120 judges whether the number of attempts has exceeded a pre-specified number.

Specifically, the virtual device manager 120 first judges whether or not the number of unsuccessful data transmissions to the device manager 123 has reached the specified number (707).

If it has reached the specified number, the virtual device manager 120 judges that the communication is in an irregular states, notifies the device management and authentication management server 101 accordingly, and makes a record in the log 170 (708). The device management and authentication management server 101 may be configured to record the information indicative of the irregular communication in the log 191 as well. After the log 170 is recorded, the virtual device manager 120 irregularly terminates the process (709). The virtual device manager 120 may notify the user of the error, or may automatically proceed to a process for terminating the communication with the device A 151.

On the other hand, if the number has not reached the specified number at Step 707, the virtual device manager 120 checks whether or not the data has successfully arrived at the device manager 123 (710). Specifically, it is determined that the data did not successfully arrive if the data transmission was determined to be irregular by the response for the data sent, or if no response is returned in a predetermined time period. If it is determined that the data did not successfully arrive, the number of unsuccessful transmission is incremented by one and the process returns to Step 707.

If the data successfully arrives in Step 710, the virtual device manager 120 checks whether or not there remain untransmitted transactions (711). If there remain untransmitted transactions, the process returns to Step 706 to be repeated.

If there is no untransmitted transaction, the virtual device manager 120 checks whether or not there are transactions to be received (712). The virtual device manager 120 judges based on whether or not the amount of data pre-specified when the communication path was established between the virtual device manager 120 and the device manager 123 has been transmitted.

If there are transactions to be received, the virtual device manager 120 converts the received data into the device interface protocol (713). Then, the extracted data is sent to the device drivers (714) and the process returns to Step 712.

On the other hand, if there is no transaction to be received at Step 712, the virtual device manager 120 ends the process (715).

If the process is irregularly terminated in the above process (Step 716 or 709), the device management and authentication management server 101, device manager 123, and virtual device manager 120 check again which device can be appropriately used when the process is irregularly terminated, and update the device management table 200 in the device management and authentication management server 101. That is, if the rechecking succeeds, the virtual device manager 120 again performs normal communication and creates a channel if possible, and sets the status in the device management table 200 to "exclusively in use", "in communication", or "in use".

Operations will be described when the device A 151 sends information to the device manager 123 after the channel creation shown in FIG. 6 (523 and 534) is complete and the device A 151 is controllable from the device manager 123. FIG. 10 is a process flow diagram for explaining the operations of the device manager 123 and virtual device manager 120 when using a device in the device management system of the present embodiment. The process will be described for the case where the device A 151 triggers the operations.

After the channel creation shown in FIG. 6 (523 and 534) is complete and the device A 151 is controllable from the device manager 123, and when the device A 151 sends the information to the device manager 123 (start 800), the device manager 123 checks if the device A 151 is operating (801). This operation check is similar to the process of FIG. 9.

If the device A 151 is not in operation, the device management and authentication management server 101 is notified that the device A 151 is in an irregular state, and the authentication management server 101 and device manager 123 make a record in the logs 191 and 173 respectively (802). After the log 173 is recorded, the device manager 123 irregularly terminates the process (816). At this time, the device manager 123 may notify the user with an error message indicative of the irregular termination. Furthermore, the device manager 123 may be configured to automatically perform a process for terminating the communication with the device A 151 after notifying that the device A 151 is in an irregular state. The device manager 123 may also be configured to repeat the operation check attempt multiple times and proceed to 802 if these attempts keep notifying that the device A 151 is in an irregular state.

On the other hand, when the device A 151 is determined to be in operation at Step 801, the device manager 123 notifies the device management and authentication management server 101 and virtual device manager 120 as required to confirm that the device A 151 is alive (803). This process allows the device management and authentication management server 101 and virtual device manager 120 to confirm that a channel to the device A 151 has been established.

Next, the device manager 123 judges whether or not it has received an instruction that acts as a trigger to use the device A 151 (from the PC-A 110, for example) (804). If it is determined that there is no instruction that acts as the trigger, the process returns to Step 801.

On the other hand, if it is determined that there is an instruction that acts as the trigger, the device manager 123 creates a transaction in accordance with the device interface protocol (805). Then, the created transaction is converted into a packet defined in the network protocol and sent to the virtual device manager 120 (806).

Next, the device manager 123 judges whether the transaction (data) has successfully reached the virtual device manager 120. If not, the device manager 123 judges whether the number of attempts has exceeded a pre-specified number.

Specifically, the device manager 123 first judges whether or not the number of unsuccessful data transmissions to the virtual device manager 120 has reached the specified number (807).

If it has reached the specified number, the device manager 123 judges that the communication is in an irregular state, notifies the device management and authentication management server 101 accordingly, and makes a record in the log 173 (808). The device management and authentication management server 101 may be configured to record the information indicative of the irregular communication in the log 191 as well. After the log 173 is recorded, the device manager 123 irregularly terminates the process (809). The device manager 123 may notify the user of the error, or may automatically proceed to a process for terminating the communication with the device A 151.

On the other hand, if the number has not reached the specified number at Step 807, the device manager 123 checks whether or not the data has successfully reached the virtual device manager 120 (810). If it is determined that the data has not successfully reached, the number of unsuccessful transmissions is incremented by one and the process returns to Step 807.

If the data has successfully arrived, in Step 810, the device manager 123 checks whether or not there remain untransmitted transactions (811). If there remain untransmitted transactions, the process returns to Step 806 to be repeated.

If there remains no untransmitted transaction, the device manager 123 checks whether or not there are transactions to be received (812).

If there are transactions to be received, the device manager 123 converts the received data into the device interface protocol (813). Then, the extracted data is sent to the device drivers (814) and the process returns to Step 812.

On the other hand, if there is no transaction to be received at Step 812, the device manager 123 ends the process (815).

If the process is irregularly terminated in the above process (Step 816 or 809), the device management and authentication management server 101, device manager 123, and virtual device manager 120 check again which device can be appropriately used when the process is irregularly terminated, and update the device management table 200 in the device management and authentication management server 101. That is, if the device can be re-confirmed, the device manager 120 again performs normal communication and creates a channel if possible, and sets the status in the device management table 200 to "exclusively in use", "in communication", or "in use".

The logs 191, 170, and 173 accumulated by the device management and authentication management server 101, virtual device manager 120, and device manager 123 in the above operations are displayed by the management application installed on the device management and authentication management server 101 or other management instruments by the network administrator.

FIG. 11 shows one example of a log management view displayed by the management application. The management logs shown in this figure show the logs 191, 170, and 173, stored in the device management and authentication management server 101, virtual device manager 120, and device manager 123, that the device management and authentication management server 101 has collected and accumulated in its storage unit 190 or memory.

The display application (management application) may reside elsewhere other than in the device management and authentication management server 101. In this case, the display is carried out upon receiving permission from the device management and authentication management server 101. In a configuration in which a plurality of information centers 102 and blade servers 106 exist, the management application may collect logs from a device management and authentication management server different from the device management and authentication management server 101 and applications under the control of that device management and authentication management server, and display the collected logs together.

The device management view 1000 is for managing the devices that the management application displays. The device management view 1000 displays the following items for each of the accumulated logs 191, 170, and 173: the number 1001, time 1002, device ID 1003, device name 1004, address (source) 1005, network interface ID (source) 1006, application ID 1007, address (host) 1008, network interface ID (host) 1009, application ID 1010, vendor ID 1011, product ID 1012, serial number 1013, device name 1014, user ID 1015, information 1016, and remarks 1017.

The number 1001 is for managing a log and is automatically assigned whenever the log is stored. The time 1002 indicates the date and time when the log is recorded. The information 1016 displays in detail the contents of the events recorded as logs in the logs 170, 173, and 191.

The address (source) 1005 and address (host) 1008 indicate the addresses of the source and host (destination). The network interface ID (source) 1006 and network interface ID (host) 1009 indicate the network interface IDs of the source and host (destination). The remarks 1017 displays information that cannot be displayed in the information 1016, such as information calling an administrator's attention or information supplementing the information 1016.

The other items are the same as those that bear the same names in the device information table 200, user information database 300, PC usage management table 400 described with reference to the FIGS. 2 to 4.

Furthermore, the device management and authentication management server 101 is provided with a management application that has a function to search each piece of the information displayed on the device management view 1000. This management application displays the information shown on the device management view 1000 to instantly inform the state of an instrument or device, providing increased convenience of the overall system. For example, by searching, displaying, and monitoring only the information on unauthorized authentication, it is possible to find an unauthorized access and take action therefor. Furthermore, by searching, displaying, and monitoring only the information on the device that cannot be appropriately used, it is possible to troubleshoot a problem in the system at an early stage and take action therefor. Moreover, the management application can provide more clarity compared to the entire log listing to reduce operational mistakes the administrator may make. These provide an advantage of increased security for the overall system.

Also, the logs 191, 170, and 173 acquired by the authentication management server 101 are copied to another server which is different from the authentication management server 101 during the log acquisition so as to execute an alteration preventing measure. When an irregular action such as leaking of information within a firm, the log to which the alteration preventing measure has been executed may be utilized so as to verify where this information has leaked, how this information has been irregularly processed, and whether or not the leaked information has been taken out from the firm. In this case, it is required that a change in rights with respect to the log where the alteration preventing measure has been carried out is not applied to appliances such as the authentication management server, and the system manager.

Figure 17:
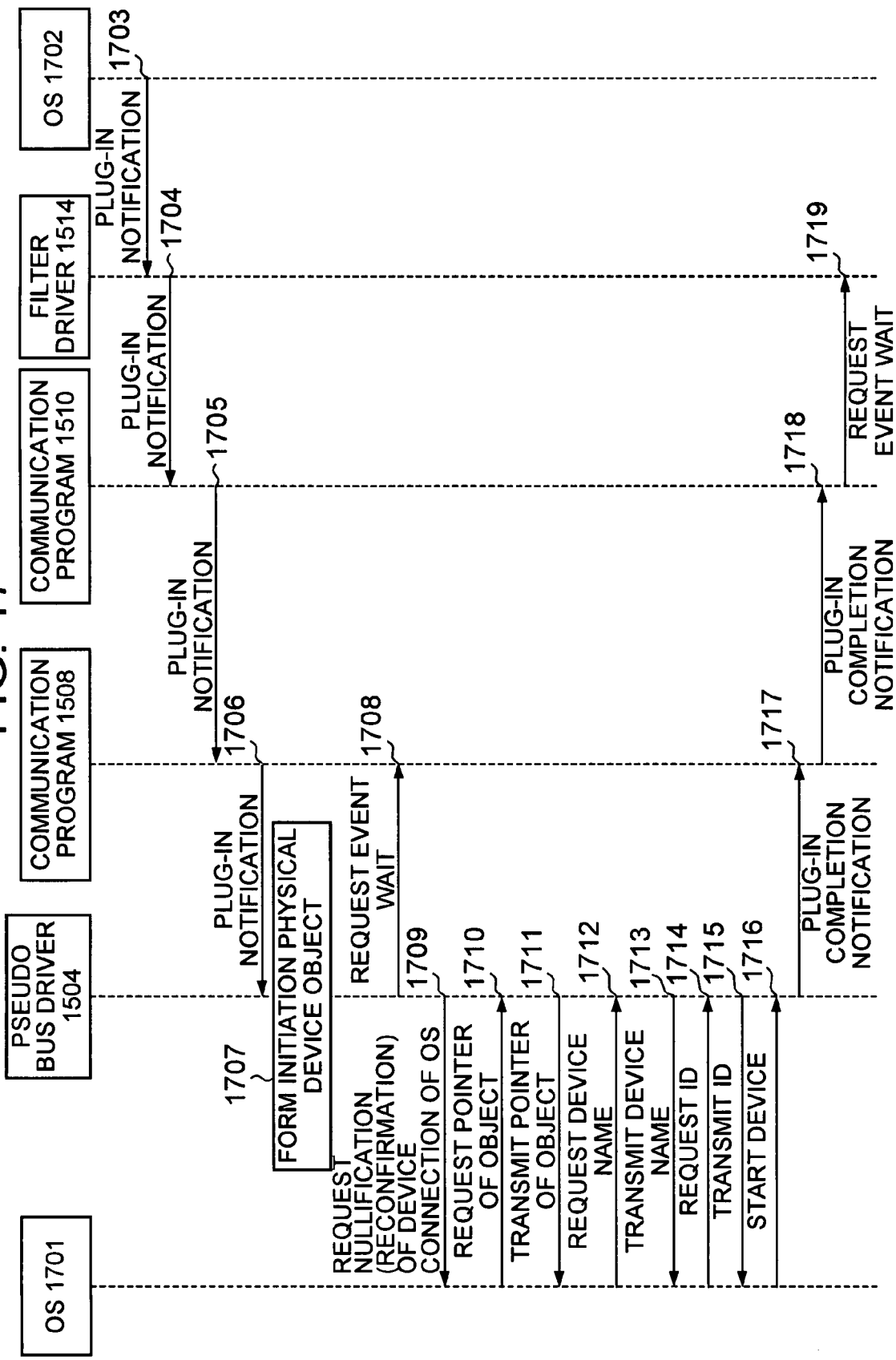
FIG. 17 is a flow operation for describing operations when a new device is connected to a PC-D according to the first embodiment.

Next, a description is made of a plug-in process executed when a new device (referred to as "device A 151*a*" hereinafter) available from the PC-A 110 is connected to the PC-D 113 by the user after the channel producing operations (523 and 534) shown in FIG. 6 have been ended. FIG. 17 is a flow for describing operations when the new device A 151*a* is connected to the PC-D 113 in the device management system of the first embodiment.

When the new device A 151*a* is connected (is plugged-in) to the PC-D 113, the OS 1702 on the PC-D 113 senses the plug-in status, and issues the plug-in notification to the filter driver 1514 (1703). The filter driver 1514, the communication program 1510, and the communication program 1508 sequentially transmit the plug-in notification to the communication program 1510, the communication program 1508, and the pseudo bus driver 1504, respectively (1704 to 1706).

In this case, the virtual device manager 120 judges whether or not the new device A 151*a* can be utilized by the user, and if the new device A 151*a* can be used, then the virtual device manager 120 produces a startup physical device object 1505 within the pseudo bus driver 1504 (1707). As previously described, a plurality of such startup physical device objects 1505 may be produced within the virtual device manager 120, and may be basically produced in correspondence with the respective devices.

The pseudo bus driver 1504 resends an event waiting request to the communication program 1508 (1708), and the communication program 1508 is brought into an event waiting status.

The pseudo bus driver 1504 requests confirmation of a valid/invalid status of a device connection with respect to the OS 1701 of the PC-A 110 (1709). In order to confirm the valid/invalid status of the device connection, the OS 1701 requests a pointer of an object with respect to both the pseudo bus driver 1504 and another bus driver (1710). The pseudo bus driver 1504 and another bus driver transmit object pointers of the startup physical device object 1505, the enumerator 1506, and the like, which correspond to the drivers managed by the own drivers, to the OS 1701 (1711). Next, the OS 1701 requests a device name of the device A 151*a* whose presence confirmation has been completed (1712). In response to this request, the pseudo bus driver 1504 and another bus driver transmit the device name of the device A 151*a* managed by the own drivers to the OS 1701 (1713). Next, the OS 1701 requests an ID of the device A 151*a* whose presence confirmation has been completed (1714). In response to this request, the pseudo bus driver 1504 and another bus driver transmit device name of the device A 151*a*, that they manage, to the OS 1701 (1713). When the above-mentioned processes are completed under normal conditions, the OS 1701 allows the pseudo bus driver 1504 to commence usage of the device A 151*a* (1716). Also, descriptors such as a device and an ID which are resent correspond to such information which has been received from the device A 151*a* by the filter driver 1514, and has been transmitted to the pseudo bus driver 1504 by the plug-in notification (1704 to 1706).

In cases where the acquisition process (plug-in process) of the device information defined in 1710 to 1715 is not carried out under normal condition, the OS 1701 informs the user of a message that the device A 151*a* cannot be utilized under normal conditions, via the graphical user interface (GUI) application 1501, or the like, and records this message on the log provided in the PC-A 110 and the log of the authentication management server 101. Next, both the pseudo bus driver 1504 and the communication program 1508 issue plug-in completion notification to the communication program 1510 and the filter driver 1514 (1717 and 1718). The communication program 1510 transmits an event waiting request to the filter driver 1514 (1719).

Since the above-mentioned processes are carried out, the device which is newly connected to the PC-D 113 can be utilized by the PC-A 110.

Figure 18:
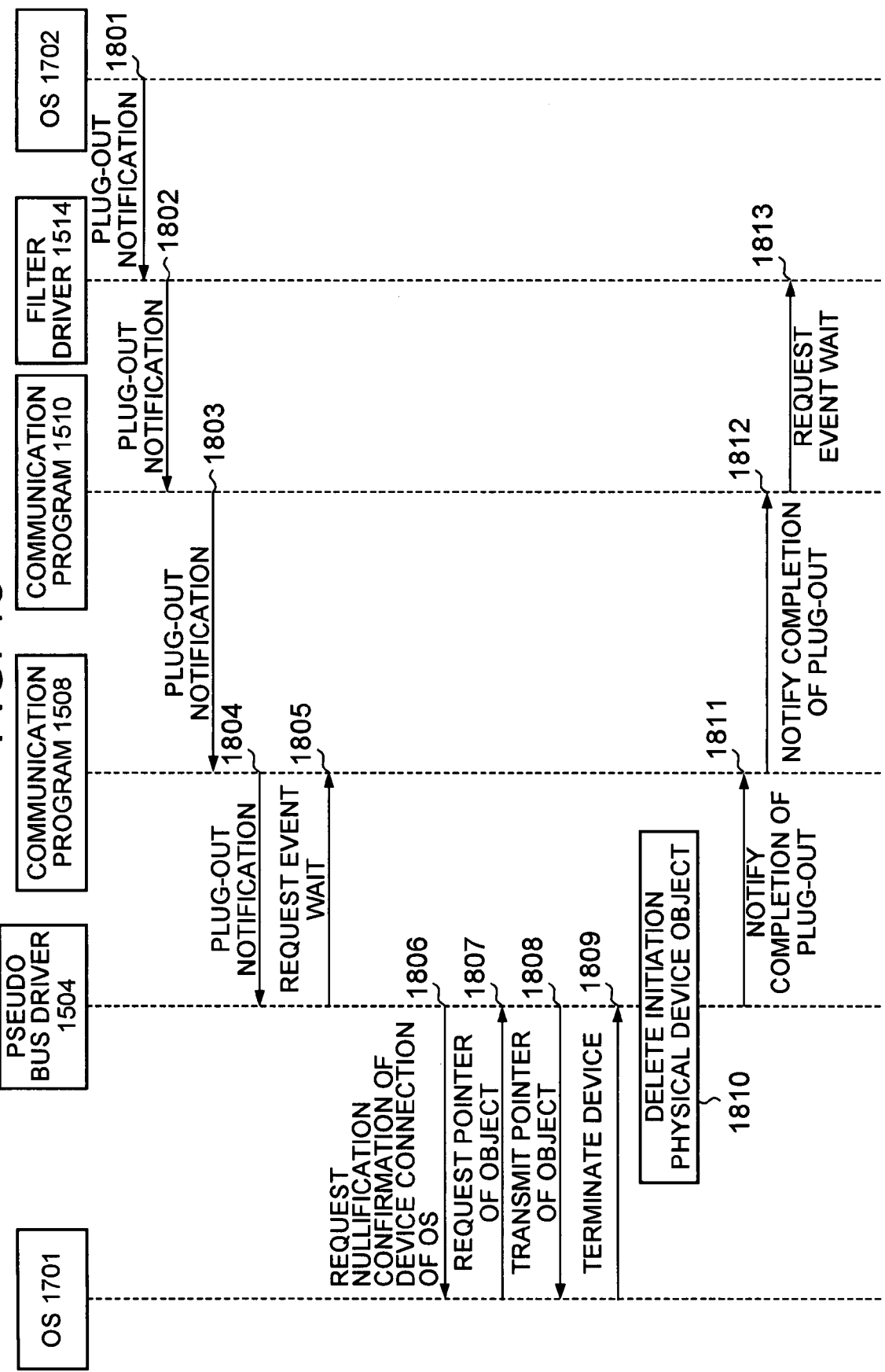
FIG. 18 is a flow operation for describing operations when a device A is unplugged from the PC-D according to the first embodiment.

Next, a description is given of a plug-out process executed when the device A 151 which can be used from the PC-A 110 is cut off, or is brought into an unavailable condition from the PC-D 113 by the user after the production (525 and 534) of the channel shown in FIG. 6 has been completed. FIG. 18 is a flow for describing operations when the device A 151 is cut off, or is brought into an unavailable condition (plug-out) from the PC-D 113.

When the device A 151 is plugged out from the PC-D 113, the OS 1702 installed on the PC-D 113 senses the plug-out status, and issues plug-out notification to the filter driver 1514 (1801). The filter driver 1514, the communication program 1510, and the communication program 1508 sequentially transmit the plug-out notification to the communication program 1510, the communication program 1508, and the pseudo bus driver 1504 respectively (1802 to 1804).

In this case, the virtual device manager 120 judges whether or not the device A 151 can be plugged out, for example, judges whether or not an application which is using the device A 151 is present.

When the device A 151 can be plugged out, the pseudo bus driver 1504 performs a procedure for deleting the below-mentioned startup physical device object 1505.

Firstly, the pseudo bus driver 1504 transmits an event waiting request to the communication program 1508 (1805), and also requests the OS 1701 to confirm that a device connection is invalidated (1806).

In order to confirm that the device connection is invalidated, the OS 1701 requests a pointer of an object with respect to the pseudo bus driver 1504 and another bus driver (1807). The pseudo bus driver 1504 and another bus driver transmit object pointers of the startup physical device object 1505, the enumerator 1506, and the like which correspond to the drivers managed by the own drivers, to the OS 1701. In this case, the pseudo bus driver 1504 transmits such a message that the object pointer corresponding to the device A 151 is invalid (1808).

When the above-mentioned process is completed under normal conditions, the OS 1701 allows the pseudo bus driver 1504 to terminate the device (1809). When the above-mentioned process is not completed under normal conditions, the OS 1701 does not allow the pseudo bus driver 1504 to terminate the device. In the case that the procedures from 1806 to 1808 are not carried out under normal conditions, the pseudo bus driver 1504 instructs the GUI application 1507 via the communication program 1508 to display a message that the device A 151 cannot be plugged out under normal condition so as to be displayed to the user, and also records this message on the log provided in the PC-A 110 and the log of the authentication management server 101.

Next, both the pseudo bus driver 1504 and the communication program 1508 notify completion of the plug-out to the communication program 1501 and the filter driver 1514 respectively (1811 and 1812). At this time, the startup physical device object 1505 produced for the device A 151 is deleted (1810). The communication program 1510 transmits an event waiting request to the filter driver 1514 (1813). With execution of the above-mentioned processes, the device A 151 is plugged out from the PC-D 113.

In a case where the virtual device manager 120 judges that the device A 151 cannot be plugged out (is being used) in the judging operation for judging whether or not the device A 151 can be plugged out after 1804, instead of the plug-out completion notification, such a plug-out not-possible notification is similarly transmitted from the pseudo bus driver 1504 via the communication program 1508 and the communication program 1510 to the filter driver 1514.

When the new device is plugged in and plugged out which have been described by FIG. 17 and FIG. 18, a new filter driver 1514 is not installed nor uninstalled. As a consequence, in a system in which the PC-D 113 does not give installation rights for a device driver, to the user, even when the OS of the PC-D 113 is an OS which is limited only to a thin client, the user can easily utilize the newly plugged-in device from the PC-A 110, and also can disconnect (plug out) this newly plugged-in device in a safe manner.

Figure 26:
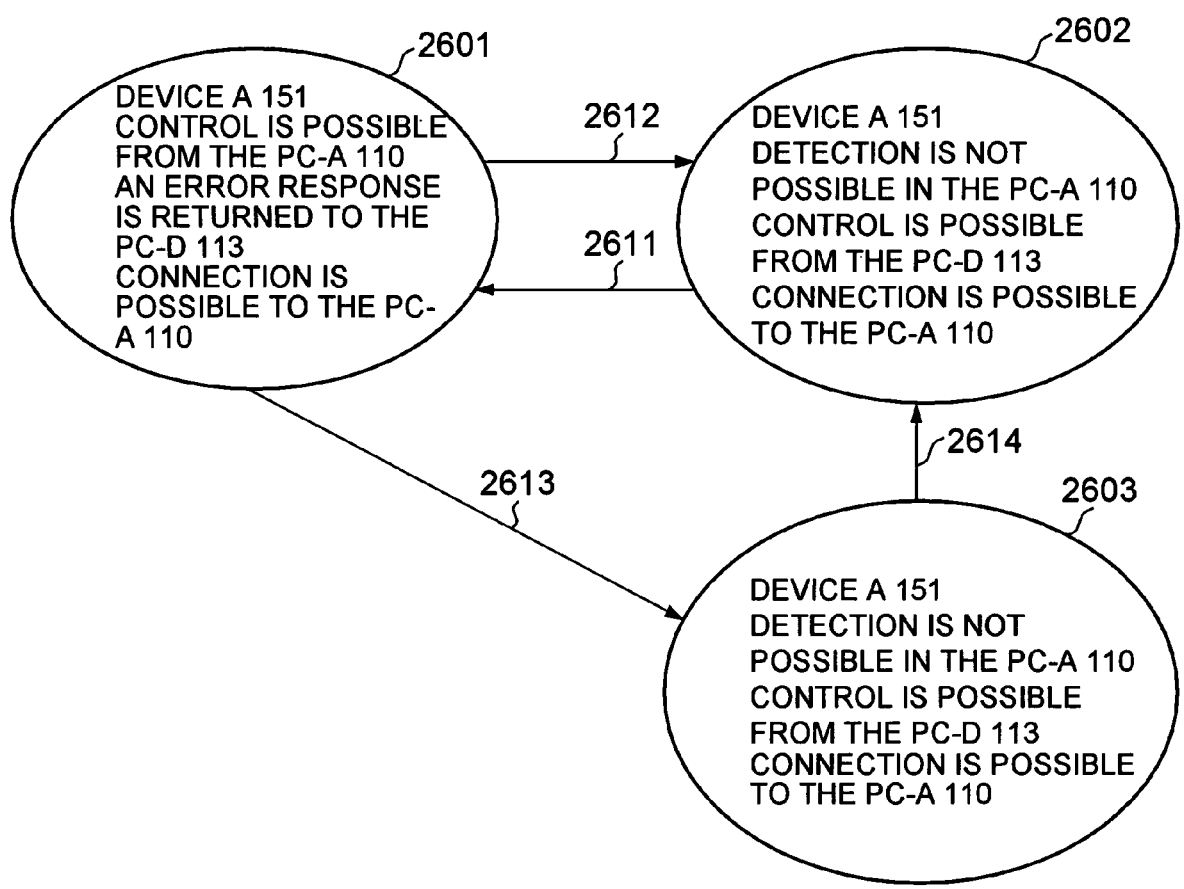
FIG. 26 is a state transition diagram of a usage state of a device A, managed by a device manager of an embodiment.

Next, system operations are explained using FIG. 26 for cases in which a communication error is generated in the device driver, while using the device during processing of the plug-in or after plug-in, as explained above, or cases in which the user unplugs the device.

FIG. 26 is a state transition diagram of usage states of the device A 151 that is managed by the device manager 123. The device manager 123 manages the device A 151 in one of the three states below. That is, a state 2601 in which "control is possible from the PC-A 110, an error response is returned to the PC-D 113, and connection is possible to the PC-A 110", a state 2602 in which "detection is not possible in the PC-A 110, control is possible from the PC-D 113, and connection is possible to the PC-A 110", and a state 2603 in which "detection is not possible in the PC-A 110, control is possible from the PC-D 113, and connection is possible to the PC-A 110".

Immediately after the device A 151 is connected to the PC-D 113, a recording is made in the device manager 123 that the device A 151 is in the state 2602. In this state 2602, the device A 151 can be used from an application on the PC-D 113.

In this state 2602, after the plug-in operation explained using FIG. 17 has been completed, and plug-in completion notification 1718 has been received by the device manager 123, the device manager 123 recognizes and records that the device A 151 has transited (2611) into the state 2601. In the state 2601, the device A 151 is in a state in which control by applications on the PC-A 110 is possible. Furthermore, a request transmitted from an application on the PC-D 113 to the device A 151 does not reach the device A 151, since a request including an error is returned from the filter driver 1514, and as a result, the state is one in which control is not possible from the PC-D 113.

When unplug processing, explained using FIG. 18, from the state 2601 is carried out, the state of the device A 151 transits (2612) to the state 2602, and in the transited state, the device manager 123 recognizes and records the transited state.

When the device A 151 is the state 2601, and an error is detected in the virtual device manager 120, or when unplug processing of the device A 151 explained using FIG. 18, by a command from the user, is performed, the state of the device A 151 transits (2613) to the state 2603.

The state 2603 is arranged to provide a state in which the device A 151, that has been unplugged, cannot be reconnected once to the PC-A 110. By moving to this state 2603, when an error related to the device A 151 is detected in the virtual device manager 120, or when the device A 151 is unplugged by a command of the user, the device manager 123 plugs-in the device A 151, and it is possible to prevent the same error from occurring again.

After the device A 151 is physically separated from the device bus, the state 2603 transits (2614) to the state 2602 by making a physical reconnection to the device bus. In order for the user to be able to again use a device in which it is recorded once that the state of the device manager 123 is 2603, from an application on the PC-A 120, it is necessary perform physical separation from the device bus.

Figure 24:
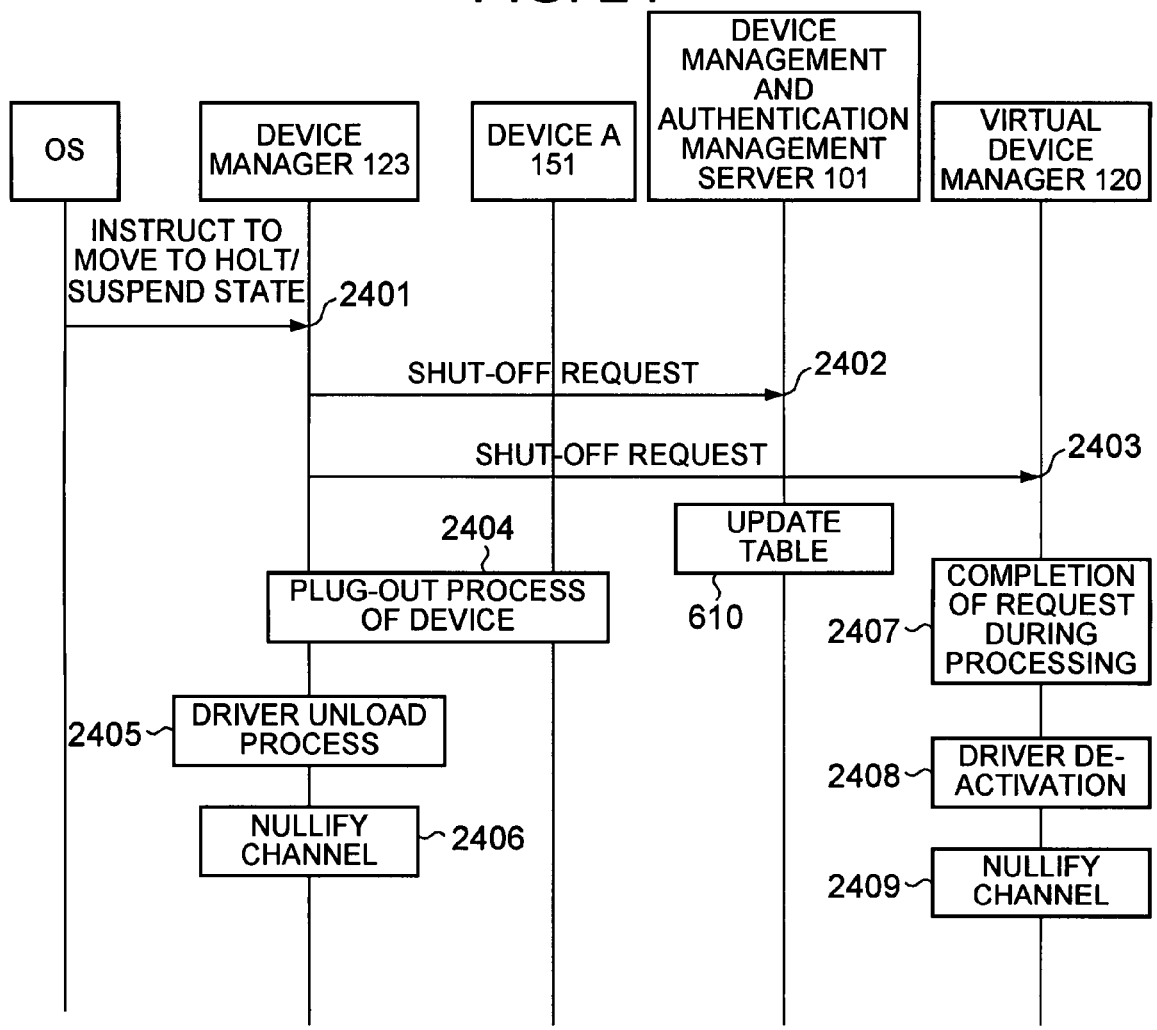
FIG. 24 is a diagram explaining a sequence when a transition occurs in a power supply, for a PC-D of an embodiment, to being shut-off, or to a halt state, or to a suspend state.
Figure 25:
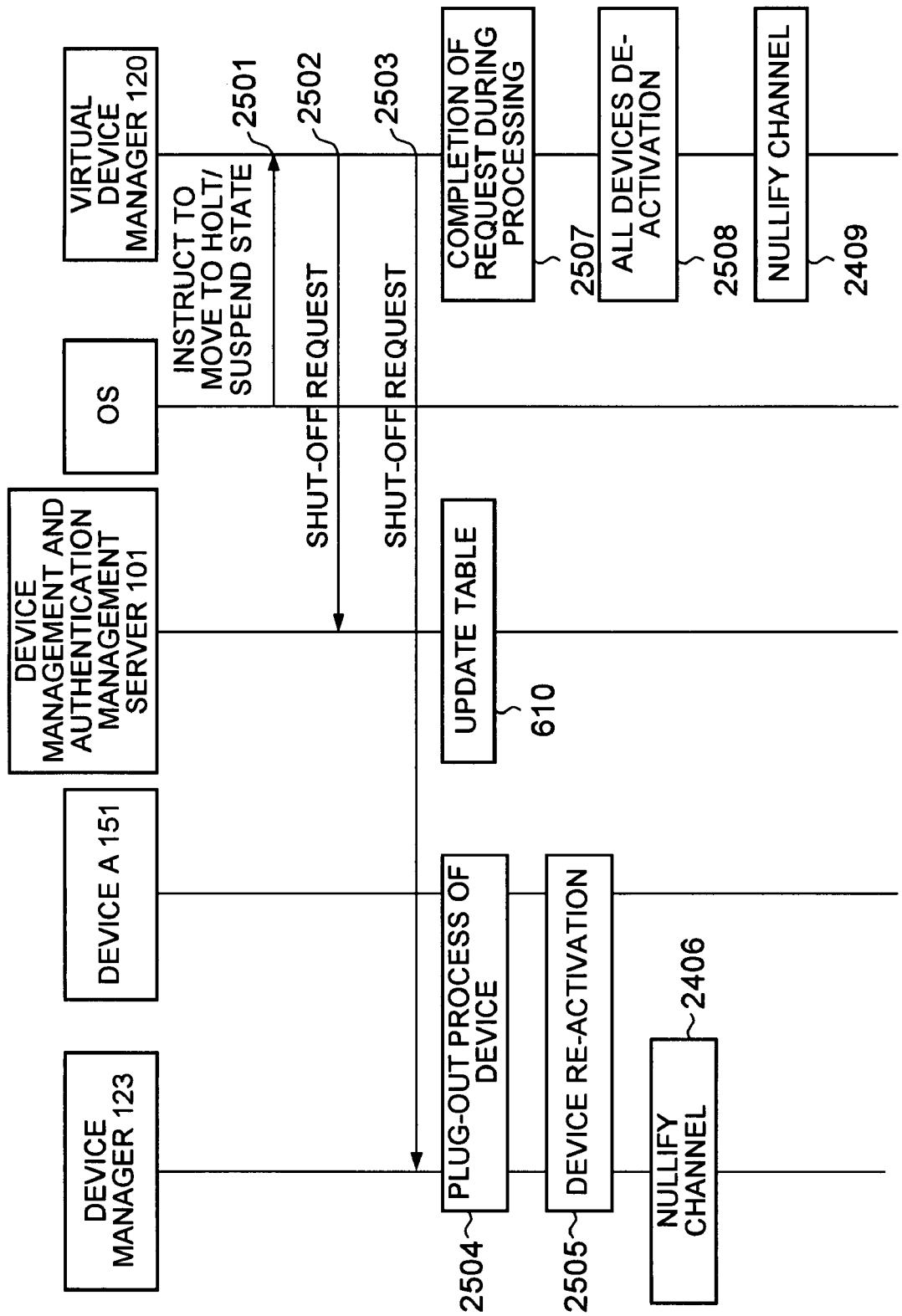
FIG. 25 is a diagram explaining a sequence when a transition occurs in a power supply, for a PC-A of an embodiment, to being shut-off, or to a halt state, or to a suspend state.

Next, an explanation is given using FIG. 24 and FIG. 25 concerning operations of the system when the power supply is shut off from the PC-D 113 or the PC-A 110, or when a transition occurs to a halt state or a suspend state (energy saving state).

FIG. 24 is a sequence diagram for cases in which the power supply is shut off from the PC-D 113, or when a transition occurs to a halt state or a suspend state. When the power supply is shut off from the PC-D 113, or when an instruction to move to a halt state or a suspend state is given by the device manager 123 (2401), the device manager 123 transmits a shut-off request to the authentication management server 101 and the virtual device manager 120 (2402, 2403).

The authentication management server 101 that has received the shut-off request 2402 performs renewal of the table (601), and renews the table showing a relationship between the device that is connected inside the system, and devices such as, for example, the PC-A 110 or the PC-D 113.

The virtual device manager 120 that has received the shut-off request 2403 completes the request during processing related to the device connected to the PC-D 113, that is processed in the virtual device manager 120 (2407). The method of completion depends on the type of device, and, for example, for the request, a response including error information such as the occurrence of time-out, or the like, is transmitted.

Regarding the order in which nullifying of the communication channel (session shut-off) (2409) and completion of request during processing (2407) or of de-activating the driver (2408), in order to minimize as much as possible the possibility of a hang-up due to communication between the device driver and the device manager 123 being cut off, it is desirable that processing of the completion of the request during the processing referred to (2407), or de-activating the driver (2408), be carried out, and after that, that nullification processing (session shut-off) of the communication channel, in which the time-out has occurred, be carried out. The device manager 123 that has received the shut-off request performs plug-out processing of all devices (2404), and the device driver of a device in which plug-out has succeeded is unloaded from the memory of the PC-D 113 (2405). The device manager 123 then performs nullifying (session shut-off) of all communication channels formed with the virtual device manager 120 (2406).

Regarding the order in which nullifying of the communication channel (session shut-off) (2406) and plugging out the device (2404) or rendering the device active (2405), in order to minimize as much as possible the possibility of a hang-up due to communication between firmware operating on the device driver or the device A 151, and the virtual device manager 120, it is desirable that processing of the plug-out processing of the device mentioned (2404), or rendering the device active (2405), be carried out, and after that, that nullification processing (session shut-off) (2406) of the communication channel, in which the time-out has occurred, be carried out.

FIG. 25 is a sequence diagram of cases in which shut-off processing of the power supply in the PC-A 110 is started, or in which there is a transition to a halt state or a suspend state. When start processing for the shut-off of the power supply or the transition to a halt or suspend state is instructed by the virtual device manager 120 (2501), the virtual device manager 120 transmits a shut-off request to the authentication management server 101 and the device manager 123 (2502, 2503).

The authentication management server 101 that has received the shut-off request 2502 performs renewal of the table (601), and renews the table showing a relationship between the device that is connected inside the system, and devices such as, for example, the PC-A 110 or the PC-D 113.

The device manager 123 that has received the shut-off request 2503 performs plug-out processing on all devices related to the PC-A 110 (2504), and the device driver of the device for which plugging out has succeeded performs re-activation (2505). During this re-activation processing 2505, a signal for re-starting is transmitted to the device A 151. After the re-activation 2505 for this, the shut-off request from the device class driver 1513 shown in processing 2210 is rescinded, and the device A 151 becomes usable by applications on the PC-D 113.

Next, the device manager 123 performs nullification (session shut-off) of the communication channel formed with the virtual device manager 120 (2406).

Regarding the order in which nullifying of the communication channel (session shut-off) (2406) and unplugging the device (2504) or re-activating the device (2505), in order to minimize as much as possible the possibility of a hang-up due to communication between firmware operating on the device driver or the device A 151, and the virtual device manager 120, it is desirable that processing for the unplug processing of the device mentioned (2504), or re-activating the device active (2505), be carried out, and after that, that nullification processing (session shut-off) (2406) of the communication channel, in which the time-out has occurred, be carried out.

The reason for performing the re-activation processing 2505 of the de-activated device driver is explained. After the power supply has been provided, peripheral devices such as the device A 151 operate by instructions from the OS of the connected PC-D 113 and the device driver. The requests transmitted from the device driver to the device are generally managed according to the order of the requests. Therefore, when a shut-off request is rescinded, by de-activating and re-activating the device and the device driver, the device state is initialized and it is again possible to use the device from applications on the PC-D 113.

The virtual device manager 120 that has received the shut-off request completes the request during processing related to all devices being processed in the virtual device manager 120. The method of completion depends on the type of device, and, for example, a response is transmitted with regard to a request including error information such as the occurrence of a time-out. Next, the virtual device manager 120 performs de-activation of the device driver related to the device connected to the PC-D 113 (2508). The device manager 120 then performs nullification (session shut-off) of all communication channels formed with the device manager 123 (2409).

Regarding the order in which nullifying of the communication channel (session shut-off) (2409) and completion of request during processing (2507) or of de-activating the driver (2408), in order to minimize as much as possible the possibility of a hang-up due to communication between the device driver and the device manager 123 being cut off, it is desirable that processing of the completion of the request during the processing referred to (2507), or de-activating the driver (2408), be carried out, and after that, that nullify processing (session shut-off) (2409) of the communication channel, in which the time-out has occurred, be carried out.

Here, the orders 2402 and 2502, in which shut-off requests to the authentication management server 101 are performed, are not essential, and in the state transition explained using FIG. 18 of the device connected to the PC-D 113, the virtual device manger 120 and the device manger 123 may share whichever state exists.

Figure 27:
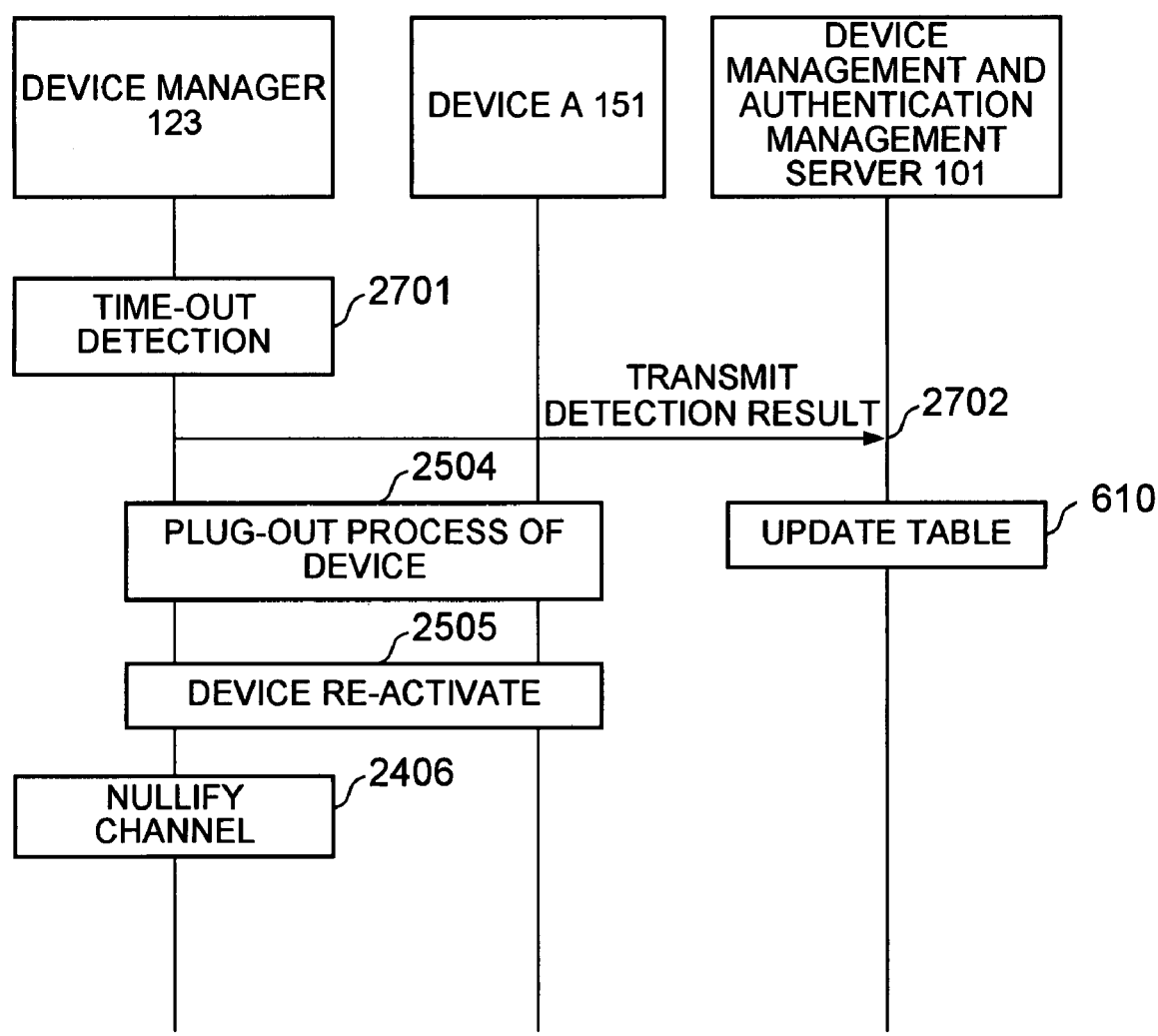
FIG. 27 is a diagram explaining a sequence when a timeout is detected in communication of the device manager with a virtual device manager, for the PC-D of an embodiment.

Next, an explanation is given using FIG. 26 and FIG. 27 concerning operations of the system when communication time-out is detected by the virtual device manager 120 or the device manager 123, and nullification (session shut-off) is performed for the communication channel formed by the virtual device manger 120 or the device manager 123.

FIG. 27 is a sequence diagram of cases in which, in the PC-D 113 the device manager 123 cannot confirm communication with the virtual device manager 120 in a predetermined time, and a time-out judgment is made.

When the device manager 123 detects the time-out (2701), the device manager 123 transmits a detection result that the time-out has been detected, to the authentication manager server 101 (2702). The authentication manager server 101 performs renewal of the table (610), and renews the table showing a relationship between the device connected in the system and devices such as, for example, the PC-A 110 or the PC-D 113.

The device manager 123 that has detected the time-out performs unplug processing of the device on the PC-D 113 realized to the virtual device manager 120 (2504), and re-activates the device driver of the devices in which the time-out has been realized, that is the upper level driver 1512, the device class driver 1513, and the filter driver 1514 (2505).

During this re-activation processing 2505, the filter driver 1514 transmits a restart signal to the device A 151, and rescinds the request from the device class driver 1513 shown in 2210. By these processes, the device A 151 can be used from applications on the PC-D 113.

Next, the device manager 123 performs nullification (session shut-off) of the communication channel formed with the virtual device manager 120 (2406).

Regarding the order in which nullifying of the communication channel (session shut-off) (2406) and unplugging the device (2504) or re-activating the device (2505), in order to minimize as much as possible the possibility of a hang-up due to communication between firmware operating on the device driver or the device A 151, and the virtual device manager 120, it is desirable that processing for the unplug processing of the device mentioned (2504), or re-activating the device active (2505), be carried out, and after that, that nullify processing (session shut-off) (2406) of the communication channel, in which the time-out has occurred, be carried out.

Figure 28:
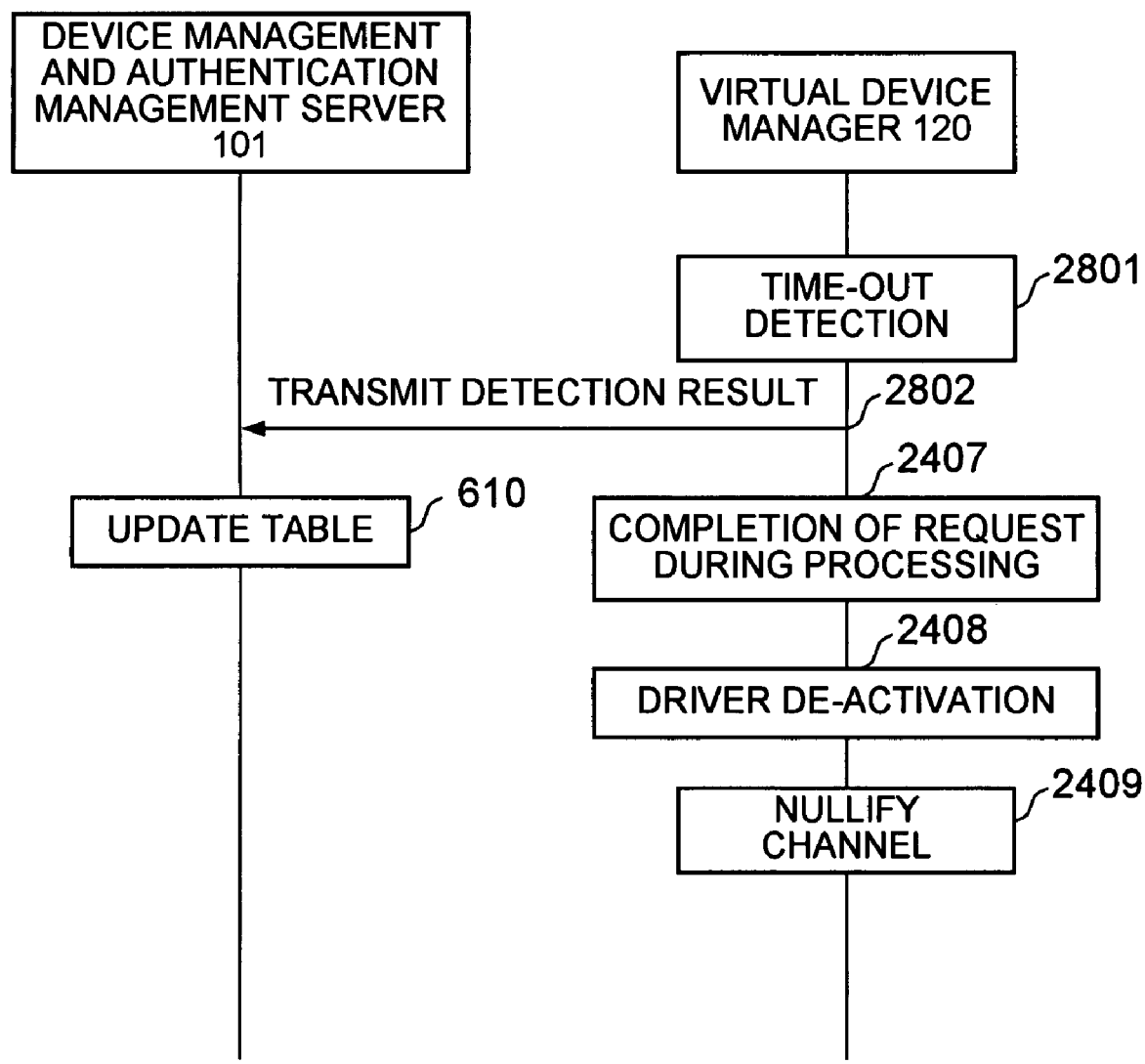
FIG. 28 is a diagram explaining a sequence when a timeout is detected in communication of the virtual device manager with the device manager, for the PC-A of an embodiment.

FIG. 28 is a sequence diagram of cases in which, in the PC-A 110, the virtual device manager 120 cannot confirm communication with the device manager 123 in a predetermined time, and a time-out judgment is made. When the virtual device manager 120 detects the time-out (2801), the virtual device manager 120 transmits a detection result that the time-out has been detected, to the authentication manager 101 (2802). The authentication manager 101 performs renewal of the table (610), and renews the table showing relationships between the devices connected in the system and, for example, devices such as the PC-A 110 or the PC-D 113.

The virtual device manager 120 that has detected the time-out processes the request during processing for devices related to the device manager 123 on the PC-D 113. The method of completion depends on the type of device, and, for example, a response is transmitted with regard to a request including error information such as the occurrence of a time-out. Next, the virtual device manager 120 performs de-activation of the device driver related to the device connected to the PC-D 113 (2408). The device manager 120 then performs nullification (session shut-off) of all communication channels formed with the device manager 123 (2409).

Regarding the order in which nullifying of the communication channel (session shut-off) (2409) and completion of request during processing (2507) or of de-activating the driver (2408), in order to minimize as much as possible the possibility of a hang-up due to communication between the device driver and the device manager 123 being cut off, it is desirable that processing of the completion of the request during the processing referred to (2407), or de-activating the driver (2408), be carried out, and after that, that nullify processing (session shut-off) (2409) of the communication channel, in which the time-out has occurred, be carried out.

Here, the orders 2702 and 2802, in which the detection result is transmitted to the authentication management server 101 are performed, are not essential. In the state transition explained using FIG. 18 of the device connected to the PC-D 113, the virtual device manger 120 or the device manger 123 may share whichever state exists.

When communication of the device manager 123 with the virtual device manager 120 is recovered, the state of the devices connected in the PC-D 113 is shared between the virtual device manager 120 and the device manager 123, and the shared result is transmitted to the authentication management server 101.

Figure 12:
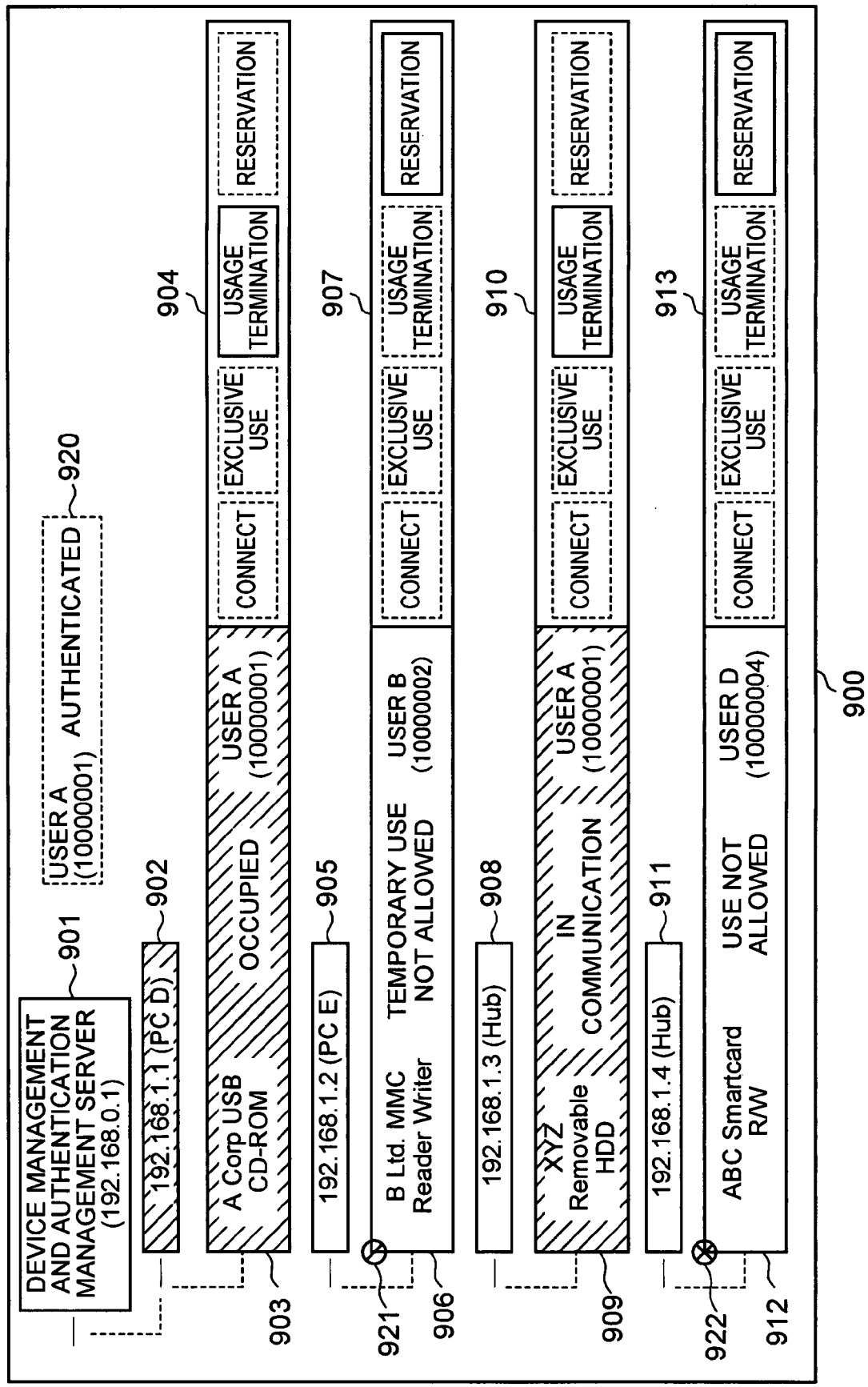
FIG. 12 is one example of a device management view of the virtual device manager of the first embodiment.

The device management view that the virtual device manager 120 creates and displays will be described in detail. FIG. 12 is one example of the device management view of the virtual device manager 120.

As shown in the figure, the device management view 900 includes the device management and authentication management server display section 901, coupled PC or hub display sections 902, 905, 908, and 911, device display sections 903, 906, 909, and 912, and connection/disconnection instruction sections 904, 907, 910, and 913.

Upon startup, the virtual device manager 120 sends a request for acquiring available device information to the pre-specified device management and authentication management server 101.

After successful user authentication in the device management and authentication management server 101, the device management information is sent from the device manager 123 to the virtual device manager 120. Based on the received device management information, the virtual device manager 120 manages available device information and the like.

In the device management and authentication management server display section 901 shown in FIG. 12, the device management and authentication management server 101 in communication with the virtual device manager 120 is displayed. The example shown in FIG. 12 displays that the virtual device manager 120 is successfully in communication with the device management and authentication management server 101. In this example, the displayed "1192.168.0.1" is the address of the device management and authentication management server 101.

The status 920 displays the status of the device management and authentication management server 101. In this example, displayed status includes the usage permitted user ID, user name, and the like. The example of FIG. 12 displays that the user A has been authenticated.

The coupled PC or hub display sections 902, 905, 908, and 911 display the information on the coupled PCs and hubs. They also display the devices currently used by users in respective colors.

The device display sections 903, 906, 909, and 912 display the information, such as the device names and their statuses, and user IDs so as to display which device is available to users in an easily understandable manner.

The connection/disconnection instruction sections 904, 907, 910, and 913 display choices by which the user can provide his/her instruction, related to use, exclusive use, usage termination, or reservation of the device. The virtual device manager 120 accepts the push of the reservation button and makes a usage reservation for the device currently in use by another user. Then, the virtual device manager 120 notifies, when the device becomes available, the device management and authentication management server 101 or device manager 123 that the device has become available. The device manager 123 that received the notification notifies the user that the device has become available. In the example of FIG. 12, devices available to users are shown as hatched and operations that users can carry out are shown with boldface buttons for user-friendly operation.

The client/server architecture for using the PC-A 110 in the blade server 106 by using the PC-D 113 has been described above.

As in the example already described, it is possible to use any of the PCs in the blade server 106 or the devices A 151 to Z 155 from a client apparatus which is coupled to the network 103 and the Internet 104.

In this example, the hub 116 is a built-in instrument that does not have the functionality of a PC but has a manager 126 and a storage unit 176 therein. When using a PC having no device coupled thereto like the PC-E 114, it is also possible to use devices coupled to other PCs as in the example of the PC-D 113. This also applies to the case where a plurality of devices is coupled like the hub 116.

The same also basically applies to cases in which the PC-Z 117 is used, via the Internet 104 and the firewall 105, and a PC or device on the network 103 is used. In such cases, however, it is desirable that the PC-Z 117 has an encryption application 190 therein, for encrypting the communication on the Internet 104, and that it performs encrypted communication.

As previously described, in accordance with the device management system of the first embodiment, a device connected to an information appliance such as a PC (personal Computer) on which the device manager 123 is operated is set so that the virtual device manager 120 installed on the server is been virtually connected to the server. As a consequence, the device can be shared in a safe and simple manner between an information terminal such as a PC and a thin client, which is kept and operated by a user close at hand, and a server installed at a remote location separated from where the user utilizes the information terminal kept close at hand. As a result, utilization by the user can be improved. Also, the authentication is carried out in the procedures for sharing the device, and the rule capable of checking whether or not the user can use the device is established, so the security property when the device management system is used can be improved.

Also, in accordance with the first embodiment, while the filter driver is provided, which exclusively controls the party transmitting or receiving data to or from the physical bus driver for operating the device on the client side, the pseudo bus driver is provided on the server side, which is operated in a pseudomode similar to that of the physical bus driver with respect to the communication program. As a result, the device is merely connected, so the device connected from the server side to the client can be used without performing any other operations (plug and play).

Since the server and the device are virtually connected, confidential information left in an information appliance such as the PC, in which operations have been performed, can be reduced. Accordingly, in the server/client type information processing system, the security aspects when the user uses the information appliance can be improved.

According to the present embodiment, when a transition occurs to power supply shut-off processing, or a suspend or halt state on the server and client side, or when communication is cut off between the server and the client, by rescinding the shutting off of requests on the client side, or performing de-activation or activation of a device, and making a device that, while connected to the client, is made non-usable from the client and usable from the server, usable once more from the client, it is possible to improve usability for the user.

Second Embodiment

Next, a device management system of a second embodiment will be described to which the inventive idea of the present invention has been applied. The device management system of the second embodiment basically contains a similar configuration to that of the first embodiment. It should be understood that although the communication program 1508 has been directly communicated via the network 103 with the communication program 1510 in the first embodiment, the communication program 1508 is communicated via a remote operation program with the communication program 1510 in this second embodiment. The remote operation program implies the following program. That is, while 2 programs operated on 2 PCs are communicated to each other via a network, either an entire screen or a partial portion of the screen of one PC, on which one program is operated, is displayed on a screen of the other PC on which the other program is operated. While the remote operation program is being operated, the screen of one PC is displayed on the screen of the other PC. At this time, all input operations using a mouse, a keyboard, and a microphone, with respect to such a PC which is physically used by the user, are transmitted to another PC by a remote operation, so the user can remotely control the PC simply from a remote location.

An explanation is given below of differences from the first embodiment. Other processes are similar to the first embodiment.

Figure 19:
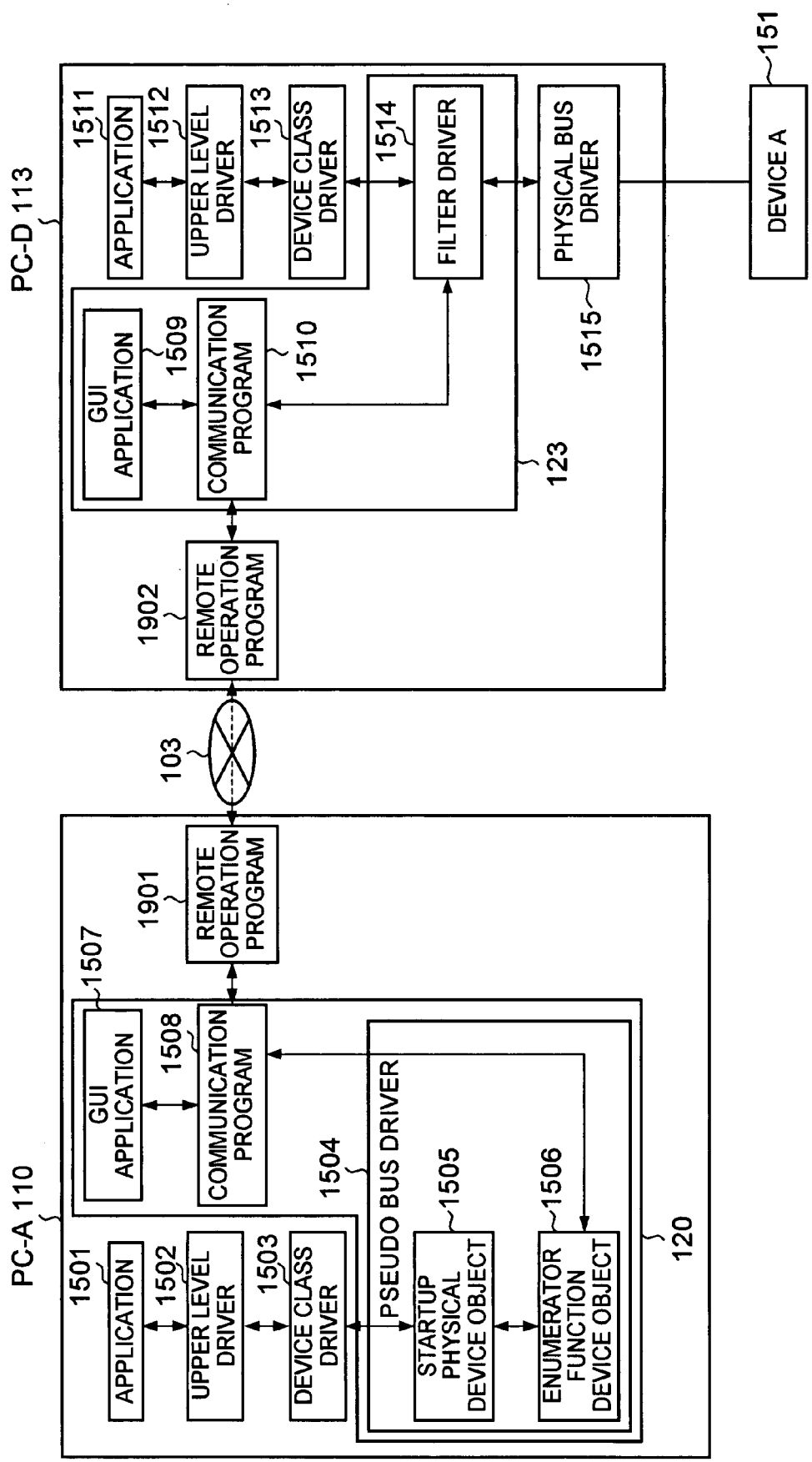
FIG. 19 is a diagram describing communications of a program according to a second embodiment of the present invention.

FIG. 19 is a diagram for describing software which is required for controlling data transmission/reception operations when a device is shared between the PC-A 110 and the PC-D 113 of the first embodiment shown in FIG. 1 in the device management system of the second embodiment.

In the device management system shown in the first embodiment, the communication program 1508 is directly communicated via the network 103 with the communication program 1510. On the other hand, in this second embodiment, the communication program 1508 communicates with a remote operation program 1901 loaded into the memory of the PC-A 110, and the communication program 1510 of the PC-D 113 communicates with another remote operation program 1902 loaded into the memory of the PC-D 113. Then, the remote operation program 1901 and the remote operation program 1902 communicate with each other.

Each of the remote operation program 1901 and the remote operation program 1902 correspond to a program for allowing the user to log in to the PC-A 110 from the PC-D 113, causing a processed result of an operated program in the memory of the PC-A 110 to display on the screen of the PC-D 113, and the like.

The remote operation program 1901 is connected to the remote operation program 1902 through predetermined authentication. As a result, the virtual device manager 120 need not issue an authentication request to the device manager 123. As a consequence, IP address information of the authentication management server 101 required to access the authentication management server 101 is not required to be stored within the PC-D 113, or the user is not required to enter information for accessing the authentication management server 101. Information for indicating whether or not the device A 151 has been connected, and a policy as to a type of connectable device are transmitted from the authentication management server 101 via the virtual device manager 120 to the device management system. As a result, in this second embodiment, the PC-D 113 side may be realized as, for example, an information processing apparatus having only a simple function such as a thin client.

Also, in the second embodiment, since the device manager 123 of the PC-D 113 does not access the authentication management server 101, process flow when a device sharing process is executed, and flow when a device sharing end process is executed are given as follows.

Figure 20:
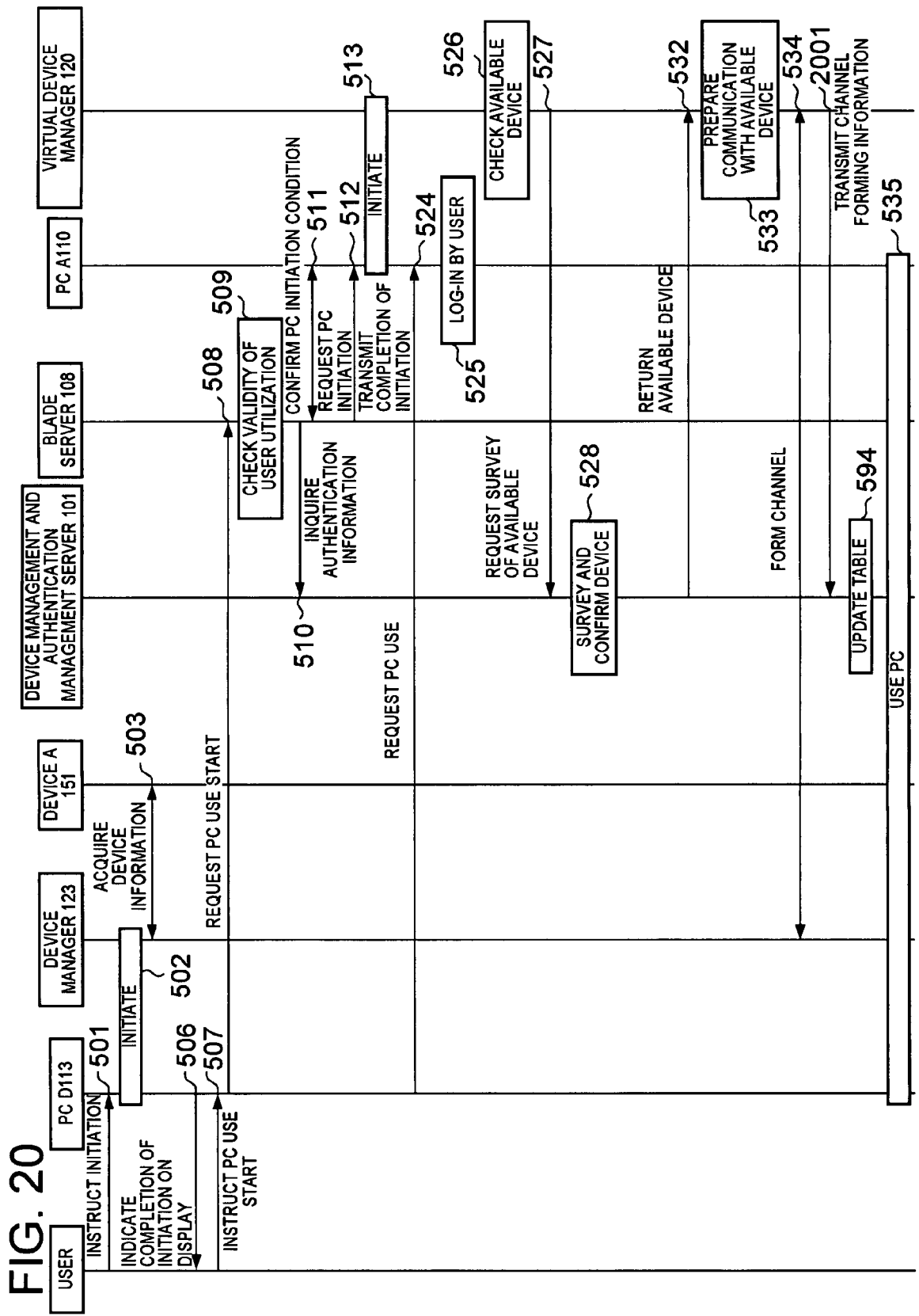
FIG. 20 is a process flow of a device sharing process according to the second embodiment.

FIG. 20 is a process flow of a device sharing process executed in the device management system of the second embodiment. The same reference numerals shown in the process flow of FIG. 6 of the first embodiment will be employed as those for denoting the same processes in the second embodiment.

In the second embodiment, both the device manager 123 and the virtual device manager 120 communicated with each other via the remote operation program 1901 and the remote operation program 1902.

As represented in this drawing, the process flow of the device sharing process according to the second embodiment is basically similar to that of the first embodiment, as represented in FIG. 6. However, in the process flow of this second embodiment, different from the process flow of the device sharing process shown in the first embodiment, the processes defined in 504, 505, 515 to 523, 591, 592, 529, 530, and 531 of FIG. 6 are omitted. This is because, as described above, the device management server 123 does not access the authentication management server 101.

Also, different from the process flow of the first embodiment, after the channel generation (534), the information of the generated channel is transmitted from the virtual device manager 120, via the remote operation program 1901, to the authentication management server 101 (process of transmitting channel production information; 2001). This implies that the device manager 123 applies usage rights of all devices under management by the device manager 123 with respect to the virtual device manager 120 connected via the remote operation program 1902.

Next, the process flow of the device sharing end process in the device management system of the second embodiment will be described with reference to FIG. 21. Here, the same reference numerals shown in the process flow of FIG. 7 of the first embodiment will be employed for those for denoting the same processes in this second embodiment.

The process flow when the device sharing end process of the second embodiment is carried out is basically similar to the processes of the first embodiment shown in FIG. 7. However, in this second embodiment, device release information is not transmitted from the authentication management server 101 (606). Instead of this device release information transmission, the virtual device manager 120 transmits device release information corresponding to information for indicating that the utilization of the instructed device is ended to the device manager 123 of the device use end request source (2101). In the case where the device manager 123 nullifies a channel which has been established with respect to the virtual device manager 120 and the virtual device manager 120 can succeed in nullifying the channel, channel nullification information is not transmitted from the device manager 123 to the authentication management server 101 (609). Alternatively, after the virtual device manager 120 has nullified the channel (608), the virtual device manager 120 transmits channel nullification information corresponding to information which indicates that nullifying of the channel is completed to the authentication management server 101 (2102). As previously described, this reason is given as follows. That is, the device manager 123 does not access the authentication management server 101.

Figure 21:
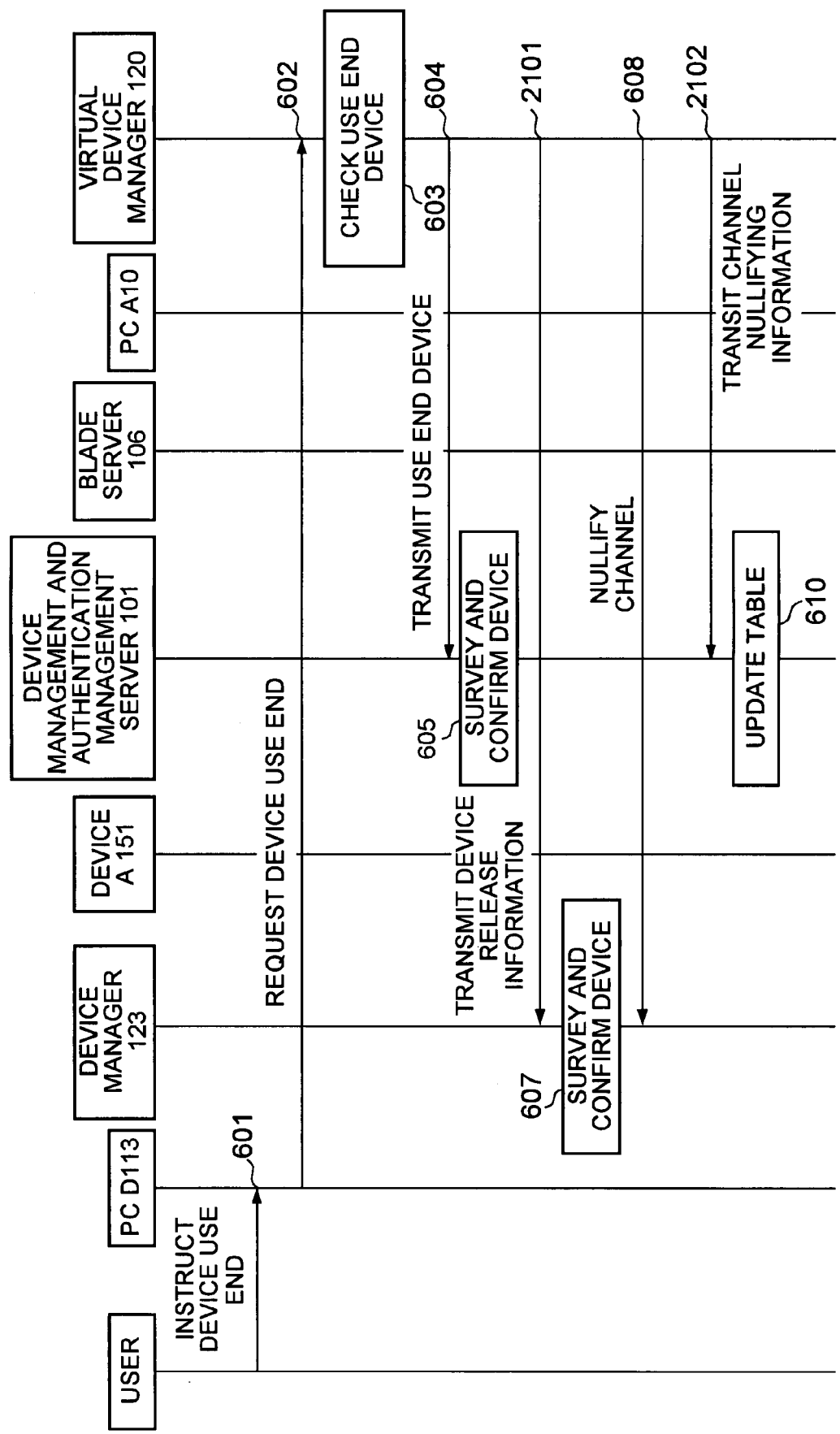
FIG. 21 is a process flow of a device sharing end process according to the second embodiment.

As previously described, in the process flows shown in FIG. 20 and FIG. 21, the process flows can be established even if the device manager 123 does not save the data indicative of the access destination address such as, for example, an IP address of the authentication management server 101.

As previously described, in accordance with the device management system of the second embodiment, a device connected to an information appliance such as a PC (personal computer) on which the device manager 123 is operated is set in such a manner that the virtual device manager 120 installed on the server has been virtually connected to the server. As a consequence, the device can be shared in a safe and simple manner between an information terminal such as a PC and a thin client, which is kept and operated by a user close at hand, and a server installed at a remote location separated from where the user utilizes the information terminal that is close at hand. As a result, utilization by the user can be improved. Also, the authentication is carried out in the procedures for sharing the device, and a rule capable of checking whether or not the user can use the device is established, so security when the device management system is used can be improved.

Also, in accordance with the second embodiment, while the filter driver is provided on the client side, which exclusively controls the data transmission/reception counter party with respect to the physical bus driver for operating the device, the pseudo bus driver is provided on the server side, which is operated in a pseudo mode similar to that of the physical bus driver with respect to the communication program. As a result, the device is merely connected, so the device connected from the server side to the client can be used without performing any other operations (plug and play).

Since the server and the device are mutually connected in the virtual manner, confidential information left in an information appliance, such as a PC which has been used for operations, can be reduced. Accordingly, in the server/client type information processing system, security aspects when the user uses the information appliance can be improved.

Moreover, in the device management system of the second embodiment, if the remote operation program 1901 and the remote operation program 1902 do not commence the communications, then the device manager 123 is not connected to the virtual device manager 120. As a consequence, the virtual device manager 120 need not issue the authentication request to the device manager 123, and thus, the flow of the device processes can be simplified, as compared with the device management system of the first embodiment, so unnecessary communication cost is not produced. Also, since the device management and authentication management server 101 is not directly communicated with the device manager 123, the network configuration can be made simpler.

As previously described, in the device management systems shown in the first and second embodiments, the devices connected to the network 103 via the PC-D 113 corresponding to the client apparatus are managed by the virtual device manager 120, the device manager 123, and the authentication management server 101. As a result, sharing of the devices provided in the device management systems can be realized in a safe user friendly manner.

Also, in accordance with the first and second embodiments, even when a device connected to another client apparatus is present, this device can be utilized as if this device were directly connected to the server 106. In other words, even in a case where a device has been connected to another client apparatus, specific configurations are not required in the respective client apparatuses in order to use the first-mentioned device. As a consequence, even when the device is virtually connected to the server, and also when the device is directly connected to the server, the same configurations may be employed. As a result, the manufacturing cost of the entire device management system can be reduced.

Also, in accordance with the first and second embodiments, it is possible to set the permission/non-permission of the device to be managed by the authentication management server 101, and a device which is not permitted cannot be utilized as a shared device (virtual device). As a consequence, the devices connected on the network 103 can be appropriately managed, and in the server/client system, the security aspects in the case where the device is shared between the client and the server located at a remote location can be improved.

In the first and second embodiments, the device management systems correspond to a server/client system having a configuration in which a main program and data are stored on the server side, whereas the client side mainly only gives an operation instruction to the server. As a consequence, while a feature remains, in which confidential information left in the client apparatus on the operation side still remains, the information processing system capable of improving security and utilization when the client is used can be provided.

Also, in the first and second embodiments, since the device may behave as if this device were connected to the server, such programs which use the device and manage the device may be installed only on the server side; for example, a security tool such as a virus checker and a program for operating the device may be installed on the server side, whereas these programs need not be installed on the client side. As a consequence, there is an advantage in that the cost of the entire system can be further lowered.

It should also be understood that in the above-mentioned first and second embodiments, the information appliances corresponding to both the server and the client have been exemplified as personal computers (PCs). Alternatively, one, or both of these information appliances may be exemplified as servers, personal digital assistants (PDAs), workstations, high-performance copying machines, automatic teller machines (ATMs), portable telephones, digital still cameras, music reproducing (recording) apparatuses, point-of-sales (POS) commodity management systems, street corner terminals, intelligent transport system (ITS)-purpose transmitters, ticket machines, settlement terminals, vending machines, room entering/leaving managing apparatuses, game machines, public telephones, order-purpose portable terminals, and the like. Similar advantages may be achieved in these alternative cases.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A device management system, comprising:
a server;
a client which issues an instruction to the server and receives a result of executing the instruction from the server; and
an authentication management server which authenticates the client, wherein:
the server, the client, and the authentication management server are connected to each other via a network;
the client has a device connected thereto, the device being exclusively controlled from one of the client and the server;
the client includes device managing means which transmits and receives data to and from a bus driver in the client, and transmits and receives the data to and from the server;
the authentication management server includes device information holding/use right managing means which manages a use right for the device;
the server includes virtual device managing means which controls transmission and reception of data via the network between a first application in the server and the device managing means of the client, in accordance with the use right held in the device information holding/use right managing means of the authentication management server;
a first device driver which is included in the server generates a first request for using the device connected to the client upon receipt of an instruction from a second application which is included in the server;
the virtual device managing means of the server transmits the first request to the client via a communication channel provided on the network;
a second device driver which is included in the client generates a second request for using the device upon receipt of an instruction from a third application which is included in the client; and
the device managing means of the client:
starts up the device connected to the client, the device being exclusively used by the client,
allows the server to exclusively use the device connected to the client,
receives the first request to be generated by the first device driver which is included in the server, via the communication channel, after allowing the server to exclusively use the device connected to the client,
converts the first request to generate a third request to be processed by the bus driver of the client to use the device connected to the client from the server, and
when allowing the server to exclusively use the device connected to the client, initializes the device, and interrupts the second request to be generated by the second device driver.

2. A device management system, comprising:
a server;
a client which issues an instruction to the server and receives a result of executing the instruction from the server; and
an authentication management server which authenticates the client, wherein:
the server, the client, and the authentication management server are connected to each other via a network;
the client has a device connected thereto, the device being exclusively controlled from one of the client and the server;
the client includes device managing means which transmits and receives data to and from a bus driver in the client, and transmits and receives the data to and from the server;

the authentication management server includes device information holding/use right managing means which manages a use right for the device;

the server includes virtual device managing means which controls transmission and reception of data via the network between a first application in the server and the device managing means of the client, in accordance with the use right held in the device information holding/use right managing means of the authentication management server;

a first device driver which is included in the server generates a first request for using the devise connected to the client upon receipt of an instruction from a second application which is included in the server;

the virtual device managing means of the server:
generates a second request by converting specific information included in the first request into information having a format not depending on the server, and
transmits the second request to the client via a communication channel provided on the network;

a second device driver in the client generates a third request for using the device upon receipt of an instruction from a third application which is included in the client; and the device managing means of the client:
starts up the device connected to the device, the device being exclusively used by the client,
allows the server to exclusively use the device connected to the client,
receives the second request to be generated by the virtual device managing means which is included in the server, via the communication channel, after allowing the server to exclusively use the device connected to the client,
converts the second request to generate a fourth request to be processed by the bus driver in the client to use the device connected to the client from the server, and
when allowing the server to exclusively use the device connected to the client, initializes the device, and interrupts the third request to be generated by the second device driver.

3. The device management system according to claim 1, wherein the virtual device managing means of the server includes a pseudo bus driver,
the pseudo bus driver including:
a startup device object which causes the device connected to the client to operate; and
an enumerator which produces the startup device object in accordance with the device when the device is connected to the client, and deletes the startup device object when the device and the client are disconnected.

4. The device management system according to claim 1, wherein:
each of the client and the server includes a remote operation program; and
each of the device managing means and the virtual device managing means transmits and receives data via the remote operation program.

5. The device management system according to claim 3, wherein the pseudo bus driver performs, upon receipt of a notification indicating that a device is newly connected to the client from the device managing means of the client, an acquisition process of device information which is required from an operating system of the server when the pseudo bus driver operates as a device driver for the newly connected device, and notifies the device managing means of the client that the device information acquiring process has been completed when the acquisition process of the device information is completed.

6. The device management system according to claim 5, wherein:
the server includes display means;
the virtual device managing means of the server judges whether there is an application that is using the device, upon receipt of a notification from the device managing means of the client, the notification indicating that the device and the client are disconnected; and
the pseudo bus driver executes a procedure required to complete an operation as the device driver for the device when it is judged that there is no application using the device, notifies the device managing means of the client that the procedure has been completed when the procedure is completed, and notifies the display means of the server that the procedure has not been completed when the procedure is not completed.

7. The device management system according to claim 6, wherein:
when the server is allowed to use the device connected to the client,
(1) the virtual device managing means of the server notifies the operating system of the server of an error, upon receipt of a notification indicating that the operating system of the server enters a standby state in order to save power, from the operating system of the server; and
(2) the device managing means of the client notifies the operating system of the client of an error, upon receipt of a notification indicating that the operating system of the client enters a standby state in order to save power, from the operating system of the client.

8. A client which is included in a device management system,
the device management system including:
a server, wherein the client issues an instruction to the server and receives a result of executing the instruction from the server; and
an authentication management server which authenticates the client,
the server, the client, and the authentication management server being connected to each other via a network,
wherein the client to which a device connected, the device being controlled from one of the client and the server, comprise:
device managing means which transmits and receives data to and from a bus driver in the client, and transmits and receives the data to and from the server; and
a device driver which generates a first request for using the device upon receipt of an instruction from an application which is included in the client, wherein:
the device managing means:
starts up the device connected to the device, the device being exclusively used by the client,
allowing the server to exclusively use the device connected to the device, receives a second request to be generated by the server, via the communication channel, after allowing the server to exclusively use the device connected to the client, converts the second request to generate a third request to be processed by a bus driver to use the device connected to the client from the server, and when allowing the server to exclusively use the device connected to the client, initializes the device, and interrupts the first request to be generated by the device driver.

* * * * *